US012612248B2

(12) United States Patent
Yu et al.

(10) Patent No.: US 12,612,248 B2
(45) Date of Patent: Apr. 28, 2026

(54) REFUSE CONTAINER FOR BLOCKING ODOR OF DISPOSED MATERIALS

(71) Applicant: Coterie Baby, Inc., New York, NY (US)

(72) Inventors: Sum Chi Frank Yu, New York, NY (US); Jonathan Taylor Wiegele, Los Angeles, CA (US); Harmony Schorr, Brooklyn, NY (US); Clementine Gilbert, Brooklyn, NY (US)

(73) Assignee: Coterie Baby, Inc., New York, NY (US)

( * ) Notice: Subject to any disclaimer, the term of this patent is extended or adjusted under 35 U.S.C. 154(b) by 71 days.

(21) Appl. No.: 18/767,343

(22) Filed: Jul. 9, 2024

(65) Prior Publication Data

US 2025/0019157 A1 Jan. 16, 2025

Related U.S. Application Data

(60) Provisional application No. 63/526,539, filed on Jul. 13, 2023.

(51) Int. Cl.
*B65F 1/06* (2006.01)
*B65F 1/16* (2006.01)

(52) U.S. Cl.
CPC ................ *B65F 1/163* (2013.01); *B65F 1/06* (2013.01); *B65F 1/1646* (2013.01); *B65F 2001/1676* (2013.01)

(58) Field of Classification Search
CPC .......... B65F 1/163; B65F 1/06; B65F 1/1646; B65F 1/10; B65F 1/16; B65F 2001/1676; B65F 2210/167

(Continued)

(56) References Cited

U.S. PATENT DOCUMENTS 2,271,918 A 2/1942 Glowka
3,825,215 A 7/1974 Borglum
(Continued)

FOREIGN PATENT DOCUMENTS

CN 110482078 A 11/2019
CN 213293539 U 5/2021
(Continued)

OTHER PUBLICATIONS

PCT Patent Application PCT/US2024/37150 International Search Report and Written Opinion of the International Searching Authority issued Nov. 11, 2024.

(Continued)

*Primary Examiner* — Don M Anderson
*Assistant Examiner* — Elizabeth J Volz
(74) *Attorney, Agent, or Firm* — Erise IP, P.A.

(57) ABSTRACT

Systems, devices, and methods for disposing of refuse are disclosed. A refuse container may comprise a housing, a lid, an actuator, odor-blocking doors, a base, and an automatic door subassembly. The odor-blocking doors may mount to the housing and the lid may hingedly attach to the housing. The actuator may operatively couple to the base and the automatic door subassembly. Actuating the actuator may move the automatic door subassembly from a first position to a second position to open the lid. A user may place the refuse on the odor-blocking doors. The automatic door subassembly may then move from the second position to a third position to close the lid, from the third position to a fourth position to open the odor-blocking doors such that the refuse drops through the odor-blocking doors, and from the fourth position back to the first position to close the odor-blocking doors.

20 Claims, 46 Drawing Sheets

(58) Field of Classification Search
USPC .......................................... 220/495.11, 908.2
See application file for complete search history.

(56) References Cited

U.S. PATENT DOCUMENTS

| | | | | |
|---|---|---|---|---|
| 4,913,308 | A * | 4/1990 | Culbertson ............... | B65F 1/06 220/908 |
| 5,125,526 | A | 6/1992 | Sumanis | |
| 5,147,055 | A | 9/1992 | Samson et al. | |
| 5,174,462 | A | 12/1992 | Hames | |
| 5,535,913 | A | 7/1996 | Asbach et al. | |
| 5,655,680 | A | 8/1997 | Asbach et al. | |
| 5,794,277 | A | 8/1998 | Jones | |
| 6,024,238 | A | 2/2000 | Jaros | |
| 6,719,194 | B2 | 4/2004 | Richards | |
| D491,706 | S | 6/2004 | Yang et al. | |
| D497,098 | S | 10/2004 | Magnusson | |
| 6,817,164 | B2 | 11/2004 | Mauffette et al. | |
| 6,994,247 | B2 | 2/2006 | Richards | |
| D523,603 | S | 6/2006 | Memari | |
| 7,086,569 | B2 | 8/2006 | Stravitz | |
| 7,406,814 | B2 | 8/2008 | Morand | |
| D582,250 | S | 12/2008 | Johansson | |
| D586,971 | S | 2/2009 | Rousso et al. | |
| 7,484,635 | B2 | 2/2009 | Yang et al. | |
| 7,494,021 | B2 | 2/2009 | Yang et al. | |
| 7,530,578 | B2 * | 5/2009 | Niemeyer ............. | B65F 1/1646 220/264 |
| D596,364 | S | 7/2009 | Morand | |
| 7,617,660 | B2 | 11/2009 | Morand | |
| 7,696,711 | B2 | 4/2010 | Pollack et al. | |
| 7,712,285 | B2 | 5/2010 | Stravitz et al. | |
| 7,931,150 | B2 | 4/2011 | Morand | |
| 8,033,414 | B2 | 10/2011 | Conforti | |
| D652,189 | S | 1/2012 | Morand | |
| 8,087,532 | B2 | 1/2012 | Brown et al. | |
| 8,127,519 | B2 | 3/2012 | Stravitz | |
| 8,215,089 | B2 | 7/2012 | Stravitz | |
| 8,245,864 | B2 | 8/2012 | Garland | |
| 8,266,870 | B1 | 9/2012 | Stravitz | |
| 8,266,871 | B1 | 9/2012 | Stravitz | |
| 8,333,293 | B2 | 12/2012 | Morand | |
| D674,571 | S | 1/2013 | Sakaguchi et al. | |
| 8,393,489 | B1 | 3/2013 | Stravitz | |
| 8,418,869 | B2 | 4/2013 | Yang et al. | |
| 8,567,157 | B2 | 10/2013 | Dunn et al. | |
| 8,613,371 | B2 | 12/2013 | Rousso et al. | |
| 8,635,838 | B2 | 1/2014 | Dunn et al. | |
| 8,739,501 | B2 | 6/2014 | Dunn et al. | |
| 8,752,723 | B2 | 6/2014 | Lucas et al. | |
| 8,833,592 | B2 | 9/2014 | Dunn et al. | |
| 8,844,751 | B2 | 9/2014 | Sakaguchi et al. | |
| 8,973,774 | B1 | 3/2015 | Stravitz | |
| 9,051,093 | B2 | 6/2015 | Yang et al. | |
| 9,056,716 | B1 | 6/2015 | Stravitz | |
| D733,987 | S | 7/2015 | Coffin | |
| D736,489 | S | 8/2015 | Wall | |
| D747,060 | S | 1/2016 | Valderrama et al. | |
| D747,061 | S | 1/2016 | Valderrama et al. | |
| 9,493,302 | B2 | 11/2016 | Rousso et al. | |
| D775,447 | S | 12/2016 | Stravitz | |
| D780,395 | S | 2/2017 | Stravitz | |
| 9,598,207 | B2 | 3/2017 | Morand | |
| 9,694,972 | B1 | 7/2017 | Stravitz | |
| 9,714,138 | B2 | 7/2017 | Dunn et al. | |
| 9,834,376 | B1 | 12/2017 | Stravitz | |
| 9,938,045 | B2 | 4/2018 | Morand | |
| 9,994,393 | B2 | 6/2018 | Dunn et al. | |
| D825,130 | S | 8/2018 | Duvigneau | |
| 10,053,283 | B1 | 8/2018 | Stravitz | |
| 10,053,284 | B2 | 8/2018 | Dunn et al. | |
| 10,086,996 | B2 | 10/2018 | Dunn et al. | |
| D837,474 | S | 1/2019 | Parker et al. | |
| 10,279,996 | B2 | 5/2019 | Yang et al. | |
| D851,349 | S | 6/2019 | Beumer et al. | |
| 10,343,842 | B2 | 7/2019 | Dunn et al. | |
| 10,494,175 | B2 | 12/2019 | Yang et al. | |
| 10,543,982 | B2 | 1/2020 | Kral et al. | |
| D874,776 | S | 2/2020 | Spadotto | |
| 10,710,799 | B2 | 7/2020 | Dunn et al. | |
| 10,906,737 | B2 | 2/2021 | Dunn et al. | |
| 11,136,186 | B2 | 10/2021 | Yang et al. | |
| 11,279,555 | B2 | 3/2022 | Yang et al. | |
| 11,383,925 | B2 | 7/2022 | Morand | |
| D1,000,030 | S | 9/2023 | Teper et al. | |
| 2007/0182551 | A1 * | 8/2007 | Yang ..................... | B65F 1/1638 220/908 |
| 2009/0126320 | A1 | 5/2009 | Rousso et al. | |
| 2013/0098913 | A1 * | 4/2013 | Yang ......................... | B65F 1/08 220/263 |
| 2014/0326730 | A1 * | 11/2014 | Morand .................. | B65F 1/062 220/495.06 |
| 2017/0334641 | A1 * | 11/2017 | Chen ....................... | B65F 1/068 |
| 2018/0118458 | A1 | 5/2018 | Blatter et al. | |
| 2018/0141748 | A1 | 5/2018 | Chenvainu et al. | |
| 2021/0354912 | A1 * | 11/2021 | Morand .................. | B65F 1/163 |
| 2025/0019157 | A1 | 1/2025 | Yu et al. | |

FOREIGN PATENT DOCUMENTS

| | | | |
|---|---|---|---|
| CN | 213801274 | U | 7/2021 |
| CN | 214242303 | U | 9/2021 |
| CN | 215438005 | U | 1/2022 |
| CN | 217101459 | U | 8/2022 |
| CN | 217416921 | U | 9/2022 |
| GB | 2468472 | A | 9/2010 |
| GB | 6416052 | | 1/2025 |
| GB | 6416093 | | 1/2025 |

OTHER PUBLICATIONS

Munchkin store, Jan. 27, 2022,Amazon.com Product Post, URL:https://www.amazon.com/Munchkin%C2%AE-Control-Causing-Bacteria-Surface/dp/B09RC PTWB4 ?th=1 (Year: 2022).
Ubbi store, Apr. 22, 2020,Amazon.com Product Post, U RL:https://www.amazon.com/Ubbi-Required-Awards-Winning-Rgistry-Must-Have/dp/B087GPRB2?th=1 (Year: 2020).
U.S. Appl. No. 29/951,398, Notice of Allowance issued Feb. 17, 2026.
U.S. Appl. No. 29/951,405, Ex Parte Quayle Action issued Feb. 17, 2026.

* cited by examiner

REFUSE CONTAINER FOR BLOCKING ODOR OF DISPOSED MATERIALS

CROSS-REFERENCE TO RELATED APPLICATIONS

This non-provisional patent application claims priority benefit, with regard to all common subject matter, of U.S. Provisional Patent Application No. 63/526,539, filed Jul. 13, 2023, and entitled "REFUSE CONTAINER FOR BLOCKING ODOR OF DISPOSED MATERIALS." The above-identified application is hereby incorporated by reference in its entirety.

TECHNICAL FIELD

Embodiments of the present disclosure relate to refuse containers. More specifically, embodiments of the present disclosure relate to a refuse container for blocking odor of disposed materials.

RELATED ART

Disposal of smelly or unsavory materials (e.g., diapers) into a refuse container creates a rank odor within and around the container. The odor may be unpleasant for persons to inhale. Each opening of the refuse container and disposal of refuse subjects the user to the odor of previously disposed materials. Accordingly, a refuse container that provides odor blocking both during and after material disposal is desirable for decreasing the odor permeating from the container. The decreased permeation of odor may keep users who are near or around the refuse container from inhaling unpleasant odors.

Disposal of smelly, unsavory materials often necessitates a user handling at least the bag containing the refuse. This handling may include, for example, placing the material into a disposal bag within the refuse container and closing and removing the disposal bag from the container once the bag is full. These procedures may cause a user to come into frequent contact with the disposed unsavory material. A refuse container that provides minimal handling and decreased points of contact eliminates the unpleasantness associated with contacting disposed materials and the risk of inhaling malodorous scents. Additionally, a refuse container that provides decreased handling simplifies the user's interaction with the container, thereby improving the user experience.

Additionally, refuse containers may include small openings through which to dispose of refuse. A user may have to force the refuse through the small opening, which may cause the user to come into contact with unsavory materials in the refuse container. The forcing of refuse through the small opening may also dirty components of the refuse container additional to the disposal bag, thereby increasing the cleaning effort of the user. A refuse container that provides a large opening for the user to dispose refuse through may minimize handling by the user and decrease points of contact with the refuse. The large opening may also decrease the amount of cleaning.

Children proximate to a refuse container may accidentally come into contact with the disposed smelly, unsavory material. It is advantageous to provide a refuse container with a latch that decreases a child's ability to come into contact with the disposed smelly, unsavory materials.

SUMMARY

In some embodiments, the techniques described herein relate to a refuse container, including: a housing having a top and a bottom; at least one odor-blocking door mounted to the housing; a lid hingedly coupled to the housing proximate the top of the housing; a base coupled to the housing proximate the bottom of the housing; an actuator operatively coupled to the base; an automatic door subassembly operatively coupled to the actuator, wherein actuation of the actuator causes the automatic door subassembly to contact the lid to open the lid, move away from the lid to close the lid, and contact the at least one odor-blocking door after closing the lid to transition the at least one odor-blocking door from a closed configuration to an open configuration.

In some embodiments, the techniques described herein relate to a refuse container, wherein the automatic door subassembly includes a beam pivotally coupled to the actuator, wherein the actuation of the actuator pivots the actuator in a first direction to cause the beam to contact the lid to open the lid.

In some embodiments, the techniques described herein relate to a refuse container, wherein the at least one odor-blocking door includes a door lever, wherein the automatic door subassembly includes a lever coupled to the beam and the lever contacts the door lever to transition the at least one odor-blocking door from the closed configuration to the open configuration.

In some embodiments, the techniques described herein relate to a refuse container, wherein the housing includes an inner wall coupled to a rear panel and a front panel hingedly coupled to a first side of the rear panel.

In some embodiments, the techniques described herein relate to a refuse container, further including: a door mount subassembly mounting the at least one odor-blocking door to the housing, the door mount subassembly including: a support mount coupled to the housing; a door support coupled to the support mount; wherein the at least one odor-blocking door rotatably couples to the door support such that the door mount subassembly mounts the at least one odor-blocking door to the housing.

In some embodiments, the techniques described herein relate to a refuse container, further including: a latch configured to close the front panel onto a second side of the rear panel to close the housing.

In some embodiments, the techniques described herein relate to a refuse container, wherein the at least one odor-blocking door rotates about the door support to transition the at least one odor-blocking door from the closed configuration to the open configuration.

In some embodiments, the techniques described herein relate to a refuse container system, including: a refuse container, the refuse container including: a housing having a top and a bottom; at least one odor-blocking door mounted to the housing; a lid hingedly coupled to the housing proximate the top of the housing; a base coupled to the housing proximate the bottom of the housing; an actuator operatively coupled to the base; an automatic door subassembly operatively coupled to the actuator, wherein actuation of the actuator causes the automatic door subassembly to contact the lid to open the lid, move away from the lid to close the lid, and contact the at least one odor-blocking door after closing the lid to transition the at least one odor-blocking door from a closed configuration to an open configuration; a disposal bag received within the housing of the refuse container; an odor-eliminating cartridge received in the lid; and a storage compartment coupled to the housing, wherein the storage compartment receives a disposal bag package.

In some embodiments, the techniques described herein relate to a refuse container system, wherein the refuse container further includes: a door mount subassembly mounting the at least one odor-blocking door to the housing, the door mount subassembly including: a support mount coupled to the housing; a door support coupled to the support mount, wherein the at least one odor-blocking door rotatably couples to the door support such that the door mount subassembly mounts the at least one odor-blocking door to the housing.

In some embodiments, the techniques described herein relate to a refuse container system, wherein the refuse container further includes: a bag support positioned on the door support, wherein an opening of the disposal bag extends over a top edge of the bag support when the disposal bag is received within the housing of the refuse container.

In some embodiments, the techniques described herein relate to a refuse container system, wherein the odor-eliminating cartridge houses activated carbon configured to absorb malodors from refuse disposed of in the refuse container.

In some embodiments, the techniques described herein relate to a refuse container system, wherein the housing defines a second receiving chamber having a depth, wherein a length of the disposal bag is greater than the depth of the second receiving chamber, and wherein the disposal bag further comprises: a fastener passage extending along an opening of the disposal bag; and a fastener mounted inside the fastener passage.

In some embodiments, the techniques described herein relate to a refuse container system, wherein the at least one odor-blocking door defines a first receiving chamber when the at least one odor-blocking door is in the closed configuration, wherein the at least one odor-blocking door is configured to cover the second receiving chamber when the at least one odor-blocking door is in the closed configuration to thereby block odors in the second receiving chamber from reaching a user during sealing and removal of the disposal bag from the refuse container.

In some embodiments, the techniques described herein relate to a refuse container, including: a housing having a top and a bottom; one or more odor-blocking doors mounted to the housing; a lid hingedly coupled to the housing proximate the top of the housing; a base coupled to the housing proximate the bottom of the housing; an actuator operatively coupled to the base; an automatic door subassembly operatively coupled to the actuator, wherein the automatic door subassembly transitions from a first position to a second position to open the lid when the actuator is pressed, wherein the automatic door subassembly transitions from the second position to a third position to close the lid and from the third position to a fourth position to transition the one or more odor-blocking doors from a closed configuration to an open configuration when the actuator is released.

In some embodiments, the techniques described herein relate to a refuse container, wherein the one or more odor-blocking doors includes a first odor-blocking door and a second odor-blocking door, wherein the first odor-blocking door includes a projection and the second odor-blocking door defines a groove, wherein the groove receives the projection when the first odor-blocking door and the second odor-blocking door are in the closed configuration.

In some embodiments, the techniques described herein relate to a refuse container, wherein the automatic door subassembly includes a beam defining at least one translation slot having a first end and a second end, the at least one translation slot receiving a fastener, wherein the first end of the at least one translation slot receives the fastener when the automatic door subassembly is in the first position.

In some embodiments, the techniques described herein relate to a refuse container, wherein one of the one or more odor-blocking doors includes a door lever, wherein a lever couples to the beam, wherein the lever contacts the door lever when the automatic door subassembly transitions from the third position to the fourth position, and wherein contact of the lever to the door lever rotates the one or more odor-blocking doors from the closed configuration to the open configuration.

In some embodiments, the techniques described herein relate to a refuse container, wherein the lever releases from the door lever to transition the automatic door subassembly from the fourth position to the first position, wherein the one or more odor-blocking doors bias from the open configuration back to the closed configuration when the lever releases from the door lever.

In some embodiments, the techniques described herein relate to a refuse container, further including: one or more indicators configured to indicate a status of the refuse container to a user, wherein the one or more indicators are included in the lid.

In some embodiments, the techniques described herein relate to a refuse container, wherein the one or more odor-blocking doors define a first receiving chamber when the odor-blocking doors are in the closed configuration, wherein the housing defines a second receiving chamber, wherein the odor-blocking doors are configured to cover the second receiving chamber when the one or more odor-blocking doors are in the closed configuration to thereby block odors in the second receiving chamber from reaching a user during refuse disposal.

BRIEF DESCRIPTION OF THE FIGURES

Embodiments of the present disclosure are described in detail below with reference to the attached drawing figures, wherein.

Figure 1:
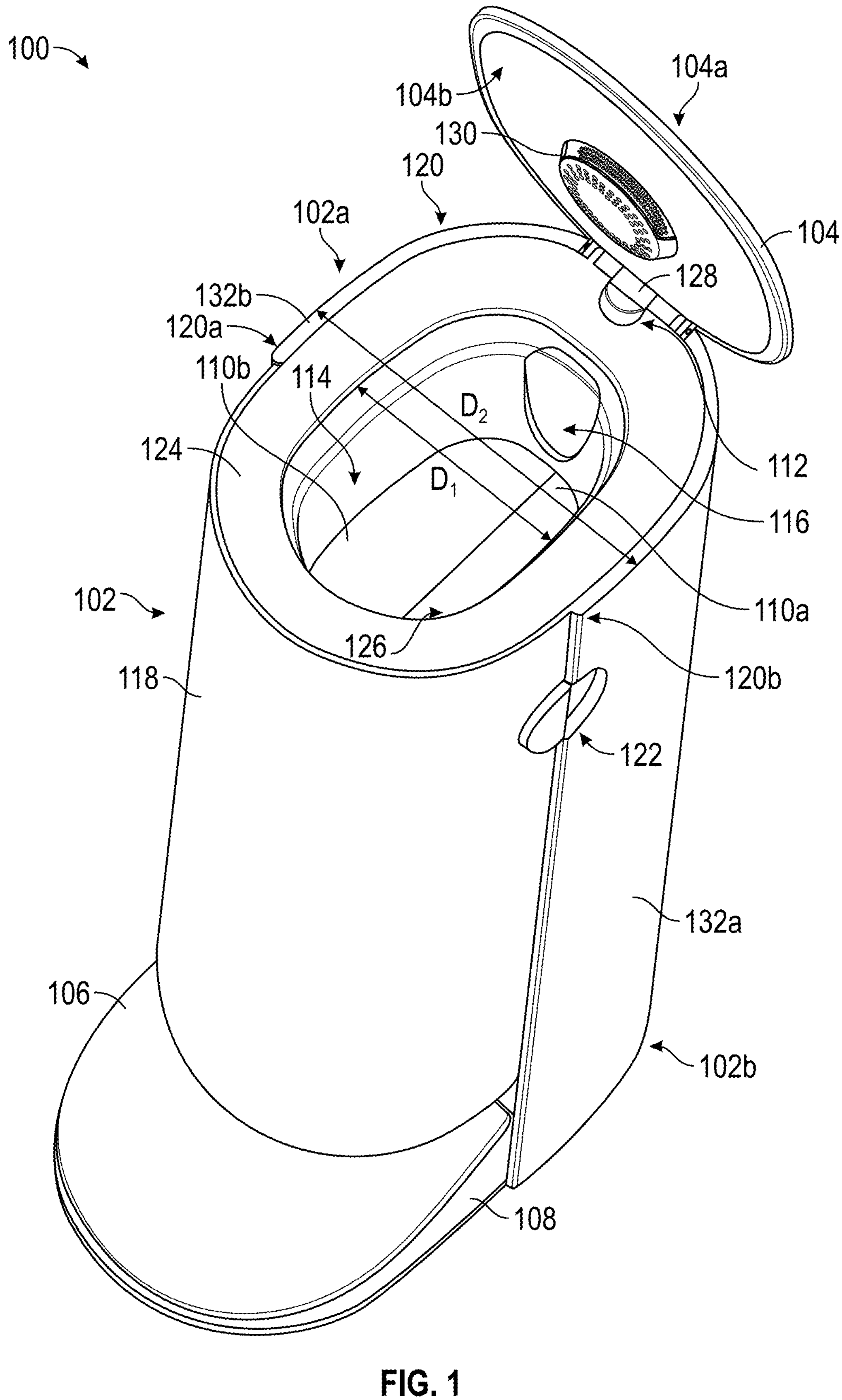
FIG. 1 illustrates a top perspective view of some embodiments of a refuse container, with a lid of the refuse container opened.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claims. Terms should not be interpreted as implying any particular ordering of various steps described unless the order of individual steps is explicitly described.

The following detailed description of embodiments of the present disclosure references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of embodiments of the present disclosure is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate reference to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Overview

Embodiments of the present disclosure are generally directed to systems, methods, and devices for disposing of refuse materials. In some embodiments, a refuse container is provided that blocks odors when a user disposes of refuse. The refuse container may include a housing, a lid connected to the housing, a base connected to the housing, and an actuator operatively coupled to the base. The refuse container may also include odor-blocking doors mounted to the housing and include an automatic door subassembly operatively coupled to the actuator. Actuating the actuator may cause the automatic door subassembly to open the lid. The automatic door subassembly may then close the lid. After the lid closes, the automatic door subassembly interacts with the odor-blocking doors to open the odor-blocking doors. The odor-blocking doors then bias back to a closed configuration. By the automatic door subassembly opening and closing the odor-blocking doors after the lid is closed, the refuse container keeps the odor of previously disposed of material from reaching the user. The automatic door subassembly opening the odor-blocking doors when the lid closes may block odors of previously disposed of material from reaching the user.

In some embodiments, the refuse container may include a manual door subassembly to allow a user to manually open and close the odor-blocking doors for disposal bag replacement and disposal bag removal. A user may interact with the manual door subassembly to close and open the odor-blocking doors during disposal bag replacement and disposal bag removal. For example, the user may move the manual door subassembly to open and close the odor-blocking doors when replacing or removing a disposal bag from the refuse container. Disposal bag removal may include sealing the disposal bag.

The refuse container may form part of a system, the system including a disposal bag. The system may be configured to dispose of refuse a user places in the refuse container. The disposal bag may be inserted into the refuse container. The disposal bag may be positioned between the odor-blocking doors within the housing of the refuse container. Actuating the actuator may cause the automatic door subassembly to open the lid such that a user may place refuse in the disposal bag, atop the closed odor-blocking doors. The automatic door subassembly may then close the lid. After the lid closes, the automatic door subassembly interacts with the odor-blocking doors to open the odor-blocking doors such that the refuse falls through the doors and into a bottom of the disposal bag. The odor-blocking doors then bias back to a closed configuration. The automatic door subassembly opening the odor-blocking doors when the lid closes may block odors of previously disposed of material within the disposal bag from reaching the user during refuse disposal and disposal bag removal.

In some embodiments, the disposal bag may comprise a fastener mounted within a fastener passage of the disposal bag. The fastener may rotate freely within the fastener passage. The fastener passage may form a first cutout and a second cutout, such that a user may access the fastener mounted in the fastener passage through the first and second cutout. The fastener may rotate freely within the fastener passage such that users may seal the bag closed by pulling on the fastener through the first or second cut-out, when the bag is full.

In some embodiments, the refuse container system may comprise an odor-eliminating cartridge that is placed inside the refuse container to absorb malodors from disposed material while the lid is closed on the refuse container.

A method is provided in which a disposal bag is inserted/replaced in the refuse container. The method may include a user opening the housing and opening the lid. The user may then move the manual door subassembly to open the odor-blocking doors. The user may then place a portion of a new disposal bag through the opened odor-blocking doors. Once the bag is placed between the doors, the user may move the manual door subassembly to close the odor-blocking doors. The user may then close the lid and close the housing.

A method is provided in which a disposal bag is removed from the refuse container. The method may include user opening the housing and opening the lid. The user may then seal the disposal bag positioned inside the refuse container. The user may then move the manual door subassembly to open the odor-blocking doors. The user may then remove the full disposal bag from the refuse container.

FIG. 1 illustrates a top perspective view of some embodiments of refuse container 100. The refuse container 100 may comprise a housing 102 having a top 102*a* and a bottom 102*b*, a lid 104, an actuator 106, and a base 108. The base 108 may couple to the housing 102 proximate bottom 102*b* of housing 102. The lid 104 may hingedly couple to housing 102 proximate a top 102*a* of housing 102. Actuator 106 may operatively couple to the base 108. In some embodiments, the refuse container 100 may comprise at least one odor-blocking door. In some embodiments, the refuse container 100 may comprise a first odor-blocking door 110*a* and a second odor-blocking door 110*b*. Odor-blocking doors 110*a*, 110*b* may mount to the housing 102. An automatic door subassembly 112 (also referred to as an automatic odor-blocking door subassembly) may operatively couple to the actuator 106.

Actuating the actuator 106 may cause the automatic door subassembly 112 to open the lid 104, close the lid 104, and then open the odor-blocking doors 110*a*, 110*b*. In some embodiments, actuating the actuator 106 may cause the automatic door subassembly 112 to move from a first position to a second position to open the lid 104, move from the second position to a third position to close the lid 104, and move from the third position to a fourth position to cause the odor-blocking doors 110*a*, 110*b* to transition from a closed configuration to an open configuration, as further discussed herein.

In some embodiments, actuating actuator 106 may cause the automatic door subassembly 112 to contact lid 104 to thereby open the lid 104. The automatic door subassembly 112 may move away from lid 104 to thereby close the lid 104. When the lid 104 is closed, the automatic door subassembly 112 may interact with the odor-blocking doors 110*a*, 110*b* to move the odor-blocking doors 110*a*, 110*b* from the closed configuration to the open configuration. In some embodiments, once lid 104 is closed, the automatic door subassembly 112 may contact at least a portion of one of the odor-blocking doors 110*a*, 110*b* to transition the doors 110*a*, 110*b* from the closed configuration to the open configuration.

After the automatic door subassembly 112 interacts with the odor-blocking doors 110*a*, 110*b*, the automatic door subassembly 112 may release the odor-blocking doors 110*a*, 110*b*. The odor-blocking doors 110*a*, 110*b* may then bias back to the closed configuration from the open configuration, as further discussed herein.

In some embodiments, automatic door subassembly 112 may move to contact lid 104 when automatic door subassembly 112 transitions from the first position to the second position. Automatic door subassembly 112 may move away from lid 104 when automatic door subassembly 112 transitions from the second position to the third position. Automatic door subassembly 112 may contact a portion of one of the odor-blocking doors 110*a*, 110*b* when transitioning from the third position to the fourth position, to thereby transition the odor-blocking doors 110*a*, 110*b* from the closed configuration to the open configuration.

In some embodiments, the odor-blocking doors 110*a*, 110*b* may bias back to the closed configuration from the open configuration when automatic door subassembly 112 transitions from the fourth position back to the first position. Automatic door subassembly 112 may release the portion of the one of the odor-blocking doors 110*a*, 110*b* when transition from the fourth position to the first position, such that odor-blocking doors 110*a*, 110*b* bias back to the closed configuration from the open configuration.

In some embodiments, actuating actuator 106 may include pressing actuator 106 and releasing actuator 106. Pressing actuator 106 may transition the automatic door subassembly 112 from the first position to the second position to open lid 104. Releasing actuator 106 may cause the automatic door subassembly 112 to transition from the second position to the third position to close lid 104 and from the third position to the fourth position to move the odor-blocking doors 110*a*, 110*b* from the closed configuration to the open configuration.

In some embodiments, pressing actuator 106 may move automatic door subassembly 112 toward lid 104 to push lid 104 open to the upward position when transitioning automatic door subassembly 112 from the first position to the second position. Releasing actuator 106 may move automatic door subassembly 112 away from lid 104 to thereby cause lid 104 to close to a down position when transitioning from the second position to the third position. When actuator is released, automatic door subassembly 112 may continue moving away from lid 104 to contact a portion of one of the odor-blocking doors 110*a*, 110*b* to thereby transition the doors 110*a*, 110*b* from the closed configuration to the open configuration after lid 104 is closed. Automatic door subassembly 112 transitioning from the third position to the fourth position may cause automatic door subassembly to contact a portion of the odor-blocking doors 110*a*, 110*b* to thereby move the doors 110*a*, 110*b* from the closed configuration to the open configuration.

When actuator 106 is released, automatic door subassembly 112 may move away from the odor-blocking doors 110*a*, 110*b* to release the odor-blocking doors 110*a*, 110*b*. When the odor-blocking doors 110*a*, 110*b* are released, the odor-blocking doors 110*a*, 110*b* may rotate back to the closed configuration from the open configuration. Automatic door subassembly 112 transitioning from the fourth position back to the first position may cause automatic door subassembly 112 to release the odor-blocking doors 110*a*, 110*b*, such that doors 110*a*, 110*b* may rotate from the open configuration to the closed configuration.

The automatic door subassembly 112 opens the odor-blocking doors 110*a*, 110*b* after closing the lid 104, thereby blocking odors of previously disposed material from reaching the user during refuse disposal. For example, the odor-blocking doors 110*a*, 110*b* may define a first receiving chamber 114 when the odor-blocking doors 110*a*, 110*b* are in the closed configuration, as shown in FIG. 1. The first receiving chamber 114 may be configured to receive refuse when a user disposes of refuse in the refuse container 100. When the automatic door subassembly 112 interacts with the odor-blocking doors 110*a*, 110*b*, the odor-blocking doors 110*a*, 110*b* may transition from the closed configuration to the open configuration. The refuse may drop from the first receiving chamber 114 into a deeper second receiving chamber (shown in FIG. 3) defined by housing 102 when the odor-blocking doors 110*a*, 110*b* are in the open configuration. When the doors 110*a*, 110*b* bias back to the closed configuration, the doors 110*a*, 110*b* cover the second receiving chamber, thereby blocking odors in the second receiving chamber from reaching the user. The odor-blocking doors 110*a*, 110*b* may be configured to cover the second receiving chamber when the odor-blocking doors 110*a*, 110*b* are in the closed configuration to thereby block odors in the second receiving chamber from reaching the user during refuse disposal and during disposal bag removal. Disposal bag removal may include sealing the disposal bag. The odor-blocking doors 110*a*, 110*b* may mount to housing 102 via a door mount subassembly 116, as further discussed herein.

Figure 3:
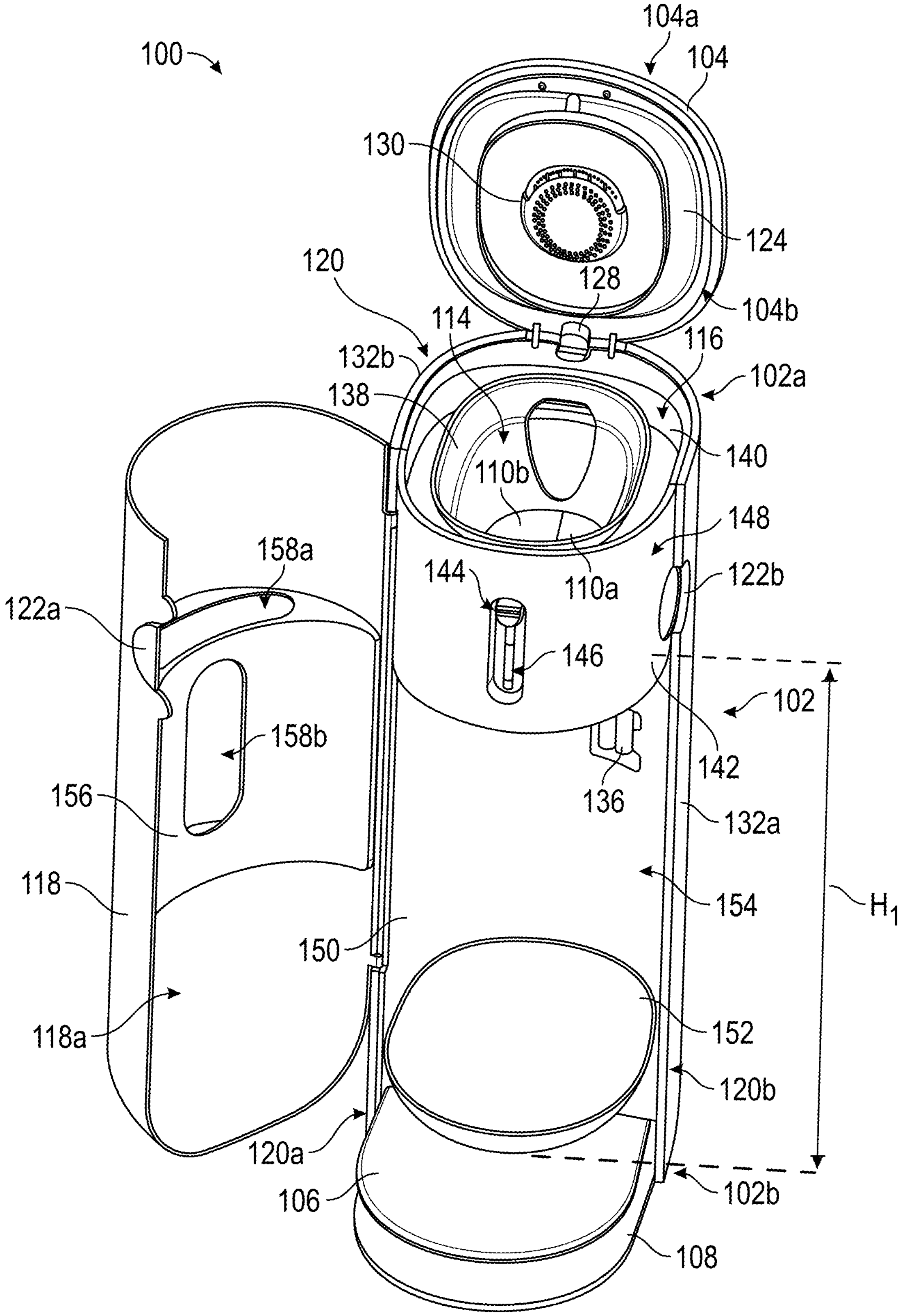
FIG. 3 illustrates a front perspective view of some embodiments of the refuse container with a trim cover of the refuse container and the lid opened in the upward position, and a front panel of the refuse container opened.

As shown in FIG. 1, housing 102 may have a top 102*a* and a bottom 102*b*. Housing 102 may comprise a front panel 118 and a rear panel 120. The front panel 118 may hingedly couple to a first side 120*a* of the rear panel 120 to allow the front panel 118 to open (as shown in FIG. 3). The front panel 118 may be arcuately shaped to form a generally cylindrical chamber with the rear panel 120 when latched onto a second side 120*b* of the rear panel 120. The rear panel 120 may be fixedly coupled to base 108. Base 108 may be located proximate the bottom 102*b* of housing 102. Front panel 118 may comprise part of a latch 122. The latch 122 may be configured to close the front panel 118 onto the second side 120*b* of the rear panel 120 to close the housing 102. In some embodiments, the latch 122 may be configured to latch the front panel 118 onto a second side 120*b* of the rear panel 120 to close the housing 102. Disengaging the latch 122 may open the front panel 118 away from the second side 120*b* of the rear panel 120 to open the housing 102.

Figure 6:
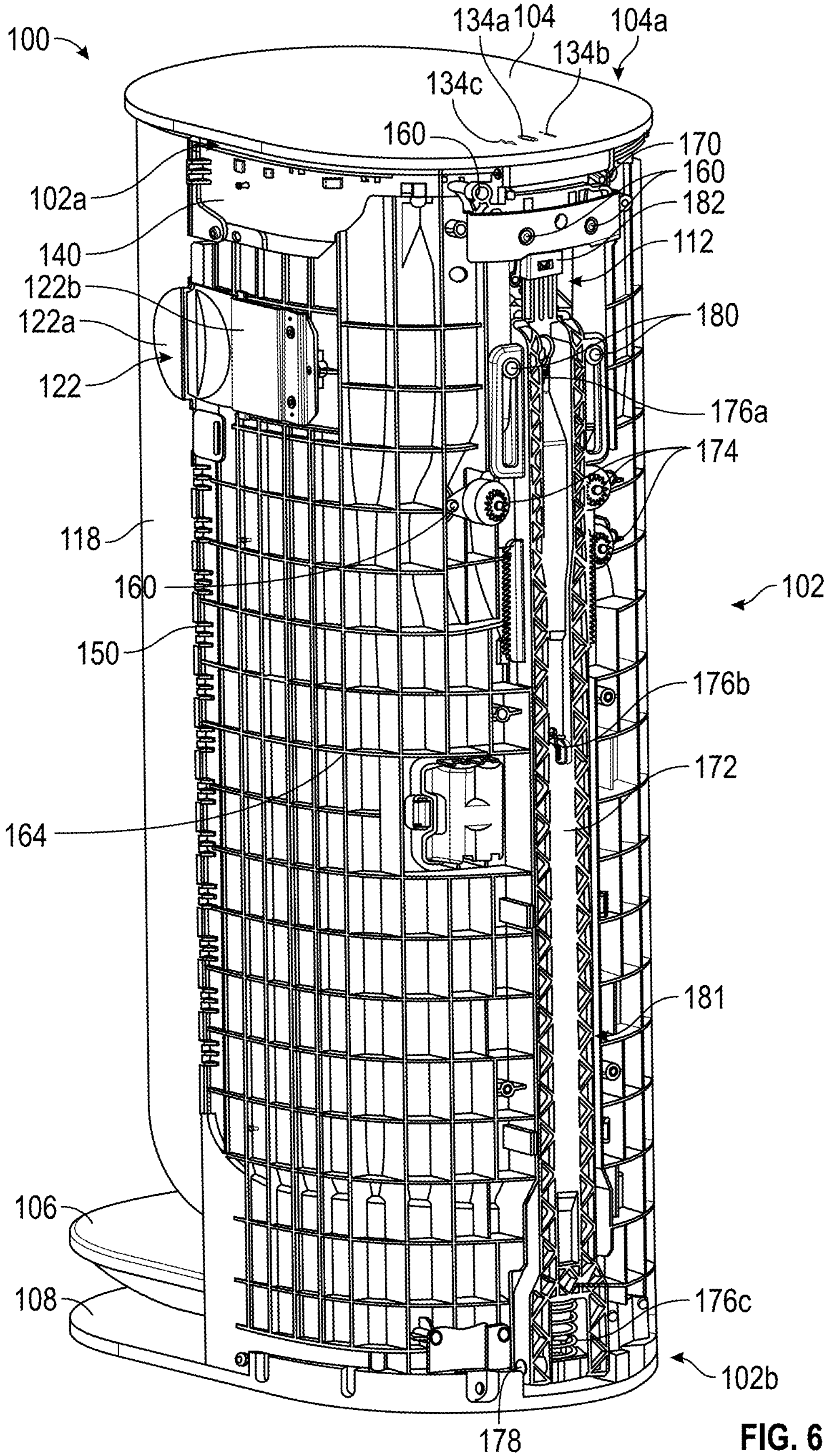
FIG. 6 illustrates a back perspective view of some embodiments of the refuse container with the lid closed in the down position, and the rear panel removed.

The lid 104 of the refuse container 100 is opened in an upward position in FIG. 1. Lid 104 may have a top 104*a* and a bottom 104*b*. As shown in FIG. 1, in some embodiments, refuse container 100 may comprise a trim cover 124 hingedly coupled to housing 102. In some embodiments, the trim cover 124 may hingedly couple to a lid support (as shown in FIG. 6) that forms part of housing 102. The trim cover 124 may form an aperture 126 for which users may place trash or disposable material therethrough. The ratio of the diameter $D_1$ of aperture 126 to the outer diameter $D_2$ of the housing 102 may be within the range of 0.5-0.95, such as from 0.75-0.90, to create a large opening that allows for easy disposal of materials by a user without a user having to touch surfaces potentially soiled with refuse. The trim cover is closed in the down position in FIG. 1. In some embodiments, the trim cover 124 may be positioned underneath the lid 104. In some embodiments, the trim cover 124 may be positioned on the top 102*a* of housing 102 when the trim cover 124 is in the down position, as shown in FIG. 1. The trim cover 124 may hingedly move to an upward position (as shown in FIG. 3), much like the lid 104.

Figure 33A:
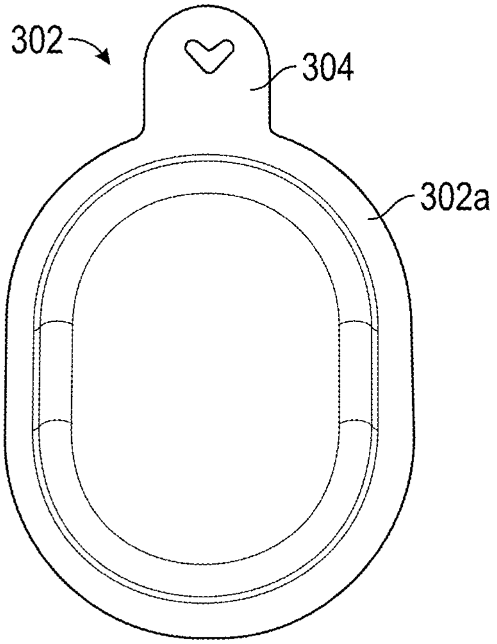
FIG. 33A illustrates a front view of some embodiments of an odor-eliminating cartridge for use in the refuse container.
Figure 33B:
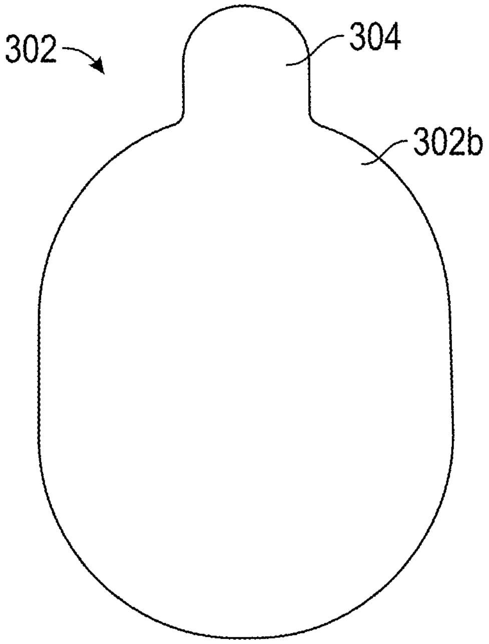
FIG. 33B illustrates a rear view of some embodiments of the odor-eliminating cartridge for use with the refuse container.
Figure 34:
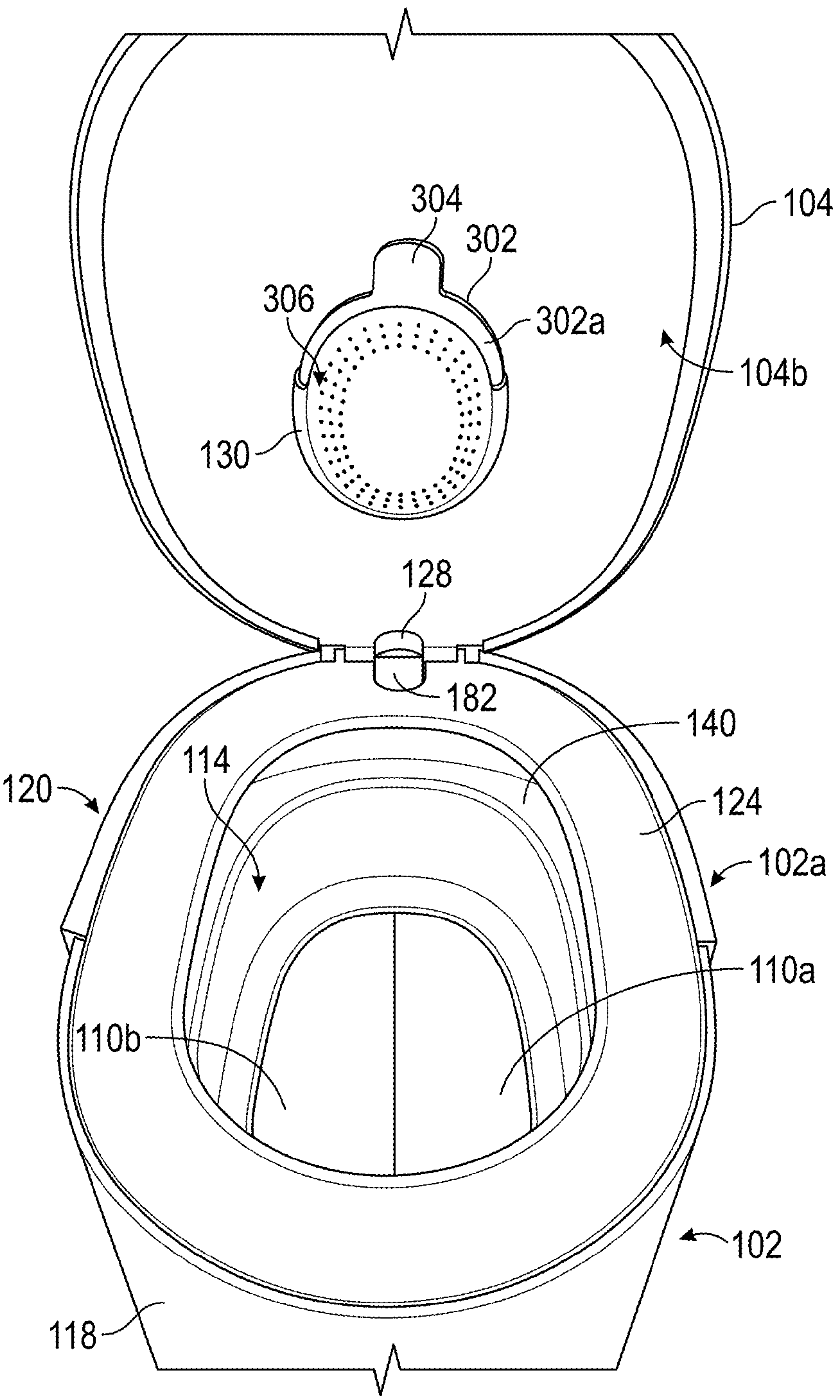
FIG. 34 illustrates a front perspective close-up view of some embodiments of the refuse container with the lid opened in the upward position and the odor-eliminating cartridge in the refuse container, with the bag support removed.

As shown in FIG. 1, the lid 104 may comprise a protrusion 128. As discussed further herein, the automatic door subassembly 112 may interact with the protrusion 128 to open the lid 104 to an upward position, such that a user does not have to touch the lid 104 to open the refuse container 100 to dispose of refuse. In some embodiments, lid 104 may receive an odor-eliminating cartridge (as shown in FIGS. 33A-33B). A bottom 104*b* of lid 104 may receive the odor-eliminating cartridge (as shown in FIG. 34). In some embodiments, bottom 104*b* of lid 104 may comprise a cartridge housing 130, as shown in FIG. 1. The cartridge housing 130 may receive the odor-eliminating cartridge therein, as further discussed herein.

As shown in FIG. 1, the actuator 106 may be positioned proximate the base 108. The actuator 106 may be operatively coupled to the base 108. In some embodiments, the actuator 106 may abut the base 108 when a user actuates the actuator 106. In some embodiments, a user may apply force to the actuator 106 to actuate the actuator 106, thereby causing the actuator 106 to abut the base 108.

In some embodiments, the rear panel 120 may comprise a right rear panel 132*a* and a left rear panel 132*b*, and the front panel 118 may be hingedly connected to the left rear panel 132*b* or the right rear panel 132*a*. For example, the front panel 118 may be hingedly connected to the left rear panel 132*b* and the latch 122 may close the front panel 118 onto the right rear panel 132*a*. The base 108 may be fixedly coupled to the rear panel 120 using fasteners, such as screws, bolts, pins, rods, snaps, adhesives or any other type of fastener.

Figure 2:
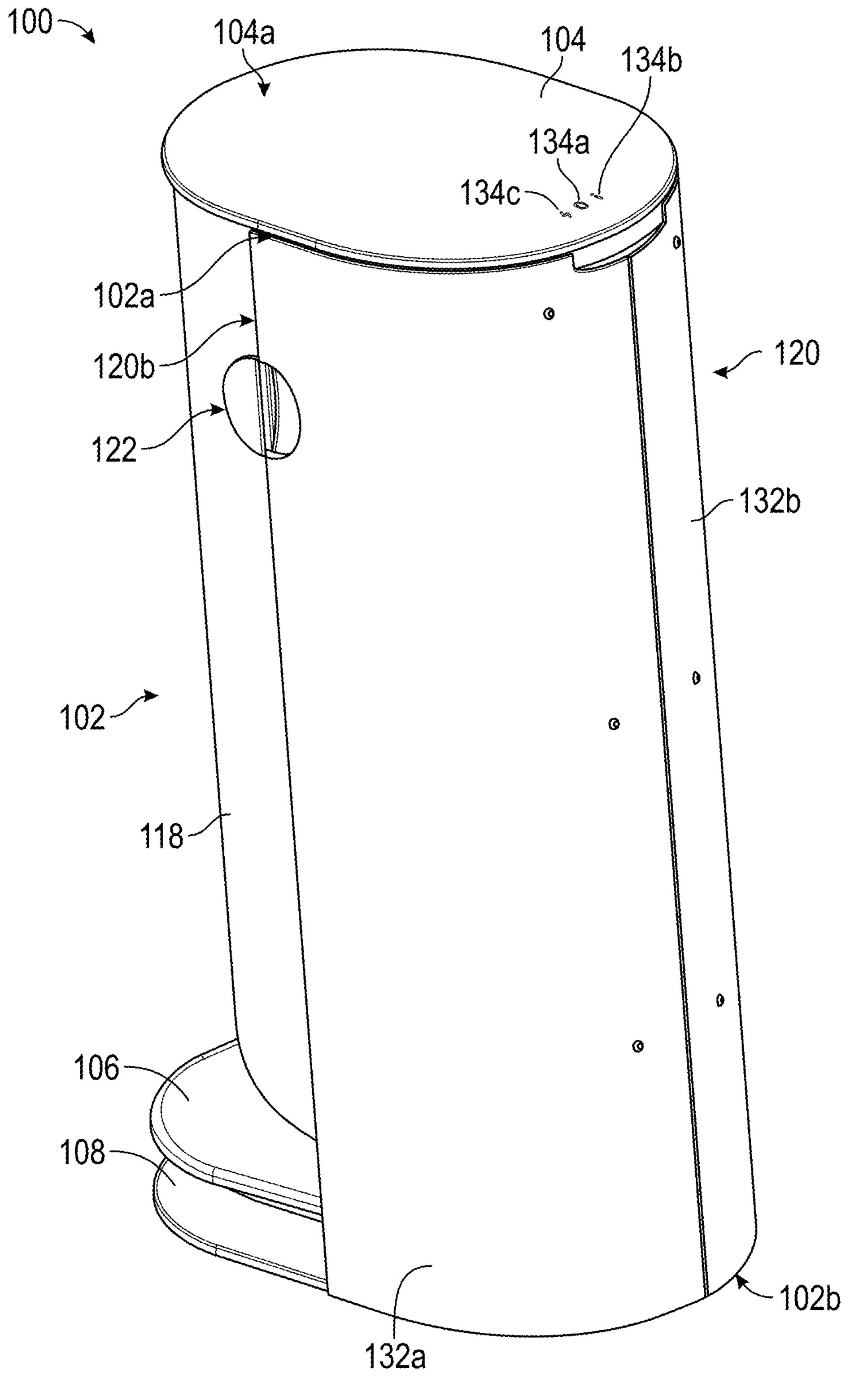
FIG. 2 illustrates a rear perspective view of some embodiments of the refuse container, with the lid closed.

FIG. 2 illustrates a rear perspective view of some embodiments of refuse container 100, with lid 104 closed in a down position. In some embodiments, the lid 104 may hingedly couple to housing 102 to allow the lid 104 to pivot between a closed down position (as shown in FIG. 2) to an opened upward position (as shown in FIG. 1). For example, the lid 104 may hingedly connect to housing 102 proximate the top 102*a* of housing 102. In some embodiments, the lid 104 may hingedly connect to a lid support (as shown in FIG. 6) that forms part of housing 102.

In some embodiments, refuse container 100 may comprise at least one indicator. In some embodiments, refuse container 100 may comprise a first indicator 134*a*, a second indicator 134*b*, and a third indicator 134*c*. In some embodiments and as shown in FIG. 2, indicators 134*a*, 134*b*, 134*c* may be comprised in lid 104. The indicators 134*a*, 134*b*, 134*c* may be configured to indicate a status of the refuse container to the user. Indicators 134*a*, 134*b*, 134*c* may draw power from a power supply (as shown in FIG. 3). In some embodiments, the power supply may be external, such that a chord plugs into an external outlet to power the indicators 134*a*, 134*b*, 134*c*. The indicators 134*a*, 134*b*, 134*c* may be visual, auditory, or some other form of indicating to users the status of the refuse container, as further discussed herein.

FIG. 3 illustrates a front perspective view of some embodiments of refuse container 100 with the trim cover 124 and lid 104 opened in the upward position, and the front panel 118 opened. Refuse container 100 may comprise a power supply 136. In some embodiments, the power supply 136 may be batteries and internal to refuse container 100. Refuse container 100 may comprise a bag support 138 and door mount subassembly 116. The door mount subassembly 116 may include a door support 140, a support mount 142, and the odor-blocking doors 110*a*, 110*b*. The door mount subassembly 116 may mount the odor-blocking doors 110*a*, 110*b* to the housing 102. For example, the door mount subassembly 116 may operatively couple the odor-blocking doors 110*a*, 110*b* to the housing 102.

Figure 16B:
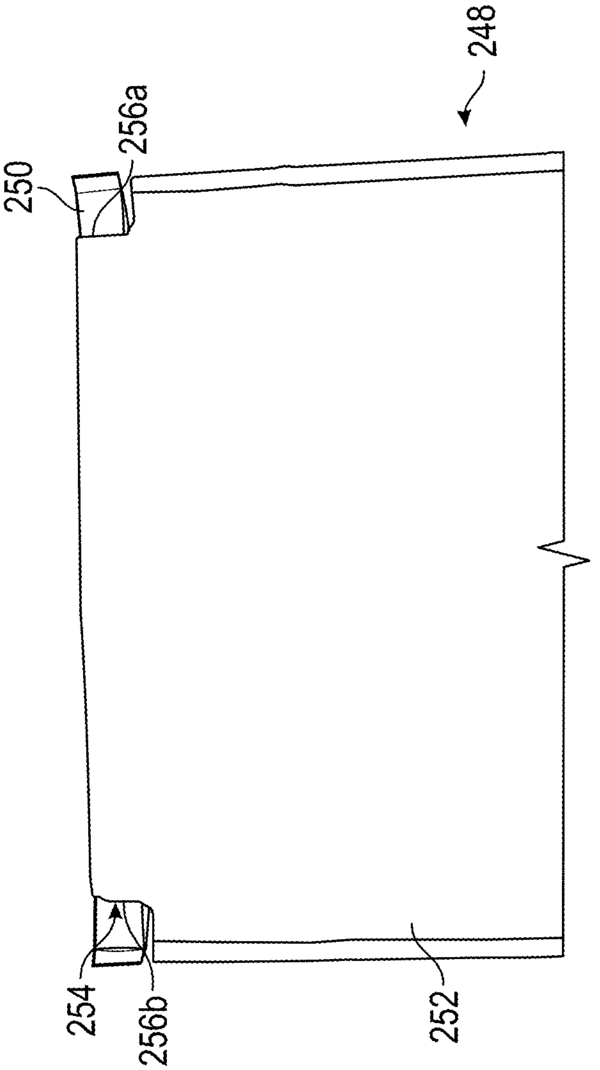
FIG. 16B illustrates a close-up front view of the disposal bag for use with the refuse container.
Figure 16A:
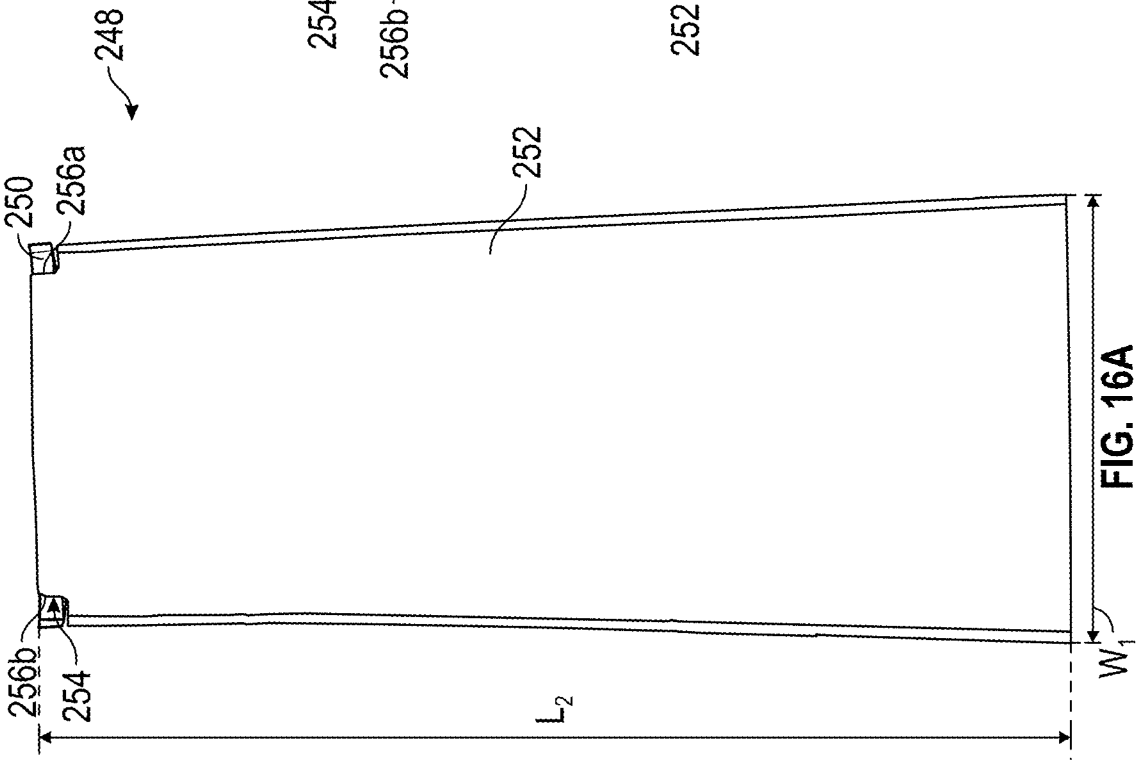
FIG. 16A illustrates a front view of some embodiments of a disposal bag for use with the refuse container.
Figure 16C:
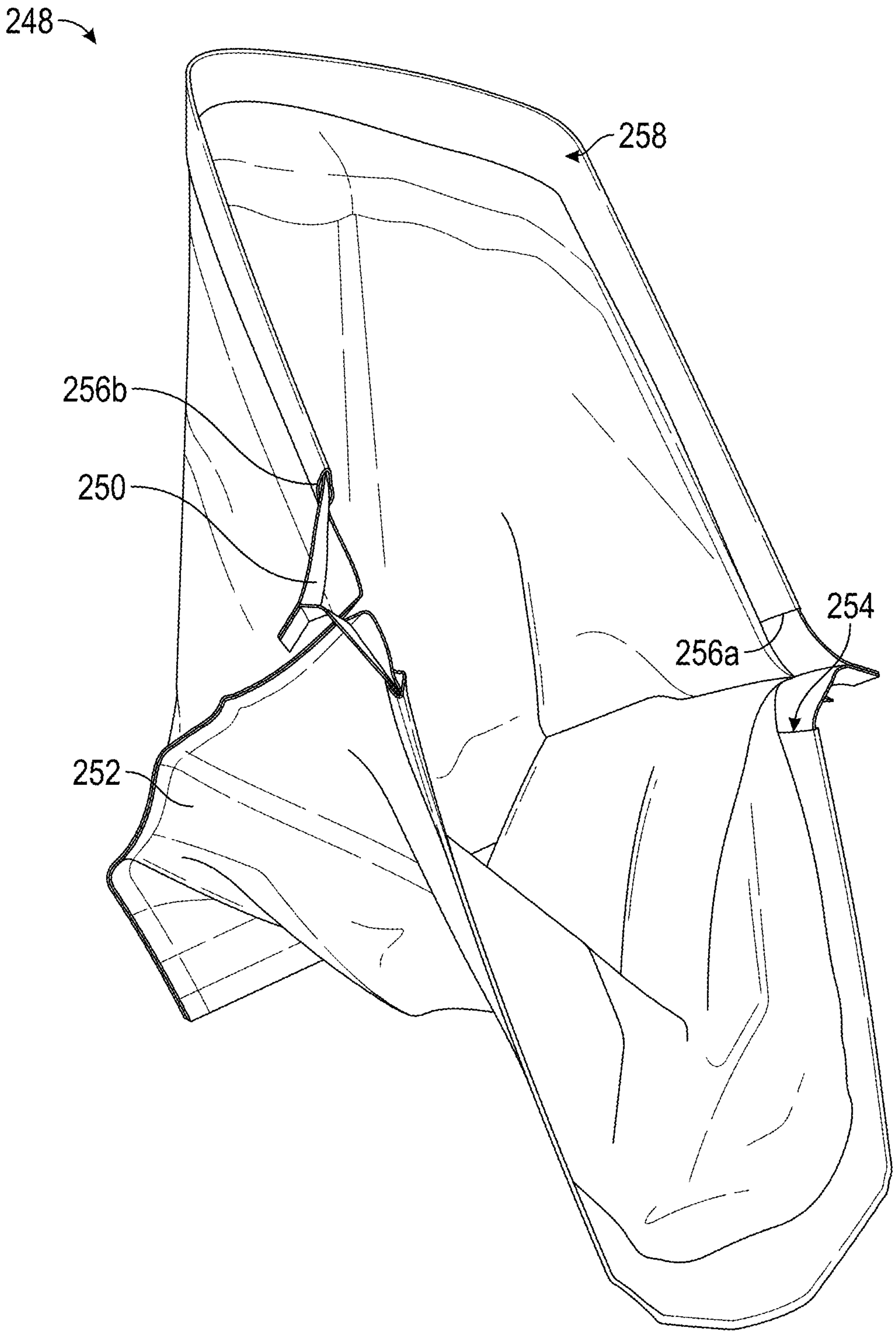
FIG. 16C illustrates a top view of some embodiments of the disposal bag for use with the refuse container.

The bag support 138 may be removable from the refuse container 100, such that a user may remove the bag support 138 to place a disposal bag (as shown in FIG. 16A-16C) thereon during bag replacement, as discussed further herein. In some embodiments, bag support 138 may fixedly couple to the door support 140. In some embodiments, at least a portion of the door support 140 may contact trim cover 124 when the trim cover 124 is closed. In some embodiments, at least a portion of bag support 138 may contact the trim cover 124 when the trim cover 124 is closed. The bag support 138 may be positioned on a portion of the door support 140 when placed inside the refuse container 100. The odor-blocking doors 110*a*, 110*b* may operatively couple to the door support 140 of the door mount subassembly 116. In some embodiments, the odor-blocking doors 110*a*, 110*b* may rotatably couple to door support 140. The door support 140 may couple to the support mount 142. A switch 144 may be positioned within a slot 146 of support mount 142. Switch 144, slot 146, and support mount 142 may form part of a manual door subassembly 148, as discussed further herein.

As shown in FIG. 3, the refuse container 100 also comprises an inner wall 150 and bottom 152. The inner wall 150 and bottom 152 may form part of housing 102. The housing 102 may comprise inner wall 150 and bottom 152, as well as rear panel 120 and front panel 118. In some embodiments, the housing 102 may define a second receiving chamber 154. The inner wall 150 may couple to bottom 152. Bottom 152 may form the bottom of the second receiving chamber 154. The inner wall 150 may form sides of the second receiving chamber 154, and inner wall 150 may fully define the second receiving chamber 154 with the front panel 118 when the front panel 118 is closed onto the rear panel 120. The second receiving chamber 154 may have a depth $H_1$. The inner wall 150 may be coupled to the bottom 152 using fasteners, such as screws, bolts, snaps, adhesives, or any other type of fastener.

Figure 4:
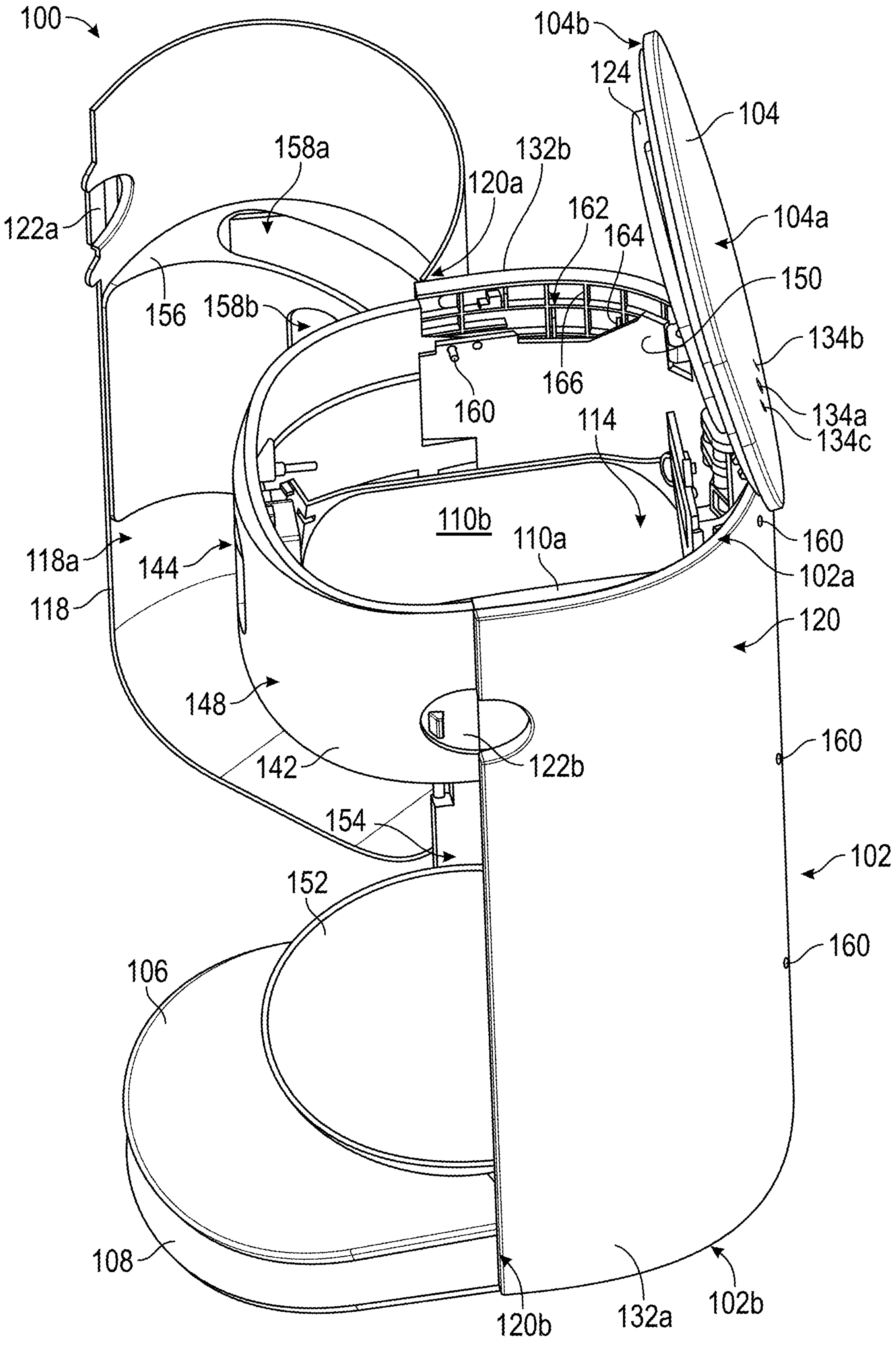
FIG. 4 illustrates a right side perspective view of some embodiments of the refuse container with the trim cover and lid opened in the upward position, the front panel opened, and a door support and a bag support of the refuse container removed.
Figure 5:
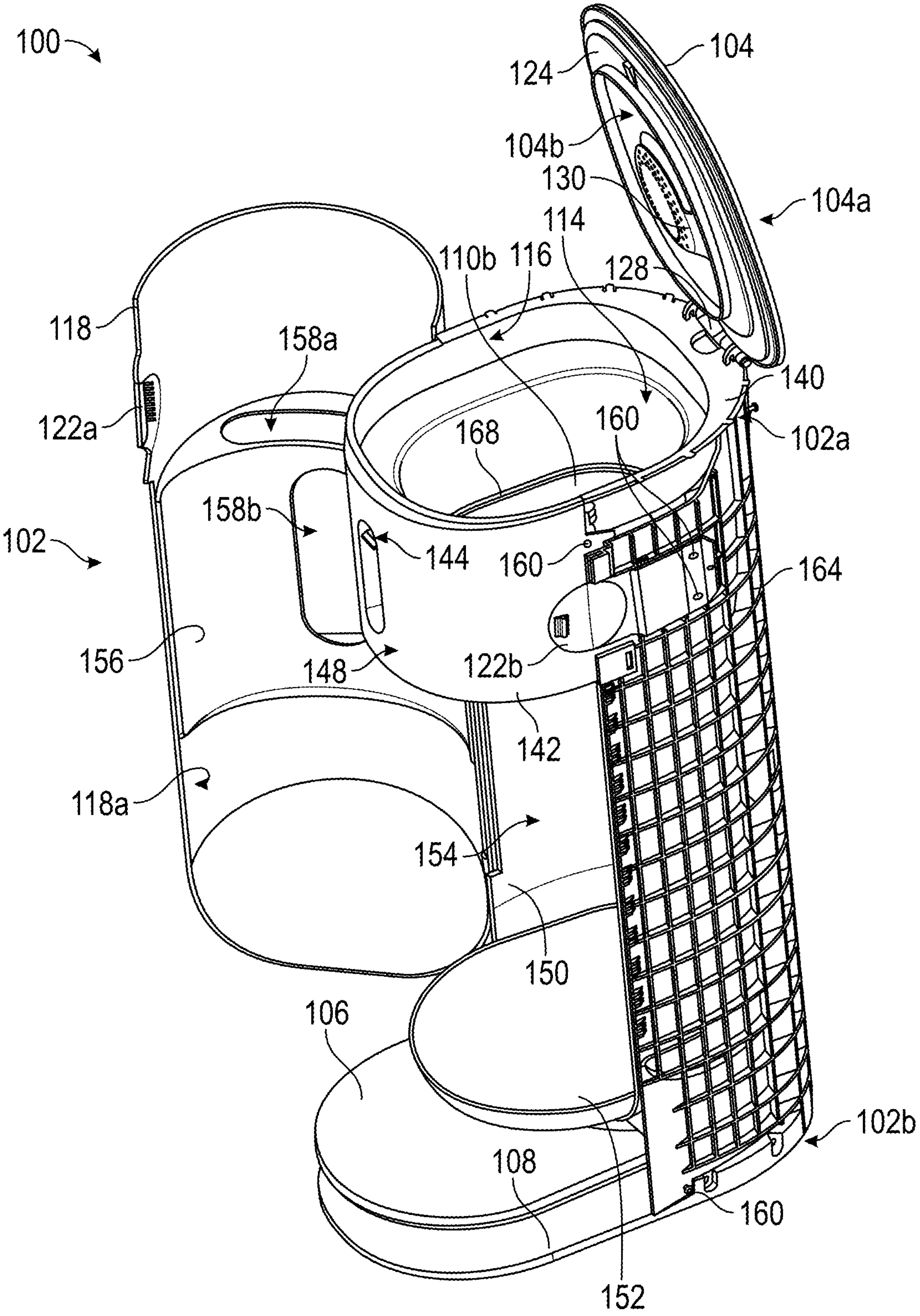
FIG. 5 illustrates a right side perspective view of some embodiments of the refuse container, with the trim cover and lid opened in the upward position, the front panel opened, and the bag support and a rear panel of the refuse container removed.

The support mount 142 may couple to the housing 102. For example, support mount 142 may couple to inner wall 150 of housing 102. The inner wall 150 may couple to the support mount 142 via a fastener (as shown in FIG. 4). The fastener may be any form of fastener, including a screw, bolt, rod, pin, adhesives, snaps, etc. The door support 140 may also couple to the housing 102. For example, door support 140 may couple to inner wall 150 of housing 102. The inner wall 150 may couple to the door support 140 using a fastener (as shown in FIG. 5). In some embodiments, the odor-blocking doors 110*a*, 110*b* may rotatably couple to the door support 140, thereby mounting the odor-blocking doors 110*a*, 110*b* to housing 102 via door mount subassembly 116.

In some embodiments, the latch 122 may comprise a first portion 122*a* and a second portion 122*b*. The first portion 122*a* may be comprised on the front panel 118 and the second portion 122*b* may be attached to the housing 102. For example, the second portion 122*b* may be attached to inner wall 150 of housing 102. The second portion 122*b* may couple to the inner wall 150 using fasteners (as shown in FIG. 5). The first portion 122*a* may mate with the second portion 122*b* to lock the latch 122 and close the front panel 118 onto the rear panel 120. The first portion 122*a* may disengage from second portion 122*b* to unlatch latch 122 and open front panel 118 away from rear panel 120, thereby opening housing 102, as shown in FIG. 3. The second portion 122*b* may extend onto the support mount 142 from second side 120*b* of rear panel 120.

Figure 35:
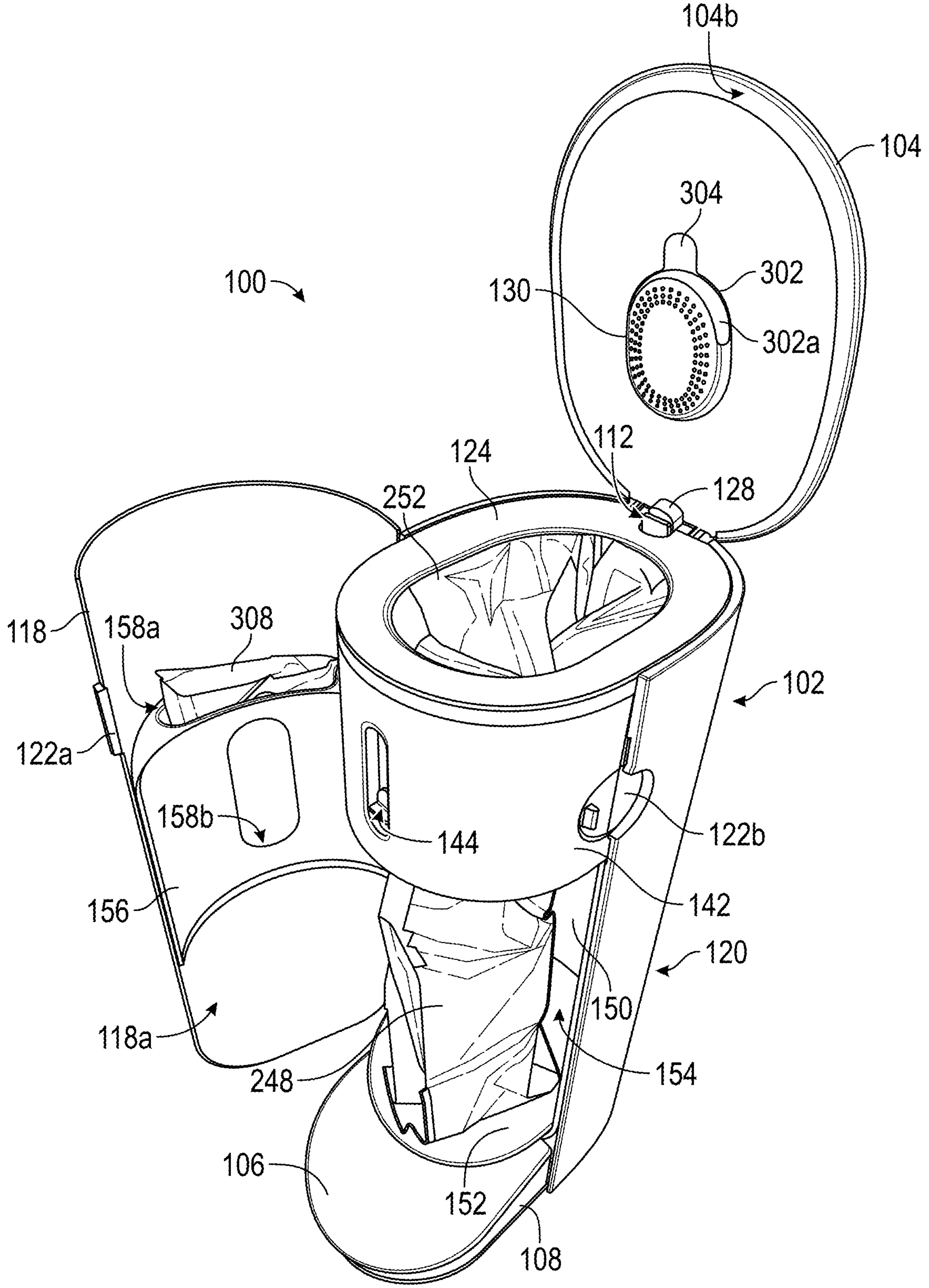
FIG. 35 illustrates some embodiments of components of a refuse container system.

Refuse container 100 may comprise a storage compartment 156. Storage compartment 156 may couple to housing 102. In some embodiments, storage compartment 156 may couple to an interior 118*a* of the front panel 118. The storage compartment 156 may have a first compartment aperture 158*a* and a second compartment aperture 158*b*. The storage compartment 156 may receive a disposal bag package (as shown in FIG. 35). The first compartment aperture 158*a* may receive a disposal bag package (as shown in FIG. 35). A disposal bag (as shown in FIG. 16A-16C) may be fed through the second compartment aperture 158*b* for use as a replacement bag when a user is performing bag replacement, as discussed further herein.

FIG. 4 illustrates a right side perspective view of some embodiments of the refuse container 100 with the trim cover 124 and lid 104 opened in the upward position, with the front panel 118 opened and the door support 140 and bag support 138 removed for clarity of internal components. Inner wall 150 may couple to the rear panel 120. The inner wall 150 may couple to the rear panel 120 using fasteners 160, as shown in FIG. 4. Fasteners 160 may be any type of fastener, such as bolts, screws, pins, rods, adhesive, snaps, etc. The inner wall 150 may be spaced apart from the rear panel 120 to form a space 162. The inner wall 150 may comprise ribbing 164 to increase the structural integrity of the refuse container 100. The rear panel 120 may also comprise ribbing 166 to increase structural integrity of the refuse container 100. The inner wall 150 may extend around an interior of the rear panel 120. Inner wall 150 may couple to support mount 142 via fasteners, such as a fastener 160, as shown in FIG. 4.

Figure 15A:
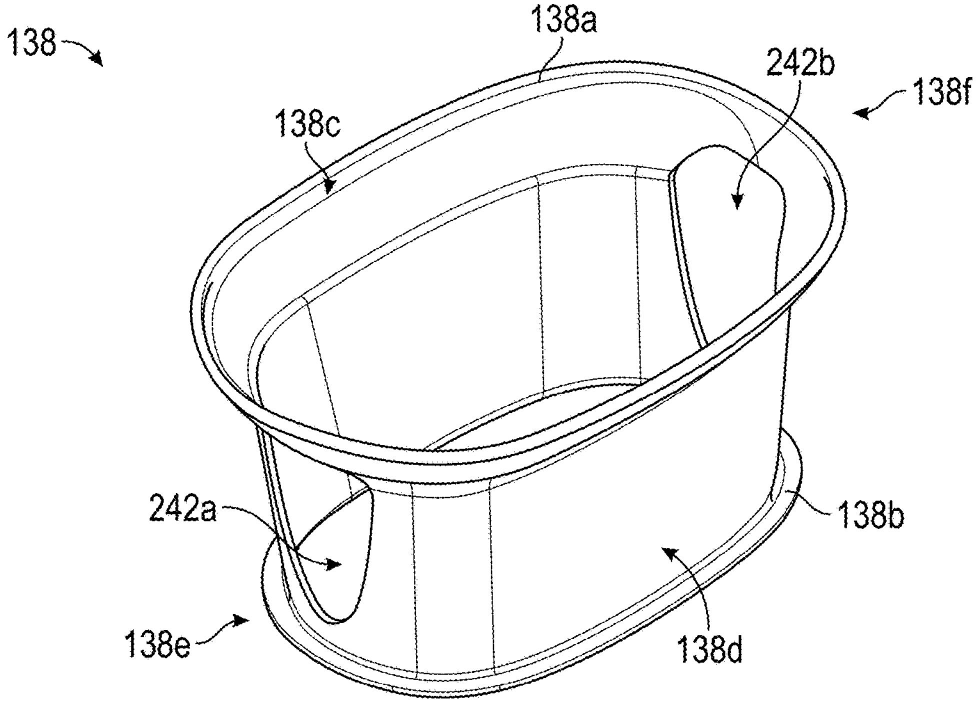
FIG. 15A illustrates a front perspective view of some embodiments of the bag support of the refuse container.
Figure 15B:
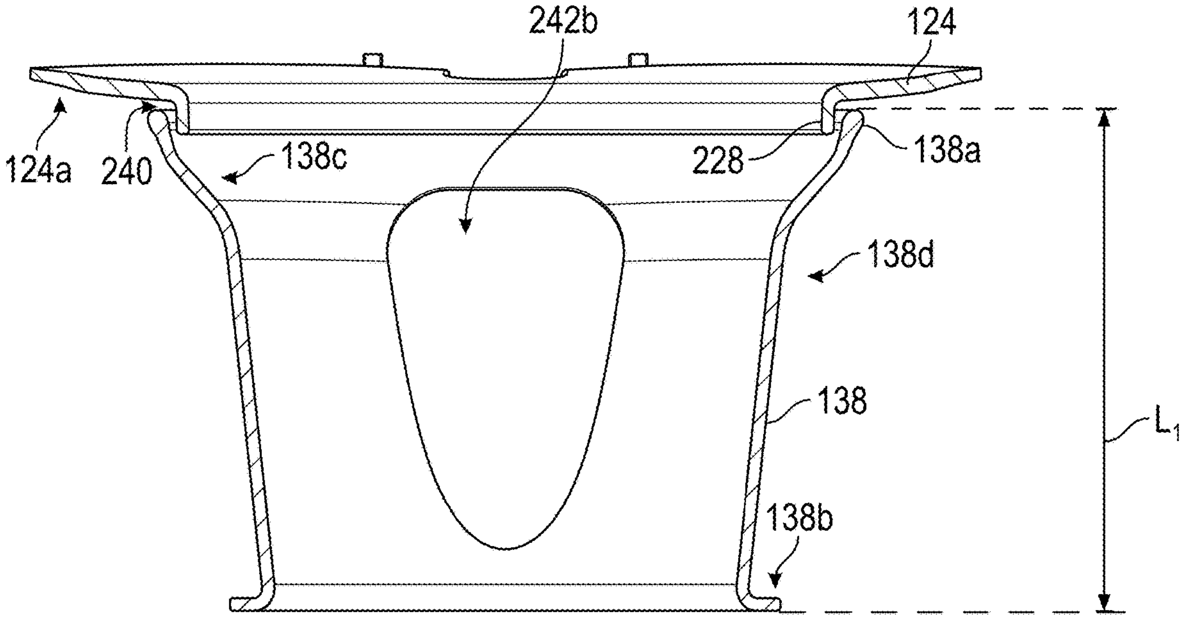
FIG. 15B illustrates a cross-sectional view of some embodiments of the trim cover and the bag support of the refuse container, with the trim cover closed in the down position.

FIG. 5 illustrates a right side perspective view of some embodiments of the refuse container 100, with the trim cover 124 and lid 104 opened in the upward position, and the rear panel 120 and bag support 138 removed for clarity of internal components. The second portion 122*b* of latch 122 may couple to the inner wall 150 using fasteners 160, as shown in FIG. 5. The inner wall 150 may couple to the base 108, as shown in FIG. 5. For example, the inner wall 150 may couple to the base 108 through fasteners, such as fastener 160. The inner wall 150 may couple to the door support 140 using fasteners, such as fastener 160. The door support 140 may extend along the top 102*a* of the housing 102. The door support 140 comprises a rim 168 that receives a bottom edge (as shown in FIGS. 15A-15B) of the bag support 138 when the bag support 138 is placed in the refuse container 100, to maintain the bag support 138 proximate the top 102*a* of the housing 102.

FIG. 6 illustrates a back perspective view of some embodiments of the refuse container 100 with the lid 104 closed in the down position and the front panel 118 closed, with the rear panel 120 removed for clarity of certain internal components. Refuse container 100 may comprise a lid support 170 coupled to inner wall 150. Lid support 170 may couple to inner wall 150 using fasteners 160. Lid support 170 may form part of housing 102 with the front panel 118, rear panel 120, bottom 152, and inner wall 150. Lid 104 may hingedly couple to lid support 170, such that lid 104 hingedly couples to housing 102. Lid support 170 may couple to door support 140 using fasteners 160.

Refuse container 100 may comprise an automatic door subassembly 112 (also referred to as an automatic odor-blocking door subassembly). The automatic door subassembly 112 may comprise a beam 172 and dampers 174. In some embodiments, the automatic door subassembly 112 may also comprise at least one spring. In some embodiments, automatic door subassembly may comprise a first spring 176*a*, a second spring 176*b*, and a third spring 176*c*. The automatic door subassembly 112 may pivotally couple to the actuator 106. For example, in some embodiments, beam 172 may pivotally couple to the actuator 106. The automatic door subassembly 112 pivotally couples to the actuator 106 via any fastener. For example, the automatic door subassembly 112 may operatively couple to the actuator 106 via a rod 178. The beam 172 (also referred to as a translatable member) may operatively couple to the inner wall 150 using fasteners 180. Fasteners 180 may be screws, bolts, pins, rods, or any other form of fastener. In some embodiments, the beam 172 may slidably couple to the inner wall 150 using any form of fastener, such as fasteners 180, as discussed further. The beam 172 may fit within a channel 181 formed by inner wall 150. Beam 172 may comprise a beam cap 182, forming part of the automatic door subassembly 112. As shown in FIG. 6, dampers 174 may attach to inner wall 150 using fasteners 160.

Figure 19A:
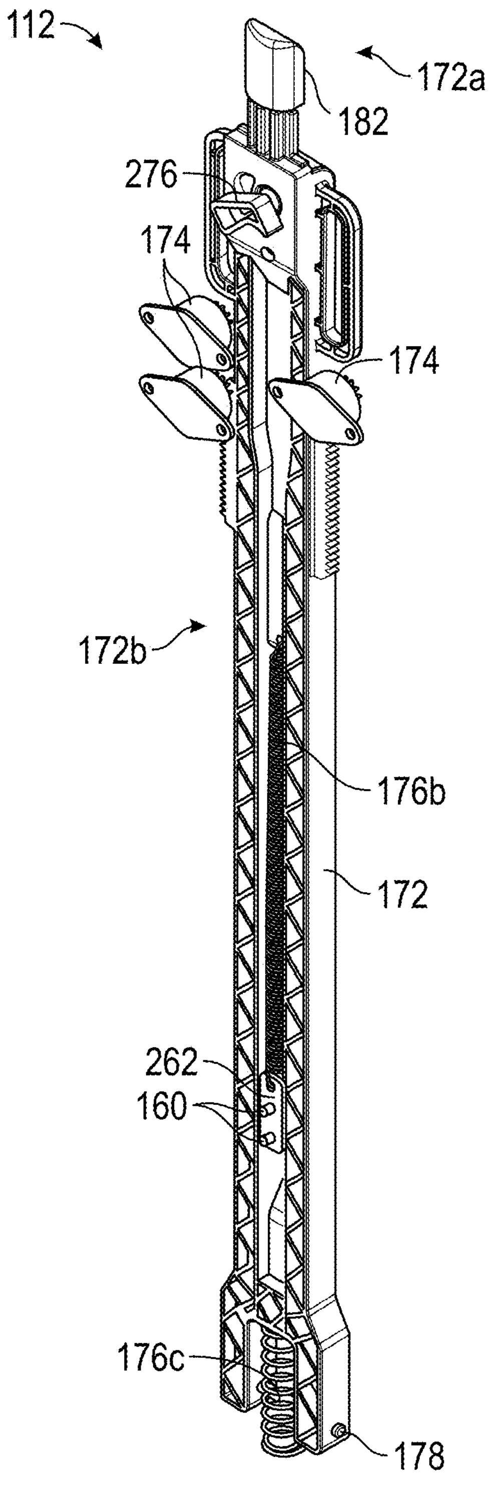
FIG. 19A illustrates a front perspective view of some embodiments of an automatic door subassembly of the refuse container.
Figure 19B:
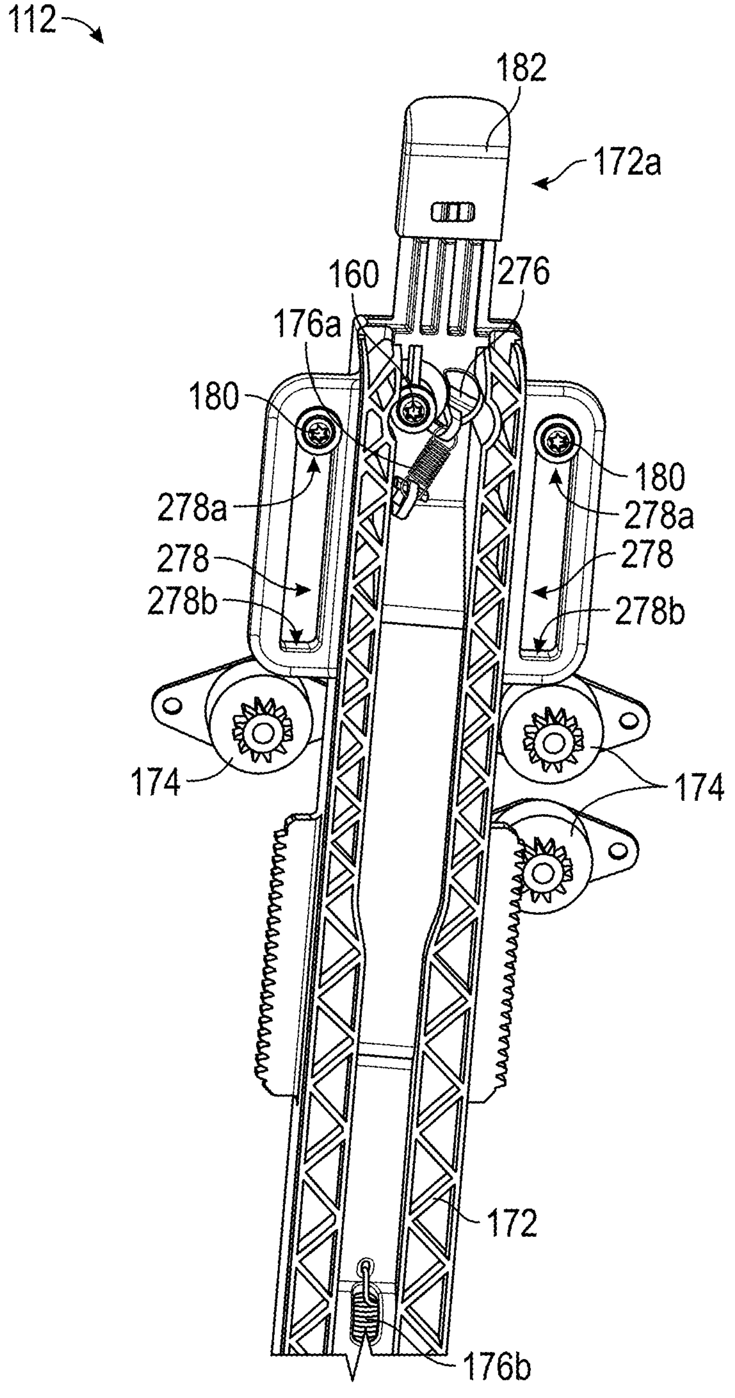
FIG. 19B illustrates a rear close-up view of some embodiments of the automatic door subassembly of the refuse container.

When a user actuates the actuator 106, the automatic door subassembly 112 may cause the lid 104 to open, lid 104 to close, and odor-blocking doors 110*a*, 110*b* to open when the lid 104 is closed. For example, in some embodiments, a user may press actuator 106 to move the beam 172 toward the lid 104 such that the beam 172 pushes the lid 104 open to an upward position. As the beam 172 moves toward the lid 104, spring 176*b* coupled to the beam 172 may become loaded. In some embodiments, when actuator 106 is released, the automatic door subassembly 112 may cause the lid 104 to close. For example, the loaded spring 176*b* may bias the beam 172 downward to move away from lid 104 to thereby close the lid 104. Once the lid is closed and as the beam 172 moves away from the lid 104, a beam lever (as shown in FIGS. 19A-19B) coupled to beam 172 may interact with a portion of one of the odor-blocking doors 110*a*, 110*b* to thereby transition the doors 110*a*, 110*b* from the closed configuration to the open configuration, as discussed further herein.

Door Mount Subassembly

Figure 7A:
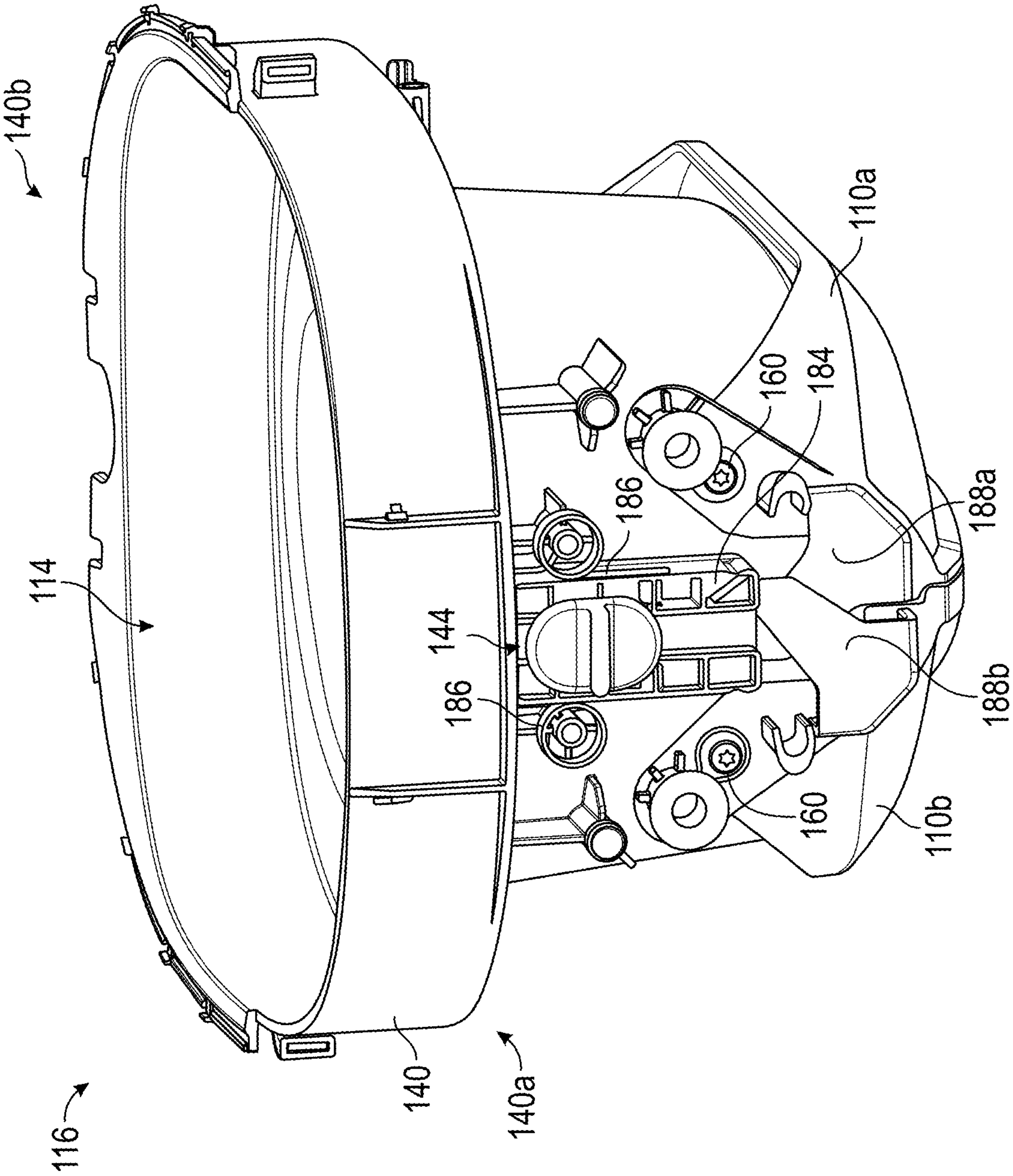
FIG. 7A illustrates a front perspective view of some embodiments of a door mount subassembly of the refuse container, with a support mount of the door mount subassembly removed.
Figure 7B:
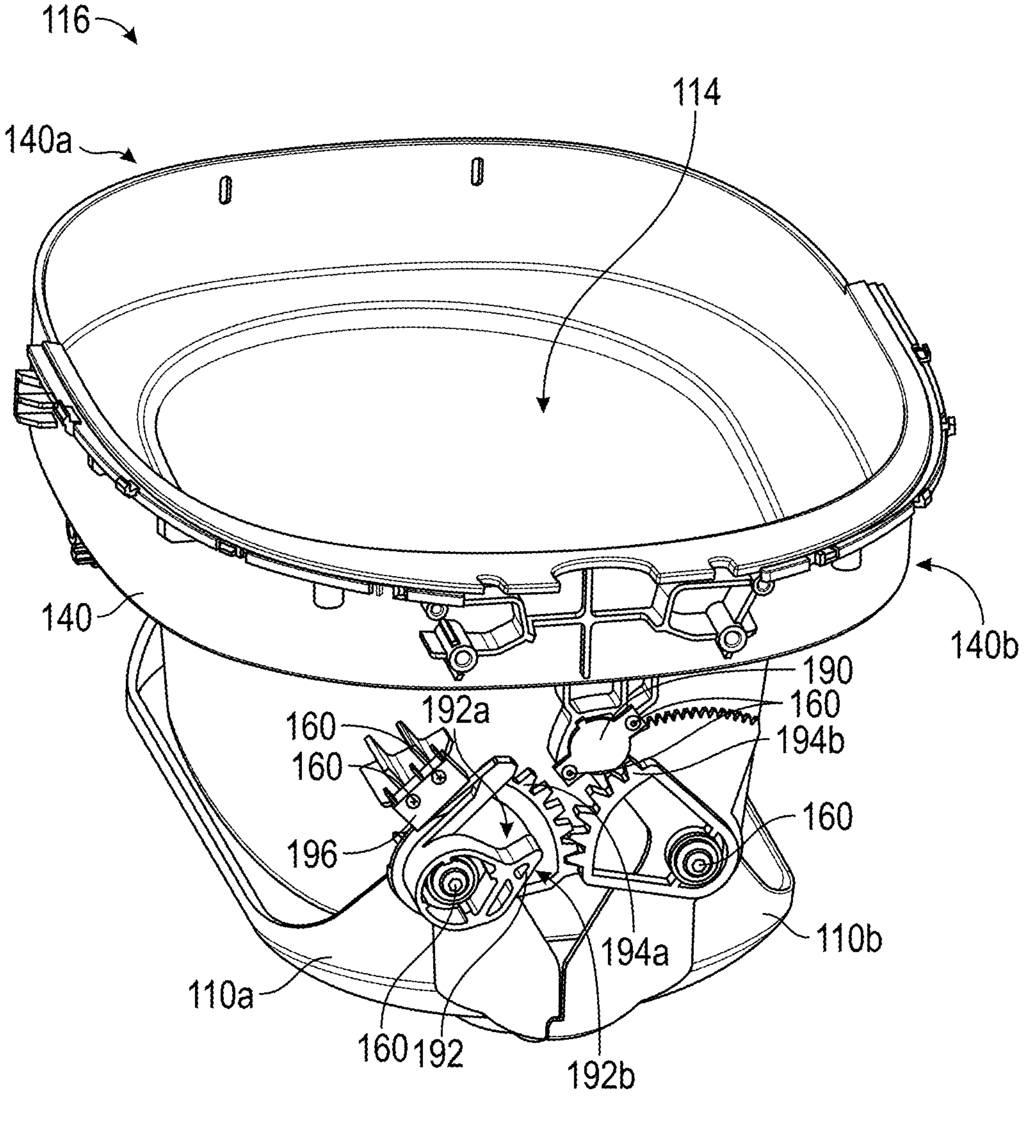
FIG. 7B illustrates a back perspective view of some embodiments of the door mount subassembly of the refuse container, with the support mount removed.

FIG. 7A illustrates a front perspective view of some embodiments of the door mount subassembly 116 of refuse container 100, with the support mount 142 of the door mount subassembly 116 removed for clarity of certain internal components. FIG. 7B illustrates a back perspective view of some embodiments of the door mount subassembly 116 of refuse container 100, with the support mount 142 removed for clarity of certain internal components. Accordingly, FIGS. 7A-7B are best viewed together. The door mount subassembly 116 may include door support 140, support mount 142, and odor-blocking doors 110*a*, 110*b*.

Figure 8:
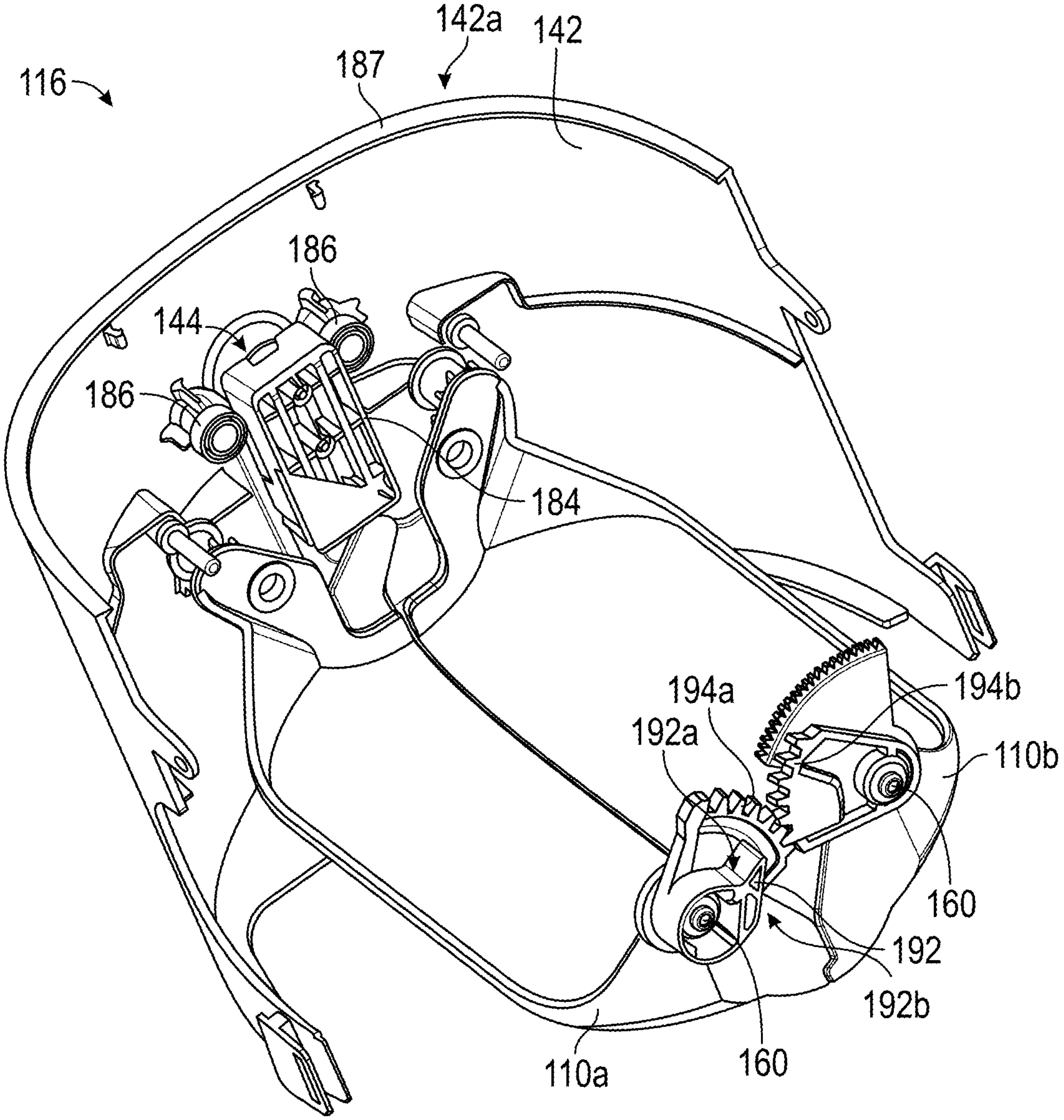
FIG. 8 illustrates a top perspective view of some embodiments of the door mount subassembly of the refuse container, with the door support removed.

As shown in FIG. 3, support mount 142 may define a slot 146. Slot 146 may receive switch 144, such that a user may interact with switch 144. In some embodiments, slot 146 may receive at least a portion of switch 144, such that a user may interact with switch 144 to manually open and close the odor-blocking doors 110*a*, 110*b*. As shown in FIG. 7A, switch 144 may comprise a slider 184. Switch springs 186 may operatively couple switch 144 to the support mount 142 (as shown in FIG. 8). The switch 144, support mount 142, and switch springs 186 may form the manual door subassembly 148.

The odor-blocking doors 110*a*, 110*b* may be operatively coupled to the door support 140 using fasteners 160. In some embodiments, odor-blocking doors 110*a*, 110*b* rotatably couple to the door support 140, such that odor-blocking doors 110*a*, 110*b* may rotate about door support 140 between a closed configuration and open configuration. In some embodiments, odor-blocking doors 110*a*, 110*b* may rotate about fasteners 160 rotatably coupling doors 110*a*, 110*b* to door support 140 when automatic door subassembly 112 contacts odor-blocking doors 110*a*, 110*b*, as discussed further herein. The odor-blocking doors 110*a*, 110*b* may mount to the housing 102 via door mount subassembly 116, which may comprise door support 140. Door support 140 may define a front side 140*a* and a rear side 140*b*. Doors 110*a*, 110*b* may rotatably couple to front side 140*a* of door support 140.

The odor-blocking doors 110*a*, 110*b* may each comprise extensions 188*a*, 188*b*. Extensions 188*a*, 188*b* may slide along surfaces of switch 144 when switch 144 is moved between a first position and second position, to thereby transition the odor-blocking doors 110*a*, 110*b* between the open configuration and closed configuration. In some embodiments, extensions 188*a*, 188*b* may slide along surfaces of slider 184 when switch 144 is moved between a first position and second position, to thereby transition the odor-blocking doors 110*a*, 110*b* between the open configuration and closed configuration, as discussed further herein.

As shown in FIG. 7B, odor-blocking doors 110*a*, 110*b* may also couple to a rear side 140*b* of door support 140 using fasteners 160. In some embodiments, odor-blocking doors 110*a*, 110*b* may rotatably couple to the front side 140*a* and rear side 140*b* of door support 140 to allow the doors 110*a*, 110*b* to rotate between the closed configuration and the open configuration. A door damper 190 may couple to the door support 140 using fasteners 160, and interact with at least a portion of one of the odor-blocking doors 110*a*, 110*b* to control the movement of the doors 110*a*, 110*b* from the open configuration to the closed configuration. In some embodiments, the door damper 190 may interact with a portion of the second odor-blocking door 110*b* to control the movement of the doors 110*a*, 110*b* from the open configuration to the closed configuration. The door damper 190 may keep the doors 110*a*, 110*b* from slamming shut to the closed configuration. Door damper 190 may mechanically engage at least a portion of one of the odor-blocking doors 110*a*, 110*b* when the doors 110*a*, 110*b* rotate to keep the doors 110*a*, 110*b* from slamming shut.

At least one of the doors 110*a*, 110*b* may comprise a door lever 192. For example, a first door 110*a* may comprise a door lever 192. The automatic door subassembly 112 may interact with the door lever 192 to transition the odor-blocking doors 110*a*, 110*b* from the closed configuration to the open configuration, as further discussed herein. For example, the automatic door subassembly 112 may contact the door lever 192 such that the door lever 192 rotates the odor-blocking doors 110*a*, 110*b* from the closed configuration to the open configuration, as further discussed herein. Door lever 192 may define a top 192*a* and a bottom 192*b*.

In some embodiments, door lever 192 may be received in a curved slot of one of the odor-blocking doors 110*a*, 110*b*. The door lever 192 may travel within the curved slot when automatic door subassembly 112 contacts door lever 192 to thereby cause the doors 110*a*, 110*b* to rotate from the closed configuration to the open configuration. In some embodiments, rotation of the door lever 192 within the curved slot may cause the doors 110*a*, 110*b* to rotate between the open configuration and the closed configuration.

In some embodiments, the refuse container 100 may comprise at least one odor-blocking door 110*a*, 110*b*. In some embodiments, the refuse container may comprise two odor-blocking doors, such as a first odor-blocking door 110*a* and a second odor-blocking door 110*b*. The doors 110*a*, 110*b* may define the first receiving chamber 114 (also referred to as an antechamber) when in the closed configuration. As shown in FIG. 3, the first receiving chamber 114 may be positioned within the second receiving chamber 154 (also referred to as a chamber). The closed configuration may keep odors from malodorous disposed material in the second receiving chamber 154 from reaching the user during refuse disposal. The doors 110*a*, 110*b* may cover the second receiving chamber 154 to block odors of previously disposed material from reaching the user when the user is disposing of refuse.

The odor-blocking doors 110*a*, 110*b* may interact with one another such that both doors 110*a*, 110*b* open and close simultaneously. As shown in FIG. 7B, each door 110*a*, 110*b* may comprise a toothed portion 194*a*, 194*b*. The toothed portions 194*a*, 194*b* may interconnect with one another, such that movement of the first door 110*a* or second door 110*b* simultaneously moves the other door. The toothed portions 194*a*, 194*b* may interconnect with one another, causing the odor-blocking doors 110*a*, 110*b* to simultaneously open when the door lever 192 moves to open one of the odor-blocking doors 110*a*, 110*b*. For example, when the door lever 192 is comprised in the first door 110*a* and is contacted by the automatic door subassembly 112, the toothed portion 194*a* of the first door 110*a* may cause the toothed portion 194*b* of the second door 110*b* to move, thereby simultaneously pivoting the second door 110*b* with the first door 110*a* to the open configuration. In some embodiments, the toothed portion 194*a* of the first door 110*a* may rotate when the door lever 192 is moved and cause the toothed portion 194*b* of the second door 110*b* to simultaneously rotate, such that the second door 110*b* and first door 110*a* simultaneously pivot from the closed configuration to the open configuration. The toothed portions 194*a*, 194*b* may also cause the odor-blocking doors to simultaneously move from the open configuration back to the closed configuration. The toothed portions 194*a*, 194*b* may link the doors 110*a*, 110*b* to provide simultaneous rotation of the odor-blocking doors 110*a*, 110*b*. The toothed portion 194*a* on the first door 110*a* may mechanically engage toothed portion 194*b* on the second door 110*b* when the door lever 192 rotates, thereby causing the first door 110*a* to drive simultaneous rotation of the second door 110*b* or the second door 110*b* to drive simultaneous rotation of the first door 110*a*.

Figure 12:
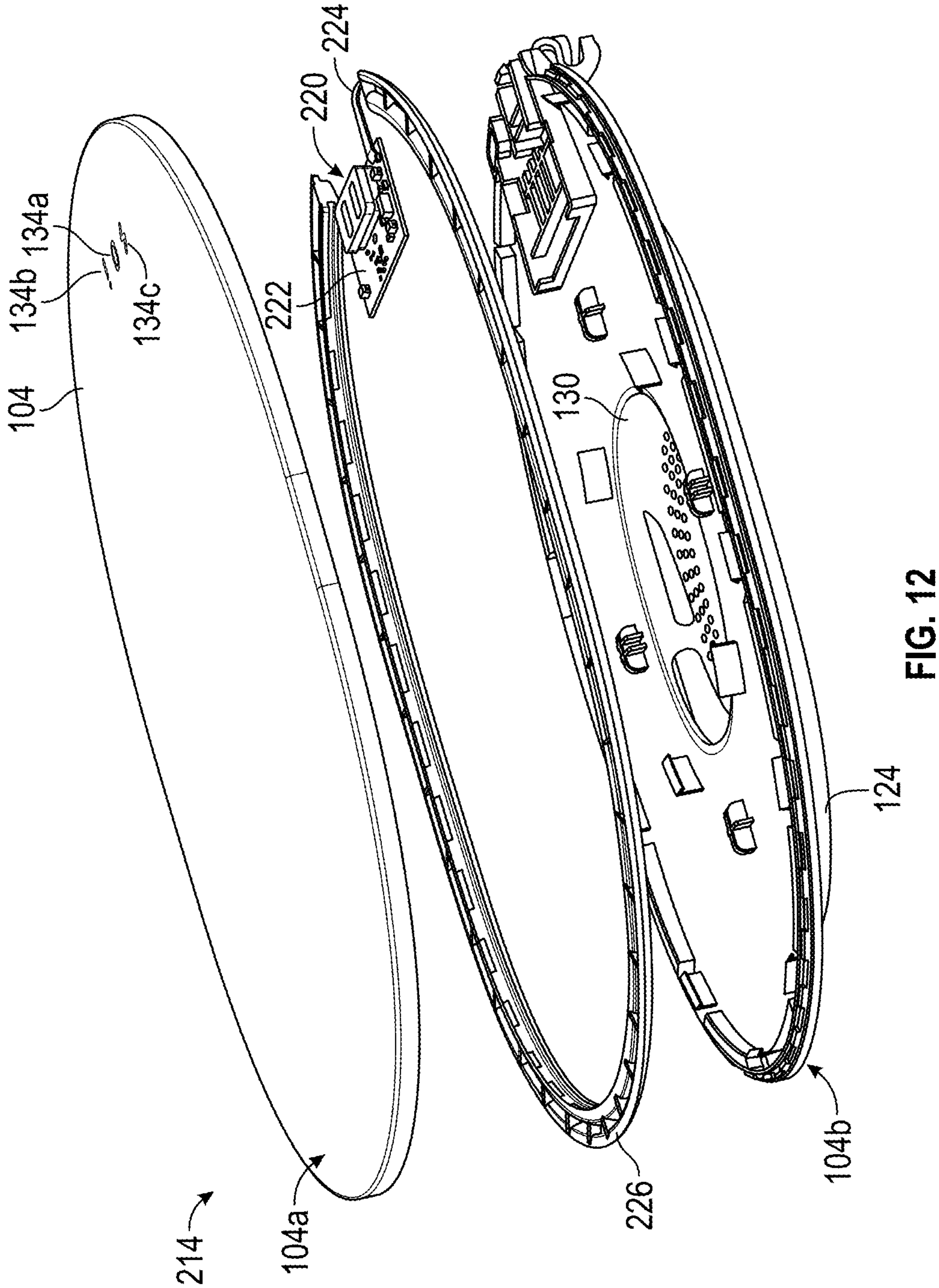
FIG. 12 illustrates a right side perspective view of some embodiments of the lid subassembly of the refuse container, with the lid in an exploded view and a lid support removed.

As shown in FIG. 7B, an indicator sensor 196 may couple to the rear side 140*b* of the door support 140 via fasteners 160. The indicator sensor 196 may be a limit switch. The indicator sensor 196 may contact at least a portion of one of the odor-blocking doors 110*a*, 110*b* when the doors 110*a*, 110*b* are in the closed configuration. For example, the indicator sensor 196 may contact the toothed portion 194*a*, 194*b* of one of the odor-blocking doors 110*a*, 110*b*. The indicator sensor 196 may electrically connect to a PCBA (as shown in FIG. 12) to control operation of the indicators 134*a*, 134*b*, 134*c*. When the odor-blocking doors 110*a*, 110*b* bias back from the open configuration to the closed configuration, one of the odor-blocking doors 110*a*, 110*b* may contact the indicator sensor 196. When indicator sensor 196 is contacted by one of the odor-blocking doors 110*a*, 110*b*, indicator sensor 196 may send a signal to PCBA that doors 110*a*, 110*b* successfully closed. If the indicator sensor 196 is not contacted by doors 110*a*, 110*b* for a certain period time, the indicator sensor 196 may send a signal to the PCBA indicating an error has occurred. The PCBA may then send a signal to one of the indicators 134*a*, 134*b*, 134*c* to indicate to the user an error has occurred, as discussed further herein.

In some embodiments, indicator sensor 196 may be a motion sensor. When the indicator sensor 196 detects refuse dropping from the first receiving chamber 114 into the second receiving chamber 154 through the opened odor-blocking doors 110*a*, 110*b*, the indicator sensor 196 may cause one of the indicators 134*a*, 134*b*, 134*c* to indicate to the user the refuse successfully dropped and doors 110*a*, 110*b* successfully closed, as discussed further herein. When the indicator sensor 196 does not detect refuse dropping from the first receiving chamber 114 into the second receiving chamber 154 after a certain time period, the indicator sensor 196 may cause one of the indicators 134*a*, 134*b*, 134*c* to indicate to the user the refuse container 100 is in an error state, as further discussed herein.

FIG. 8 illustrates a top perspective view of some embodiments of the door mount subassembly 116 of refuse container 100, with door support 140 removed for clarity of certain internal components. The switch springs 186 may couple to support mount 142, thereby coupling the switch 144 to support mount 142. Switch springs 186 may operatively couple slider 184 of switch 144 to support mount 142. The switch springs 186 may be constant force springs that wrap around portions of the support mount 142, as shown in FIG. 8. The switch springs 186 may provide a constant force as the switch springs 186 extend when the switch 144 moves from the first position to the second position (as shown in FIG. 26B) to manually open the odor-blocking doors 110*a*, 110*b*. When the switch 144 is moved to close the doors 110*a*, 110*b* from the open configuration, the switch springs 186 may bias the doors 110*a*, 110*b* back to the closed configuration, as discussed further herein. Support mount 142 may define a lip 187. Lip 187 may extend around a top 142*a* of support mount 142.

Figure 9A:
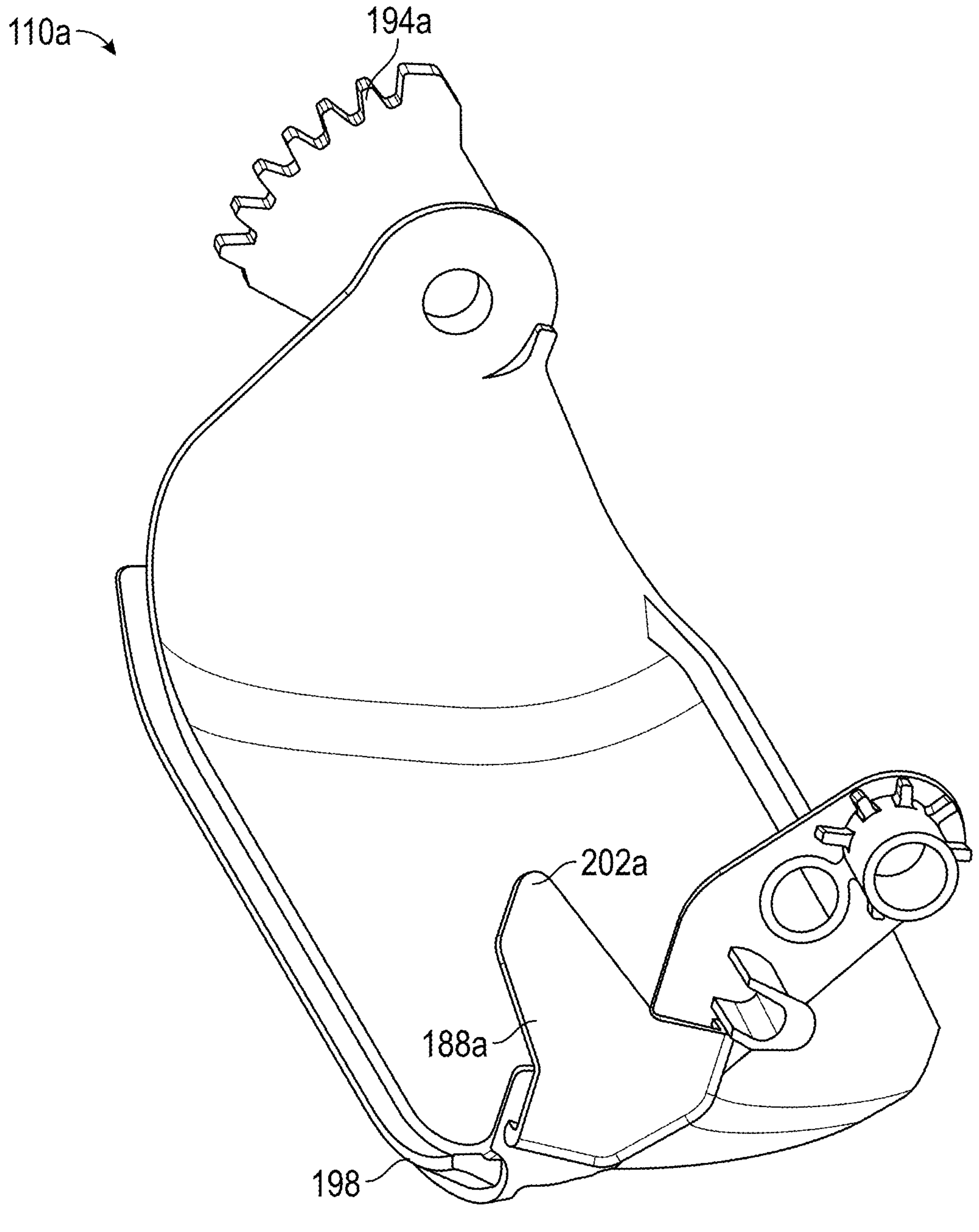
FIG. 9A illustrates a front perspective view of some embodiments of a first odor-blocking door of the refuse container.
Figure 9B:
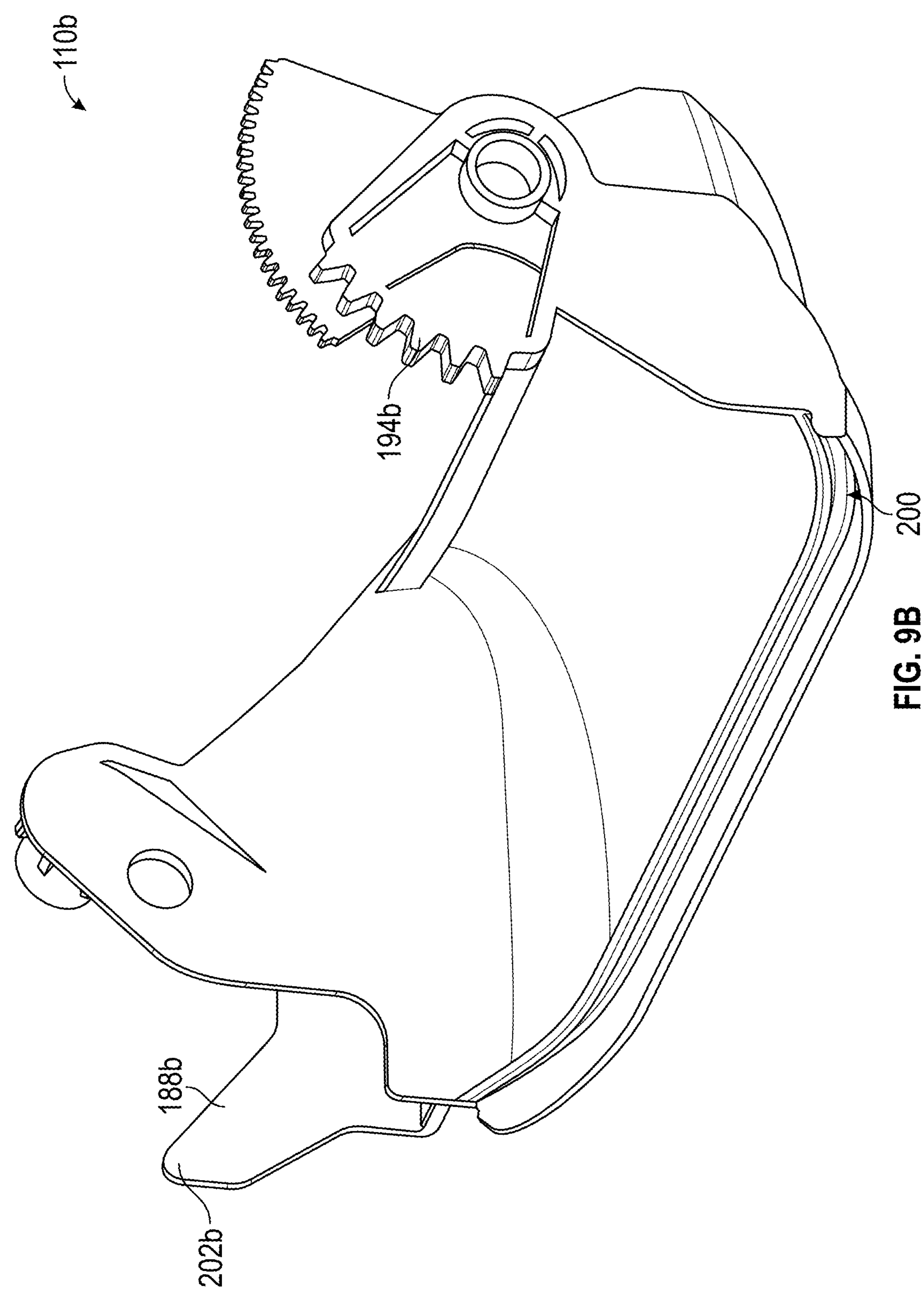
FIG. 9B illustrates a back perspective view of some embodiments of a second odor-blocking door of the refuse container.

FIG. 9A illustrates a front perspective view of some embodiments of a first odor-blocking door 110*a* of refuse container 100. FIG. 9B illustrates a back perspective view of some embodiments of a second odor-blocking door 110*b* of refuse container 100. Accordingly, FIGS. 9A-9B are best viewed together. The first door 110*a* and the second door 110*b* may comprise mating geometry. The first door 110*a* may mate with the second door 110*b* to block the odor of previously disposed materials from escaping into the first receiving chamber 114. The first door 110*a* may mate with the second door 110*b* to define the first receiving chamber 114. The mating geometry may comprise grooves and projections. For example, the first door 110*a* may comprise at least one projection 198 and the second door 110*b* may define at least one groove 200. The groove 200 may receive the projection 198 when the odor-blocking doors 110*a*, 110*b* are in the closed configuration, such that odor from the second receiving chamber 154 does not escape into the first receiving chamber 114. In some embodiments, the mating of the groove 200 and projection 198 may slow the leakage of malodorous air from the second receiving chamber 154 into the first receiving chamber 114. The projection 198 may comprise a compliant tip at the end of the projection 198 where the projection mates with the groove 200. The groove 200 may be rigid, such that compliant tips on the end of projection 198 press tightly onto groove 200 when the odor-blocking doors 110*a*, 110*b* are in the closed configuration. The compliant tip may tighten the fit between the projection 198 and the groove 200 when the odor-blocking doors 110*a*, 110*b* are in the closed configuration, thereby increasing odor blockage. In some embodiments, the projection 198 and groove 200 may be formed from a compliant material. The projection 198 may be generally triangularly shaped, square-shaped, or arcuately shaped and groove 200 may be shaped to fit around the projection 198. The projection 198 may contact all sides of the groove 200 when the odor-blocking doors 110*a*, 110*b* are in the closed configuration. The projection 198 may contact only a portion of the groove 200.

Figure 25:
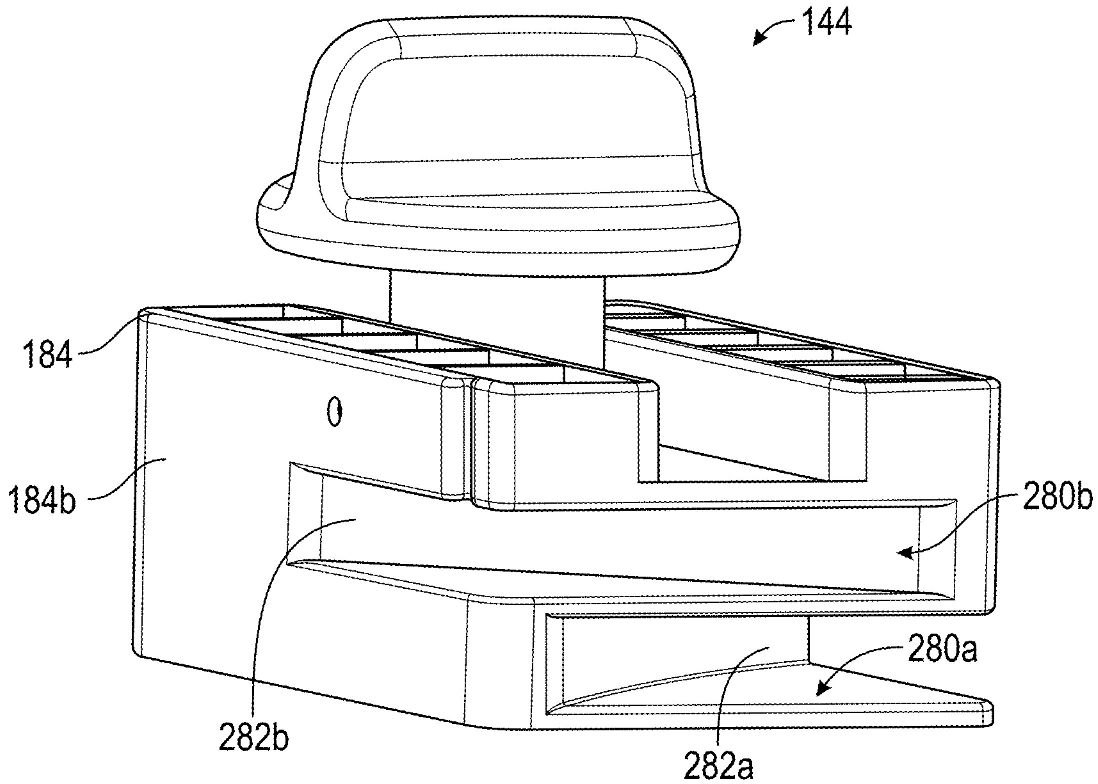
FIG. 25 illustrates a bottom perspective view of some embodiments of a switch of the manual door subassembly of the refuse container.

As shown in FIGS. 9A-9B, each odor-blocking door 110*a*, 110*b* comprises an extension 188*a*, 188*b*. At least a portion of each extension 188*a*, 188*b*, may contact and move along surfaces in the slider 184 (as shown in FIG. 25) of switch 144 to cause the odor-blocking doors to manually open, as discussed further herein. Extensions 188*a*, 188*b* may comprise tips 202*a*, 202*b*, as shown in FIGS. 9A-9B. When the doors 110*a*, 110*b* are in the closed configuration and the switch 144 is in a first position (see FIG. 7A), tips 202*a*, 202*b* of the extensions 188*a*, 188*b* may extend into the slider 184. The tips 202*a*, 202*b* may contact surfaces (as shown in FIG. 25) of slider 184 when the switch 144 is in the first position and the doors 110*a*, 110*b* are in the closed configuration.

In some embodiments, the odor-blocking doors 110*a*, 110*b* may be arcuately shaped such that the volume of the first receiving chamber 114 accommodates a large amount of disposed material. In some embodiments, the odor-blocking doors 110*a*, 110*b* may be generally square, flat, or octagonal in shape. In some embodiments, the projection 198 may be formed from more than one projection and the groove 200 may be formed from more than one groove. The mating of the projection 198 and groove 200 may form the generally arcuate shape of the first receiving chamber 114 when the doors 110*a*, 110*b* are in the closed configuration. The arcuate shape of the first receiving chamber 114 may provide the advantage of decreasing the amount of user interaction necessary to place materials into the refuse container 100. The arcuate shape of the first receiving chamber 114 may cause the first receiving chamber 114 to have a large volume. The large volume of the first receiving chamber 114 may allow the first receiving chamber 114 to accept a larger volume of disposal material when compared to refuse containers having a smaller opening.

A disposal bag (as shown in FIG. 16A-16C) may be placed between the odor-blocking doors 110*a*, 110*b*, with a portion of the bag extending over the bag support 138, as further discussed herein. When the odor-blocking doors 110*a*, 110*b* are in the closed configuration, the groove 200 may receive projection 198, thereby clamping the disposal bag closed between each disposal by a user. The clamping caused by the groove 200 and projection 198 may block odor in the second receiving chamber 154 from escaping into the first receiving chamber 114. The clamping caused by the groove 200 and projection 198 may keep odor in the disposal bag. The groove 200 and projection 198 may comprise complimentary magnets to increase a force biasing the odor-blocking doors 110*a*, 110*b* together when the doors 110*a*, 110*b* are in the closed configuration. Magnets may provide the advantage of increasing a force between the odor-blocking doors 110*a*, 110*b* to maintain the doors 110*a*, 110*b* in the closed configuration as the weight of refuse in a disposal bag clamped between the doors 110*a*, 110*b* increases.

In some embodiments, the indicator sensor 196 may be mounted near the mating geometry of the doors 110*a*, 110*b*. A PCBA (as shown in FIG. 12) may electrically connect to the indicators 134*a*, 134*b*, 134*c* and the indicator sensor 196, such that the indicator sensor 196 electrically couples to the indicators 134*a*, 134*b*, 134*c*. The indicator sensor 196 may detect when the groove 200 and projection 198 of the doors 110*a*, 110*b* mate together, such as when the doors 110*a*, 110*b* move from the open configuration to the closed configuration. The doors 110*a*, 110*b* moving from the open configuration to the closed configuration may indicate disposed material successfully dropped from the first receiving chamber 114 into the second receiving chamber 154. When the indicator sensor 196 detects the doors 110*a*, 110*b* successfully moving from the open configuration to the closed configuration, the indicator sensor 196 may send a signal to the PCBA to thereby control one of the indicators 134*a*, 134*b*, 134*c* to indicate the disposal material successfully dropped through the doors 110*a*, 110*b* into the second receiving chamber 154. The indicator sensor 196 may send an error signal to the PCBA when the indicator sensor 196 detects the doors 110*a*, 110*b* have not moved to a closed configuration from the open configuration within a certain period of time, as discussed further herein.

Figure 10A:
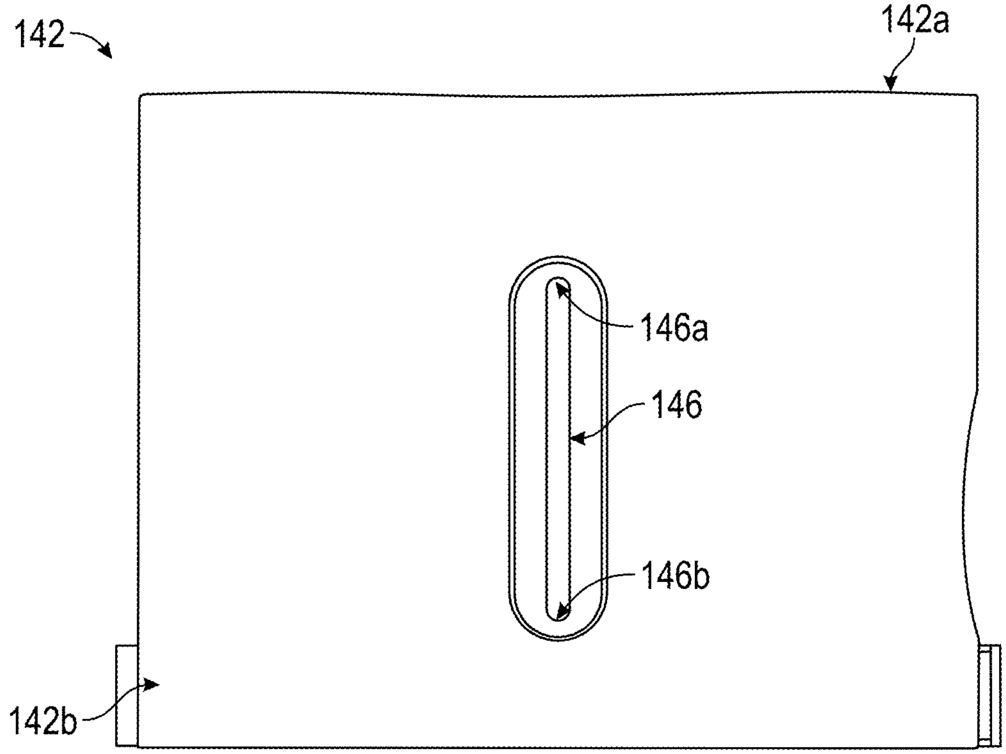
FIG. 10A illustrates a front view of some embodiments of the support mount of the refuse container.

FIG. 10A illustrates a front view of some embodiments of support mount 142 of refuse container 100. Support mount 142 may define a slot 146. Slot 146 may be configured to receive switch 144. Slot 146 may define a first end 146*a* and a second end 146*b*. A user may interact with switch 144 to move switch within slot 146 to manually open and close the odor-blocking doors 110*a*, 110*b*, as further discussed herein. A user may interact with switch 144 to open and close the odor-blocking doors 110*a*, 110*b* during bag replacement and bag removal operations, as further discussed herein. Support mount 142 may have a top 142*a* and a front 142*b*. Lip 187 may extend around top 142*a* of support mount 142.

Figure 10B:
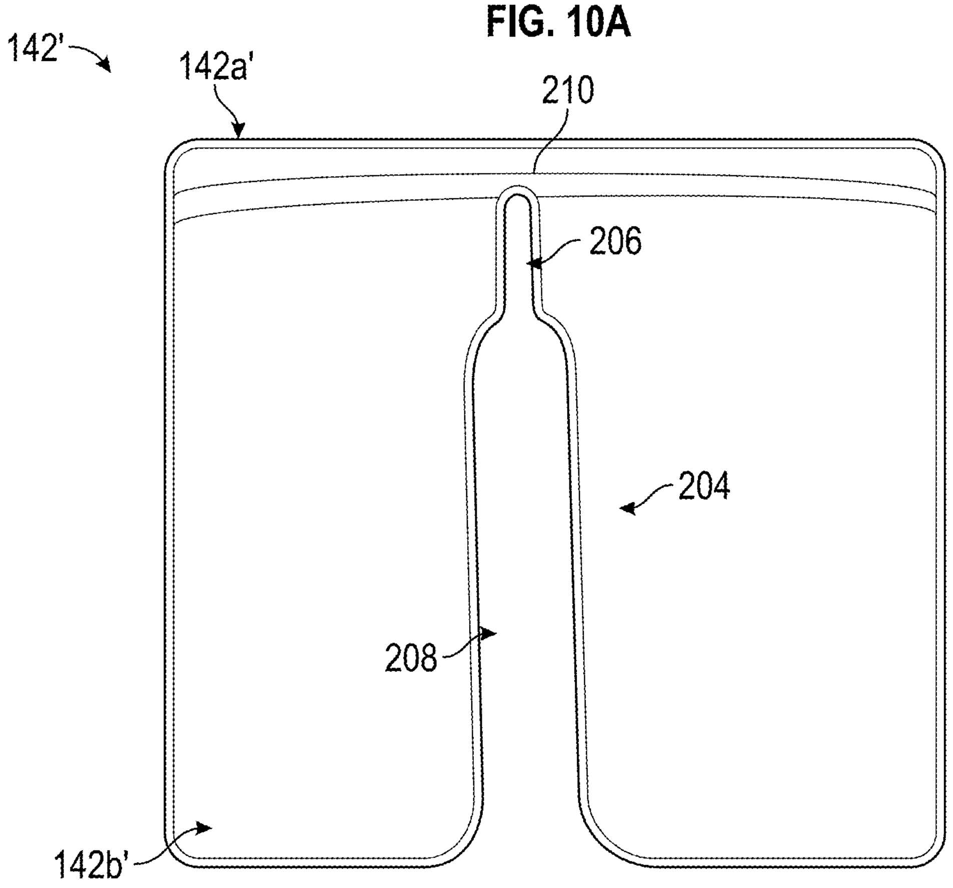
FIG. 10B illustrates a front view of some embodiments of the support mount of the refuse container.

FIG. 10B illustrates a front view of some embodiments of support mount 142' of refuse container 100. Support mount 142' may define a lip 187' (not shown) extending around a top 142*a'* of support mount 142' and define a sealing applicator 204. Support mount 142' may have a front 142*b'*. The sealing applicator 204 may define a first gap 206 and a second gap 208. The first gap 206 may be narrower in shape than the second gap 208 to constrain a top of a disposal bag (as shown in FIG. 16A-16C) within the first receiving chamber 114 and keep the disposal bag from sliding through the sealing applicator 204 while the user is sealing the bag, as further discussed herein. In some embodiments, the sealing applicator 204 may comprise a bridge 210 extending above the first gap 206. A user may place their hand or fingers through the second gap 208 to grasp a fastener of a disposal bag (as shown in FIGS. 16A-16C) to perform disposal bag sealing during bag removal, as further discussed herein.

The first gap 206 of the sealing applicator 204 may be narrower than the second gap 208 of the sealing applicator 204. The sealing applicator 204 may generally be bottle shaped. The first gap 206 may be generally shaped as the narrower top portion of a bottle and the second gap 208 may be generally shaped as the wider bottom portion of a bottle. A disposal bag (as shown in FIGS. 16A-16C) may be inserted into the refuse container through the first gap 206 and second gap 208 in the sealing applicator 204 of support mount 142', such that a user may insert the disposal bag sideways through the opened front panel 118 of housing 102, as discussed further herein. In some embodiments, a user may insert the disposal bag through the top 102*a* of housing 102.

Figure 10C:
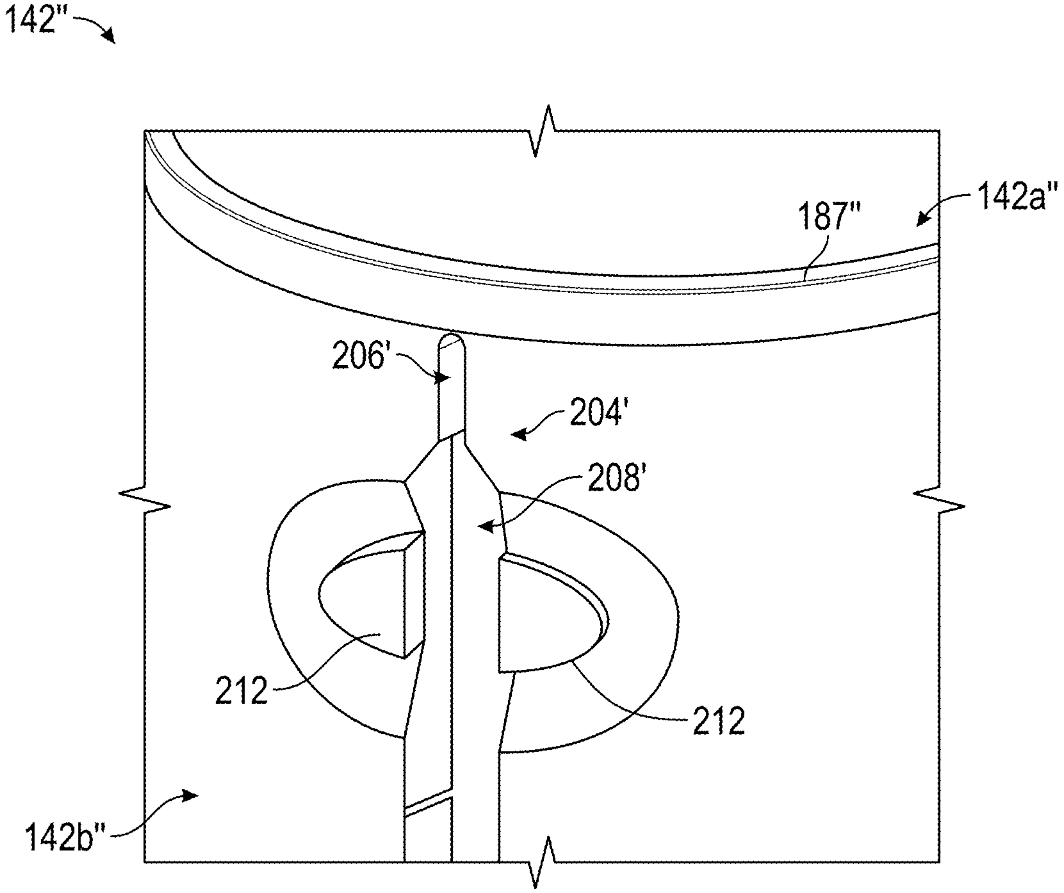
FIG. 10C illustrates a close-up front perspective view of some embodiments of the support mount of the refuse container.

FIG. 10C illustrates a close-up front perspective view of some embodiments of support mount 142" of refuse container 100. In some embodiments, support mount 142" may comprise a lip 187" extending along a top 142*a"* of support mount 142" and may comprise hooks 212 extending out from a front 142*b"* of support mount 142". Support mount 142" may comprise a sealing applicator 204'. The sealing applicator 204' may define a first gap 206' and a second gap 208'. Hooks 212 may be proximate second gap 208' and extend outward away from second gap 208'. When a user feeds a fastener of a disposal bag (as shown in FIG. 16A-16C) through the second gap 208' during bag replacement operations, the hooks 212 may receive a portion of the fastener of the disposal bag to maintain a portion of the fastener outside of the front 142*b"* of support mount 142" to provide easy access for a user when it is time for bag removal, as discussed further herein.

Lid Subassembly

Figure 11A:
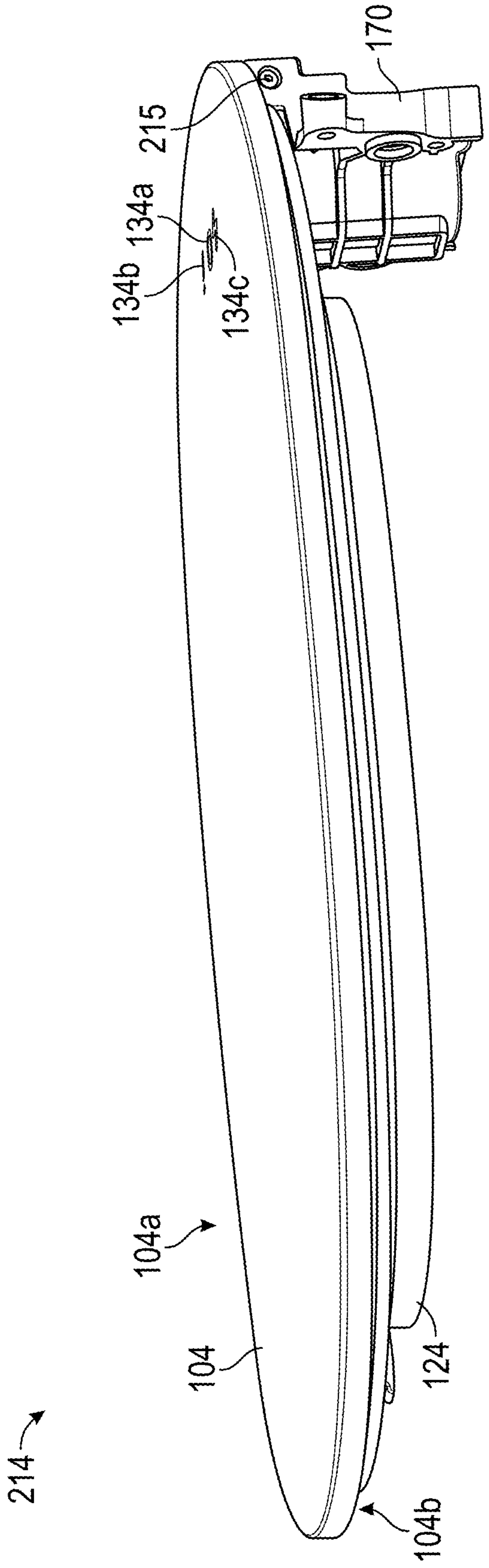
FIG. 11A illustrates a right side perspective view of some embodiments of a lid subassembly of the refuse container.
Figure 11B:
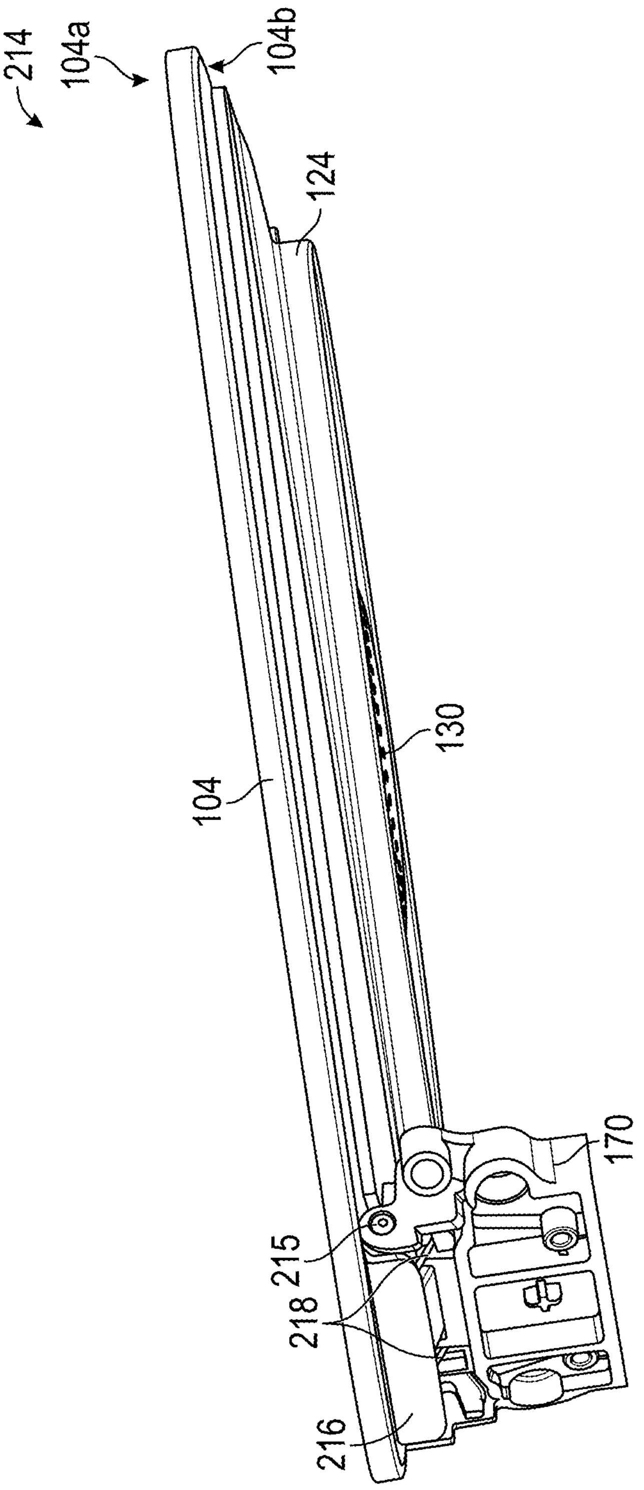
FIG. 11B illustrates a rear perspective view of some embodiments of the lid subassembly of the refuse container.

FIG. 11A illustrates a right side perspective view of some embodiments of a lid subassembly 214 of refuse container 100. FIG. 11B illustrates a rear perspective view of some embodiments of a lid subassembly 214 of refuse container 100. Accordingly, FIGS. 11A-11B are best viewed together. The lid subassembly 214 may include the lid 104, trim cover 124, and lid support 170. The lid 104 may hingedly couple to lid support 170 and have a top 104*a* and bottom 104*b*. Lid support 170 may form part of housing 102 (as shown in FIG. 6), such that lid 104 hingedly couples to housing 102. The trim cover 124 may also hingedly couple to lid support 170, such that trim cover 124 hingedly couples to housing 102. The trim cover 124 and lid 104 may both hingedly couple to lid support 170 of housing 102 using a fastener, such as rod 215. The trim cover 124 and lid 104 may both hingedly couple to lid support 170 of housing 102 using any fastener, such as a screw, bolt, pin, rod, etc. The trim cover 124 hingedly couples to lid support 170 underneath lid 104, as shown in FIG. 11A.

As shown in FIG. 11B, lid 104 may comprise a rear cover 216. Rear cover 216 may extend over rod 215. Rear cover 216 may align with rear panel 120 when the lid 104 is closed in the down position. Torsion springs 218 may fit onto rod 215 and be configured to facilitate the rotation of lid 104 from the closed down position to the open upward position when the user actuates the actuator 106 to cause the automatic door subassembly 112 to open lid 104, as further discussed herein. For example, torsion springs 218 may facilitate rotation of lid 104 from the down position to the upward position when beam 172 pushes protrusion 128 of lid 104 to thereby open lid 104, as further discussed herein.

FIG. 12 illustrates a right side perspective view of some embodiments of lid subassembly 214 of refuse container 100, with lid 104 exploded to show certain internal components and lid support 170 removed. Lid 104 may comprise indicators 134*a*, 134*b*, 134*c*. The indicators 134*a*, 134*b*, 134*c* may be any form of an indicator, such as visual, auditory, or any other form of indicating the status of the refuse container to the user. In some embodiments, indicators 134*a*, 134*b*, 134*c* may be visual and light up via an LED assembly 220. Lid 104 may comprise a bottom 104*b* and a top 104*a*, as shown in FIG. 11B. A PCBA 222 may mount to lid 104 between the bottom 104*b* and the top 104*a* of lid 104, such that the PCBA 222 is housed inside the lid 104. In some embodiments, PCBA 222 may be mounted on the housing 102, door support 140, automatic door subassembly 112, or any other structural component of the refuse container 100. Wires 224 from PCBA 222 may electrically connect the PCBA 222 to the power supply 136 and to the indicator sensor 196 mounted proximate the doors 110*a*, 110*b*. The LED assembly 220 may electrically connect to the PCBA 222. The LED assembly 220 may direct light from LEDs to the indicators 134*a*, 134*b*, 134*c* to thereby light up the indicators 134*a*, 134*b*, 134*c* on the top 104*a* of lid 104. A gasket 226 may fit between the top 104*a* and bottom 104*b* of lid 104. Gasket 226 may provide a tight fit, thereby keeping odors from permeating out of refuse container 100 while lid 104 is closed. A processor may electrically connect to the PCBA 222 and receive signals received by PCBA 222.

When the odor-blocking doors 110*a*, 110*b* move from the open configuration back to the closed configuration, one of the odor-blocking doors 110*a*, 110*b* may contact the indicator sensor 196. When one of the odor-blocking doors 110*a*, 110*b* contacts the indicator sensor 196, the indicator sensor 196 may send a signal to PCBA 222 indicating the doors 110*a*, 110*b* closed successfully. The PCBA 222 may then control the LED assembly 220 to light up one of the indicators 134*a*, 134*b*, 134*c* to indicate to the user the doors 110*a*, 110*b* successfully closed. In some embodiments, when PCBA 222 receives a signal from the indicator sensor 196 indicating the doors 110*a*, 110*b* closed successfully, the processor may be programmed to cause the LED assembly 220 to light up one of the indicators 134*a*, 134*b*, 134*c* to indicate to the user the doors 110*a*, 110*b* successfully closed. If the indicator sensor 196 is not contacted by doors 110*a*, 110*b* in a certain period of time when the doors 110*a*, 110*b* move from the open configuration to the closed configuration, the indicator sensor 196 may send an error signal to the PCBA 222. When the PCBA 222 receives the error signal, the PCBA 222 may control the LED assembly 220 to light up another one of the indicators 134*a*, 134*b*, 134*c* to indicate the refuse container is in an "error" state. In some embodiments, when PCBA 222 receives the error signal, the processor may be programmed to cause the LED assembly 220 to light up one of the indicators 134*a*, 134*b*, 134*c* to indicate the refuse container is in an "error" state.

The PCBA 222 may control the LED assembly 220 to light up one of the indicators 134*a*, 134*b*, 134*c* to indicate the refuse container is in a low power state when the PCBA 222 detects the power supply 136 is low, thereby indicating to a user when the power supply 136 may need replacement, as further discussed herein.

Figure 13A:
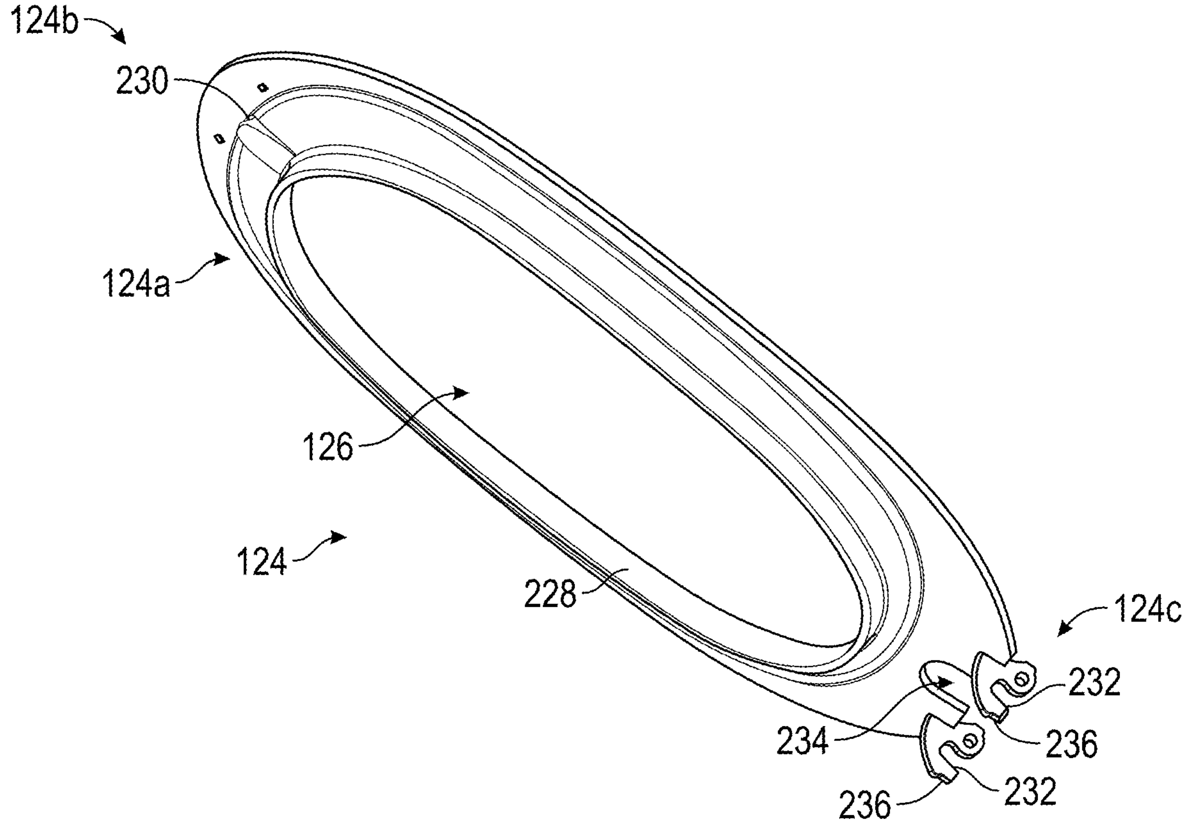
FIG. 13A illustrates a bottom perspective view of some embodiments of the trim cover of the refuse container.

FIG. 13A illustrates a bottom perspective view of some embodiments of trim cover 124 of refuse container 100. Trim cover 124 may form part of lid subassembly 214. Trim cover 124 may define a bottom 124*a*, front 124*b*, and rear 124*c*. A bottom 124*a* of trim cover 124 may define a ridge 228 extending downward around aperture 126. Ridge 228 may extend along an interior of bag support 138 when the trim cover 124 is closed in the down position on the top 102*a* of housing 102. The ridge 228 may extend along an interior side (as shown in FIGS. 15A-15B) of bag support 138 when the trim cover 124 is closed in the down position, to thereby keep a disposal bag on bag support 138, as further discussed herein. When trim cover 124 is in the down position, the trim cover 124 is closed and positioned on the top 102*a* of housing 102, as shown in FIG. 1. When trim cover 124 is in the upward position, the trim cover 124 is opened, as shown in FIG. 3.

Trim cover 124 may comprise a depression 230 proximate the front 124*b* of trim cover 124. Depression 230 may click onto a portion of support mount 142, 142', 142" when the trim cover 124 is closed in the down position to maintain the trim cover 124 on the top 102*a* of housing 102 during refuse disposal. For example, depression 230 may receive lip 187, 187', 187" of support mount 142, 142', 142" when the trim cover 124 is placed in the down position. Depression 230 receiving lip 187, 187', 187" keeps trim cover 124 in the down position during refuse disposal.

Trim cover 124 may define indentations 232 and a hollow 234. The hollow 234 may receive a portion of the automatic door subassembly 112 when the automatic door subassembly 112 opens the lid 104. For example, the hollow 234 may receive a portion of beam 172 when beam 172 moves toward the lid 104 to cause lid 104 to open. In some embodiments, the hollow 234 may receive the beam cap 182 when beam 172 moves toward the lid 104 to cause lid 104 to open. In this way, the trim cover 124 remains in the down position while the lid 104 is opened by automatic door subassembly 112. Indentations 232 may receive the rear cover 216 of lid 104 when lid 104 is opened to the upward position and the trim cover 124 is in the down position. The indentations 232 and hollow 234 may be defined proximate the rear 124*c* of trim cover 124. Trim cover 124 may also comprise detents 236 defined proximate the rear 124*c* of trim cover 124.

Detents 236 may receive a portion of the door support 140 when the trim cover 124 is opened to an upward position, as discussed further herein.

Figure 13B:
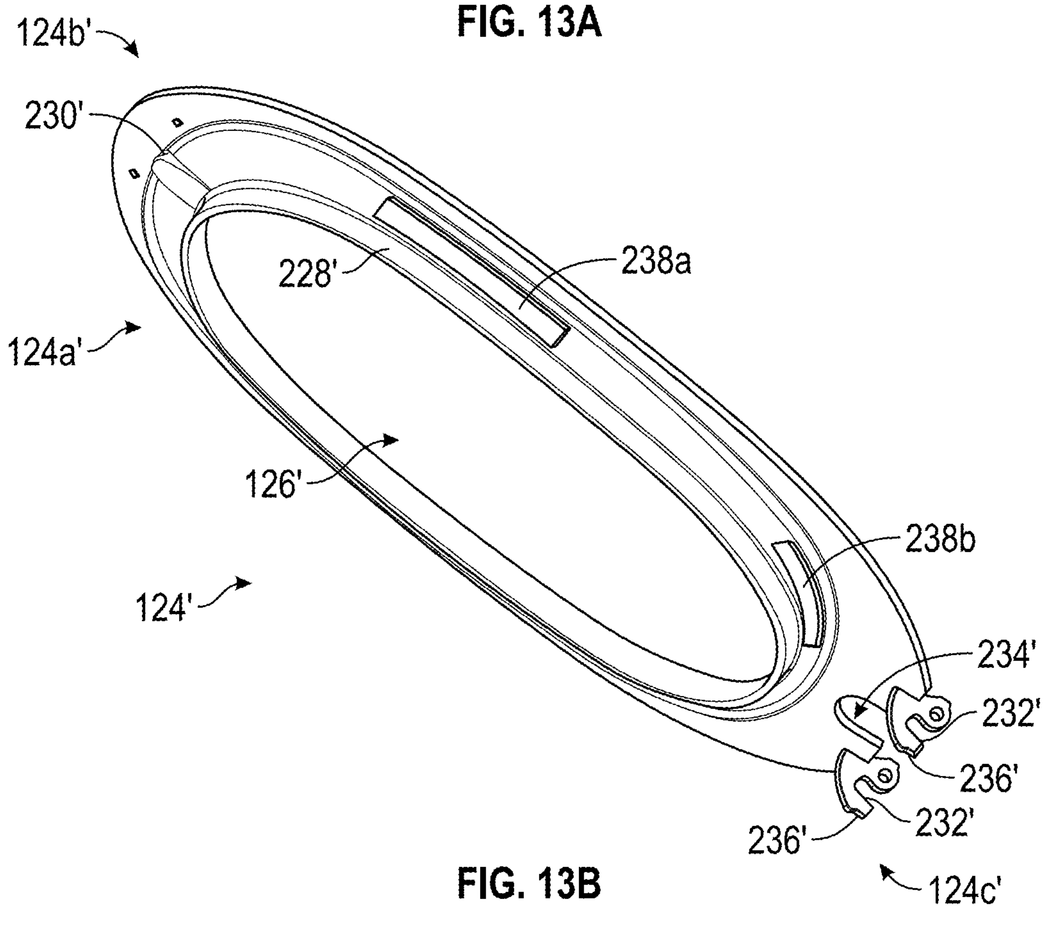
FIG. 13B illustrates a bottom perspective view of some embodiments of the trim cover of the refuse container.

FIG. 13B illustrates a bottom perspective view of some embodiments of trim cover 124' of refuse container 100. Trim cover 124' is substantially similar to trim cover 124, having a bottom 124*a*', front 124*b*', and rear 124*c*', defining a ridge 228', aperture 126', hollow 234', and indentations 232', and comprising a depression 230' and detents 236'. In some embodiments, trim cover 124' may comprise at least one spacer 238*a*, 238*b* to help keep a disposal bag (as shown in FIGS. 16A-16C) extended over the top edge 138*a* of bag support 138 when the trim cover 124' is closed in the down position. In some embodiments, trim cover 124' may comprise one or more spacers 238*a*, 238*b*. In some embodiments, the one or more spacers 238*a*, 238*b* may have varying heights and be positioned along bottom 124*a*' of trim cover 124', such that the one or more spacers 238*a*, 238*b* touch different areas of a top edge of the bag support (as shown in FIGS. 15A-15B, see also FIGS. 15C-15D) at varying heights.

Figure 15C:
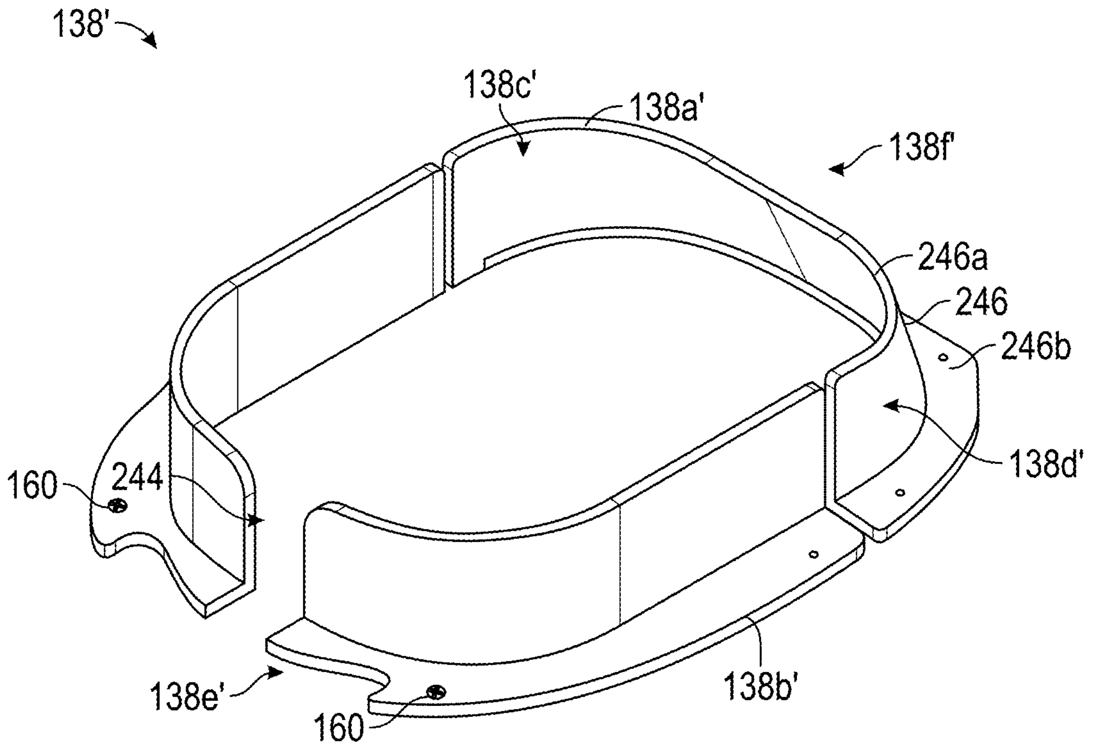
FIG. 15C illustrates a front perspective view of some embodiments of the bag support of the refuse container.
Figure 15D:
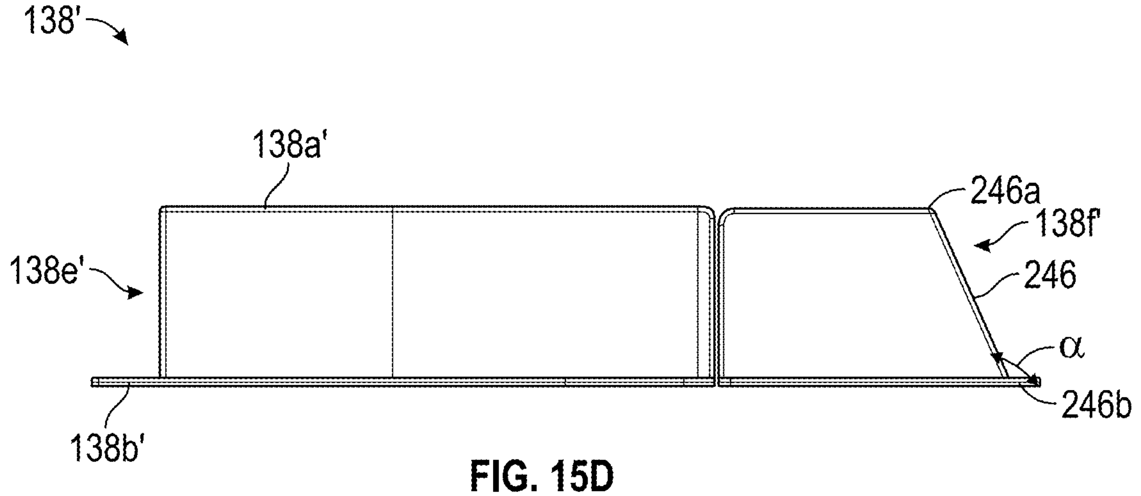
FIG. 15D illustrates a side view of some embodiments of the bag support of the refuse container.

A front spacer 238*a* may contact a portion of a disposal bag (as shown in FIGS. 16A-16C) extending over a top edge of the bag support (as shown in FIGS. 15A-15B, see also FIGS. 15C-15D). In some embodiments, front spacer 238*a* may contact a portion of the disposal bag extending over the top edge of the bag support proximate to the sealing applicator 204, 204' of support mount 142', 142". The front spacer 238*a* may guide the disposal bag toward the sealing applicator 204, 204' when a user pulls a fastener of the disposal bag through the sealing applicator 204, 204'. The front spacer 238*a* may ensure a smooth travel path of the fastener toward the sealing applicator 204, 204', thereby guiding the disposal bag to gather at the sealing applicator 204, 204' during bag removal, as further discussed herein. Trim cover 124' may comprise one or more front spacers 238*a*.

In some embodiments, a rear spacer 238*b* on the trim cover 124' may contact a portion of the disposal bag extending over the top edge proximate a rear of bag support (as shown in FIGS. 15A-15B, see also 15C-15D). In some embodiments, a rear spacer 238*b* on the trim cover 124' may provide clearance between a rear of the bag support (as shown in FIGS. 15C-15D) and the trim cover 124'. The rear spacer 238*b* may facilitate movement of a fastener of a disposal bag (as shown in FIGS. 16A-16C) from the rear to a front of the bag support (as shown. In FIGS. 15C-15D) proximate the sealing applicator 204, 204' of support mount 142', 142". The rear spacers 238*b* may facilitate movement of the disposal bag to the front of the refuse container 100, thereby assisting disposal bag fastening during bag removal, as discussed further herein.

Figure 14:
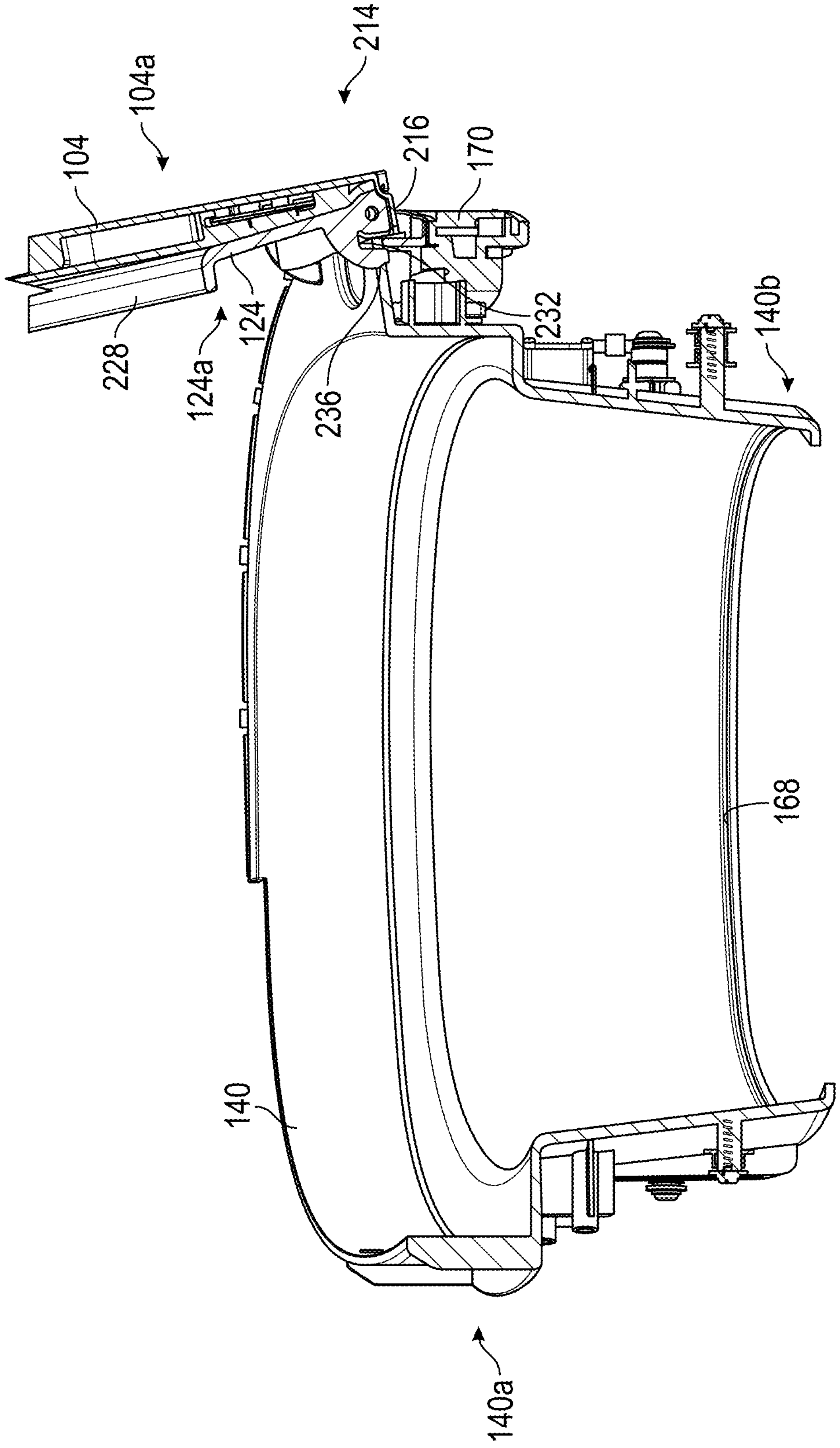
FIG. 14 illustrates a close-up cross-sectional view of some embodiments of the lid subassembly and the door support of the refuse container.

FIG. 14 illustrates a close-up cross-sectional view of some embodiments of the lid subassembly 214 and door support 140 of refuse container 100. Detents 236, 236' of trim cover 124, 124' may receive a portion of door support 140 to maintain the trim cover 124, 124' and lid 104 in the upward position when a user pushes the trim cover 124, 124' to an upward position. Detents 236, 236' provide the advantage of keeping the trim cover 124, 124' and lid 104 open while a user replaces the disposal bag or removes the disposal bag, such that the user does not have to continue holding the trim cover 124, 124' and lid 104 open in the upward position.

Bag Support

FIG. 15A illustrates a front perspective view of some embodiments of bag support 138 of refuse container 100. FIG. 15B illustrates a cross-sectional view of trim cover 124 and bag support 138 of refuse container 100, when trim cover 124 is closed in the down position. Accordingly, FIGS. 15A-15B are best viewed together. Bag support 138 defines a top edge 138*a* (also referred to as a sealing member) and a bottom edge 138*b*. The top edge 138*a* may be proximate the bottom 124*a* of trim cover 124 when the trim cover 124 is in the down position on top 102*a* of housing 102. In some embodiments, top edge 138*a* may contact the bottom 124*a* of trim cover 124 to maintain disposal bag on bag support 138 within refuse container 100. When trim cover 124 is in the down position, ridge 228 may extend along an interior side 138*c* of bag support 138, proximate top edge 138*a*. When a disposal bag (as shown in FIGS. 16A-16C) is positioned on the bag support 138 with a portion of the disposal bag extending over the top edge 138*a* (see FIG. 17), ridge 228 of trim cover 124 may create a clearance fit with the interior side 138*c* of top edge 138*a* when trim cover 124 is closed over top edge 138*a* of bag support 138. Ridge 228 may form a gap 240 with top edge 138*a*, as shown in FIG. 15B. Portions of a disposal bag (as shown in FIG. 16A-16C) extending over the top edge 138*a* may feed through gap 240 as refuse is disposed into the disposal bag, in order to increase the bag length within the second receiving chamber 154 and decrease the force applied to the bag support 138 as the weight of previously disposed refuse increases within the disposal bag inside the refuse container 100. The gap 240 may be large enough for portions of the disposal bag to feed through, but small enough to act as a stop to keep a fastener of a disposal bag (as shown in FIGS. 16A-16C) from feeding therethrough, in order to keep the disposal bag positioned on bag support 138 and the fastener easily reachable by a user. Ridge 228 and top edge 138*a* may sandwich the disposal bag therebetween when the trim cover 124 is down, to keep the disposal bag on bag support 138 even as refuse is increasingly added to the disposal bag.

In some embodiments, bag support 138 may be positioned on door support 140. In some embodiments, bottom edge 138*b* of bag support 138 may be positioned on rim 168 of door support 140. Rim 168 of door support 140 (as shown in FIG. 5 and FIG. 14) may receive bottom edge 138*b* of bag support 138 when bag support 138 is positioned inside refuse container 100 to hold bag support 138 proximate the top 102*a* of housing 102. Bottom edge 138*b* may extend outward on an exterior side 138*d* of bag support 138 such that rim 168 of door support 140 may receive the bottom edge 138*b*.

As shown in FIG. 15A, bag support 138 may also define openings 242*a*, 242*b* on a front 138*e* and a rear 138*f* of bag support 138. Openings 242*a*, 242*b* may be configured to hold excess disposal bag material extending over the top edge 138*a* when a user positions a disposal bag over the bag support 138. A user may place their hands in openings 242*a*, 242*b* to help assist with removing and placing bag support 138 on top of door support 140. In some embodiments, openings 242*a*, 242*b* may create handles a use can hold when removing and placing bag support 138 in refuse container 100. Bag support 138 may have a vertical length $L_1$ within the range of 1 inch to 8 inches, such as between 3 inches and 6 inches. The long vertical length $L_1$ may support a large amount of disposal bag material extending over the top edge 138*a* of bag support 138, to counteract previously disposed of material pulling at the top of a disposal bag (as shown in FIGS. 16A-16C) placed within refuse container 100. The vertical length $L_1$ of bag support 138 may indicate to a user how much of the disposal bag to extend over top edge 138*a* of bag support 138.

Bag support 138 may be removable from refuse container 100. In some embodiments, bag support 138 may fixedly couple to the door support 140, such that a user interacts with bag support 138 inside the refuse container 100 to insert a disposal bag on the bag support 138. In some embodiments, bag support 138 may operatively couple to the door support 140 to facilitate bag insertion. For example, bag support 138 may be positioned on springs placed on door support 140 and operatively coupled to door support 140 via fasteners, such as bolts, rods, screws, pins, etc. When a user wants to install a new bag, springs may bias the bag support 138 upward to provide easier access to the bag support 138. The trim cover 124 and lid 104 may press the bag support 138 down onto the springs to load the springs when the trim cover 124 and lid 104 are closed in the down position. The springs may bias the bag support 138 upward when the trim cover 124 and lid 104 are opened to the upward position. In some embodiments, the bag support 138 may be fixedly attached to the housing 102, the door support 140, or any other structural component of the refuse container 100. In some embodiments, a flap may be operatively coupled to housing 102 near odor-blocking doors 110*a*, 110*b*. The flap may be positioned on springs coupled to the housing 102. The flap may extend into the second receiving chamber 154 to receive extra material of a disposal bag (as shown in FIGS. 16A-16C) placed on bag support 138. As more refuse is disposed into the disposal bag, the springs may bend the flap away from the disposal bag. A sprung flap may provide the advantage of releasing additional volume by releasing the extra material of the disposal bag in a controlled manner to decrease tension applied to a disposal bag extended over top edge 138*a* of the bag support 138.

In some embodiments, an interior side of top edge 138*a* may have a textured surface to provide a frictional hold on the disposal bag when extended over the top edge 138*a*. In some embodiments, at least a portion of the exterior side 138*d* of bag support 138 may have a textured surface.

FIG. 15C illustrates a front perspective view of some embodiments of bag support 138' of refuse container 100. FIG. 15D illustrates a side view of some embodiments of bag support 138' of refuse container 100. Accordingly, FIGS. 15C-15D are best viewed together. Bag support 138' may define a top edge 138*a*', bottom edge 138*b*', and have an interior side 138*c*', exterior side 138*d*', front 138*e*', and rear 138*f*'. In some embodiments, bag support 138' may couple to door support 140 using fasteners 160. Fasteners 160 may be screws, bolts, pins, rod, etc. In some embodiments, bag support 138' may couple to door support 140 using any form of fastener, including adhesive or snaps. An opening of disposal bag (as shown in FIG. 16C) may extend over top edge 138*a*' of bag support 138' when disposal bag is placed in refuse container 100. In some embodiments, bag support 138' may define a slit 244 aligned with sealing applicator 204, 204' of support mount 142', 142" such that a user may reach a fastener of the disposal bag (as shown in FIG. 16A-16C) through the second gap 208, 208' of sealing applicator 204, 204'. Slit 244 and sealing applicator 204, 204' may allow a user to remove and insert a disposal bag into refuse container through the front of refuse container 100, such as through the front panel 118 when front panel 118 is opened. In some embodiments, bag support 138' may define a sloped region 246 on rear 138*f*' of bag support 138'. The sloped region 246 may have a top surface 246*a* and a bottom surface 246*b*. When the disposal bag (as shown in FIGS. 16A-16C) is placed on the bag support 138', the sloped region 246 may facilitate movement of the fastener of the disposal bag along the top edge 138*a*' of bag support 138' and toward the sealing applicator 204, 204' of support mount 142', 142" during bag removal, as discussed further herein. The sloped region 246 may allow the fastener of the disposal bag to remove from bag support 138'. In some embodiments, the sloped region 246 may allow the fastener of the disposal bag to lift off of at least a portion of the top edge 138*a*'. In some embodiments, sloped region 246 may allow the fastener to lift off of a portion of the top edge 138*a*' proximate rear 138*f*' of bag support 138'.

The sloped region 246 may comprise a variable angle. For example, the angle of inclination $\alpha$ of the sloped region 246 from the bottom surface 246*b* may decrease as the sloped region 246 extends upward from the bottom surface 246*b*. Side regions of the sloped region 246 may have a draft angle to facilitate the disposal bag lifting from the top edge 138*a*' during bag removal without the disposal bag getting caught or snagged on corners or edges of the bag support 138'.

In some embodiments, the bag support 138' may comprise other features to assist a user in pulling a fastener of the disposal bag (as shown in FIGS. 16A-16C) from the top edge 138*a*' during bag removal. For example, the rear 138*f*' of bag support 138' may comprise flexible material while the front 138*e*' may be rigid, such that the rear 138*f*' of bag support 138' flexes downward to allow the disposal bag to lift from the rear 138*f*' and gather toward the sealing applicator 204, 204' of support mount 142', 142". In some embodiments, the sloped region 246 of bag support 138' may be flexible. In some embodiments, the rear 138*f*' may hingedly couple to bag support 138' at bottom edge 138*b*', such that when a user pulls on a fastener of the disposal bag (as shown in FIGS. 16A-16C) when the disposal bag is placed on the bag support 138', the rear 138*f*' may pivot downward to facilitate removal of the opening of the disposal bag from the bag support 138'. In some embodiments, the sloped region 246 of bag support 138' may hingedly couple to bag support 138', such that when a user pulls on a fastener of the disposal bag, the sloped region 246 pivots downward to allow the disposal bag to lift from the rear 138*f*' and gather toward sealing applicator 204, 204' of support mount 142', 142". In some embodiments, the top edge 138*a*' of bag support 138' may contain flexible fingers to allow the disposal bag to lift from the rear 138*f*' and gather toward sealing applicator 204, 204' during bag removal, as further discussed below.

In some embodiments, spacers 238*a*, 238*b* of trim cover 124' may be configured to secure a disposal bag (as shown in FIGS. 16A-16C) over the top edge 138*a*, 138*a*' of bag support 138, 138' when the trim cover 124' is closed in the down position. At least a portion of the spacers 238*a*, 238*b* may contact the disposal bag when the disposal bag extends over the top edge 138*a*, 138*a*' to keep the disposal bag in place as more trash and/or disposal material is added to the disposal bag by a user. The spacers 238*a*, 238*b* may also contact the disposal bag when the bag extends over the top edge 138*a*, 138*a*' of bag support 138, 138' to minimize airflow out of the refuse container 100, thereby decreasing the amount of odor permeating from the refuse container 100 into the surrounding air. In some embodiments, the spacers 238*a*, 238*b* may guide a fastener of the disposal bag (as shown in FIGS. 16A-16C) to lift off of a portion of the top edge 138*a*' proximate the rear 138*f*' of bag support 138' and move toward sealing applicator 204, 204' of support mount 142', 142" when a user seals a disposal bag. The spacers 238*a*, 238*b* may guide volume of the bag toward the front 142*b*, 142*b*', 142*b*" of support mount 142, 142', 142"

and ensure a smooth gathering of the fastener of the disposal bag at the sealing applicator 204, 204'.

Disposal Bag

FIG. 16A illustrates a front view of some embodiments of a disposal bag 248 for use with refuse container 100. FIG. 16B illustrates a close-up front view of some embodiments of disposal bag 248. FIG. 16C illustrates a top view of some embodiments of disposal bag 248. Accordingly, FIGS. 16A-16C are best viewed together. The disposal bag 248 may comprise a bag fastener 250 and body 252. The body 252 of disposal bag 248 may be made of film having a combination of layers. The layers may include a combination of ethylene-vinyl alcohol (EVOH), polyethylene (PE), polyamide (PA), and colorant. In some embodiments, the layers of the film may comprise EVOH, PE, PA, or colorant. The combination of layers may provide the advantage of decreasing odor transmission through the disposal bag 248. The disposal bag 248 may be made of a flexible or stretchy material to allow a length $L_2$ of disposal bag 248 to increase as more refuse is added to the disposal bag 248. Making at least a portion of the material of the disposal bag 248 flexible or stretchy may provide the advantage of decreasing the stress applied to the bag support 138, 138' and/or odor-blocking doors 110*a*, 110*b* when the disposal bag 248 is placed within bag support 138, 138' in refuse container 100 and as refuse is placed in disposal bag 248. As refuse is added to the disposal bag 248, the stretchy portions of the bag 248 may lengthen to decrease the stress applied to bag support 138, 138'.

A length of the disposal bag $L_2$ may be greater than the depth $H_1$ of the second receiving chamber 154 (as shown in FIG. 3), such that any extra material of the disposal bag 248 or slack of the disposal bag 248 rests on bottom 152 when placed in the refuse container 100. Length $L_2$ of the disposal bag 248 being greater than depth $H_1$ of the second receiving chamber 154 may provide the advantage of decreasing tension at the bag support 138, 138' when disposed material accumulates in the disposal bag 248 when the disposal bag 248 is placed on bag support 138, 138'. The disposal bag 248 may be generally rectangular such that the length $L_2$ is greater than the width $W_1$. The rectangular profile of the disposal bag 248 may allow the length $L_2$ to rest on at least a portion of the bottom 152 of the second receiving chamber 154.

In some embodiments, bag fastener 250 may be received in a fastener passage 254. As shown in FIGS. 16A-16B, the bag fastener 250 may be mounted within a fastener passage 254. In some embodiments, a portion of bag fastener 250 may be fixedly attached to the passage 254. For example, a portion of bag fastener 250 may be welded to the interior of fastener passage 254. In some embodiments, bag fastener 250 may be loosely mounted within passage 254 such that the bag fastener 250 may freely move within the passage 254. The fastener passage 254 may receive the bag fastener 250. The bag fastener 250 may extend through a first cutout 256*a* and a second cutout 256*b* defined by the fastener passage 254, as shown in FIGS. 16A-16B. The bag fastener 250 may mount loosely within the fastener passage 254, such that the bag fastener 250 allows for complete sealing of the disposal bag 248 prior to bag removal. Loose mounting of the bag fastener 250 within the fastener passage 254 may make the bag fastener 250 movable within the fastener passage 254 to provide a more complete seal of the disposal bag 248. In some embodiments, the bag fastener 250 may freely float within the passage 254 to allow for unrestrained movement of the bag fastener 250 within the passage 254. The unrestrained movement of the bag fastener 250 may facilitate the sealing of the disposal bag 248 prior to removal of the bag 248 from the refuse container 100, as further discussed herein.

Mounting the bag fastener 250 loosely within the fastener passage 254 such that the bag fastener 250 is detached from passage 254 provides the advantage of decreasing the steps a user must take in sealing and removing the disposal bag 248. For example, a user may knot a trash bag after cinching drawstrings closed to seal the bag more completely. The free-floating bag fastener 250 may more completely seal disposal bag 248 by providing unconstrained movement of the bag fastener 250 within passage 254, and thus may eliminate certain fastening steps (e.g., knotting drawstrings). A user may still tie disposal bag 248 via bag fastener 250. For example, a user may pull on bag fastener 250 extending from both the first cutout 256*a* and second cutout 256*b* and tie the two extending portions together.

The fastener passage 254 may extend along an opening 258 of the disposal bag 248, as shown in FIG. 16C. The first cutout 256*a* and second cutout 256*b* may be positioned oppositely along the opening 258 of the disposal bag 248. In some embodiments, the first cutout 256*a* and second cutout 256*b* may be defined toward the center of passage 254. The bag fastener 250 may extend through the first cutout 256*a* and second cutout 256*b*, such that a user may grasp a portion of the bag fastener 250 within the first cutout 256*a* or second cutout 256*b* to seal the disposal bag 248, as discussed further herein.

In some embodiments, disposal bag 248 may comprise handles located proximate opening 258. Handles may receive an extension on bag support 138, 138' to maintain opening 258 over top edge 138*a*, 138*a'* of bag support 138, 138'.

In some embodiments, a portion of bag fastener 250 may extend through the cutouts 256*a*, 256*b* of passage 254 and be received on hooks 212 of support mount 142". A portion of bag fastener 250 may loop around hooks 212 by a user pulling bag fastener 250 through the second gap 208' of sealing applicator 204' of support mount 142". Placing a portion of bag fastener 250 on hooks 212 may simplify the bag removal process by providing easy access to the bag fastener 250 for cinching the disposal bag 248 closed. Placing a portion of bag fastener 250 on hooks 212 may provide the advantage of anchoring the disposal bag 248 to refuse container 100 during insertion. For example, looping the bag fastener 250 around hooks 212 may assist a user in extending the opening 258 of disposal bag 248 around the bag support 138, 138'. Placing a portion of bag fastener 250 on hooks 212 may increase tension applied to the disposal bag 248 along the top edge 138*a*, 138*a'* of bag support 138, 138' to help keep the bag 248 extended over bag support 138, 138'

In some embodiments, a portion of bag fastener 250 may extend through the cutouts 256*a*, 256*b* of passage 254 and be received through first gap 206, 206' or second gap 208, 208' of support mount 142', 142". A user may pull the bag fastener 250 through the second gap 208, 208' or the first gap 206, 206' of sealing applicator 204, 204' of support mount 142', 142". Placing a portion of bag fastener 250 through second gap 208, 208' or the first gap 206, 206' may simplify the bag removal process by providing easy access to the bag fastener 250 for sealing the disposal bag 248 closed.

In some embodiments, the bag fastener 250 may comprise interlocking gaskets formed along the opening 258 of the disposal bag 248. In some embodiments, the bag fastener 250 may comprise interlocking teeth formed along the opening 258 of the disposal bag 248 that zip together to seal the disposal bag 248.

Figure 17:
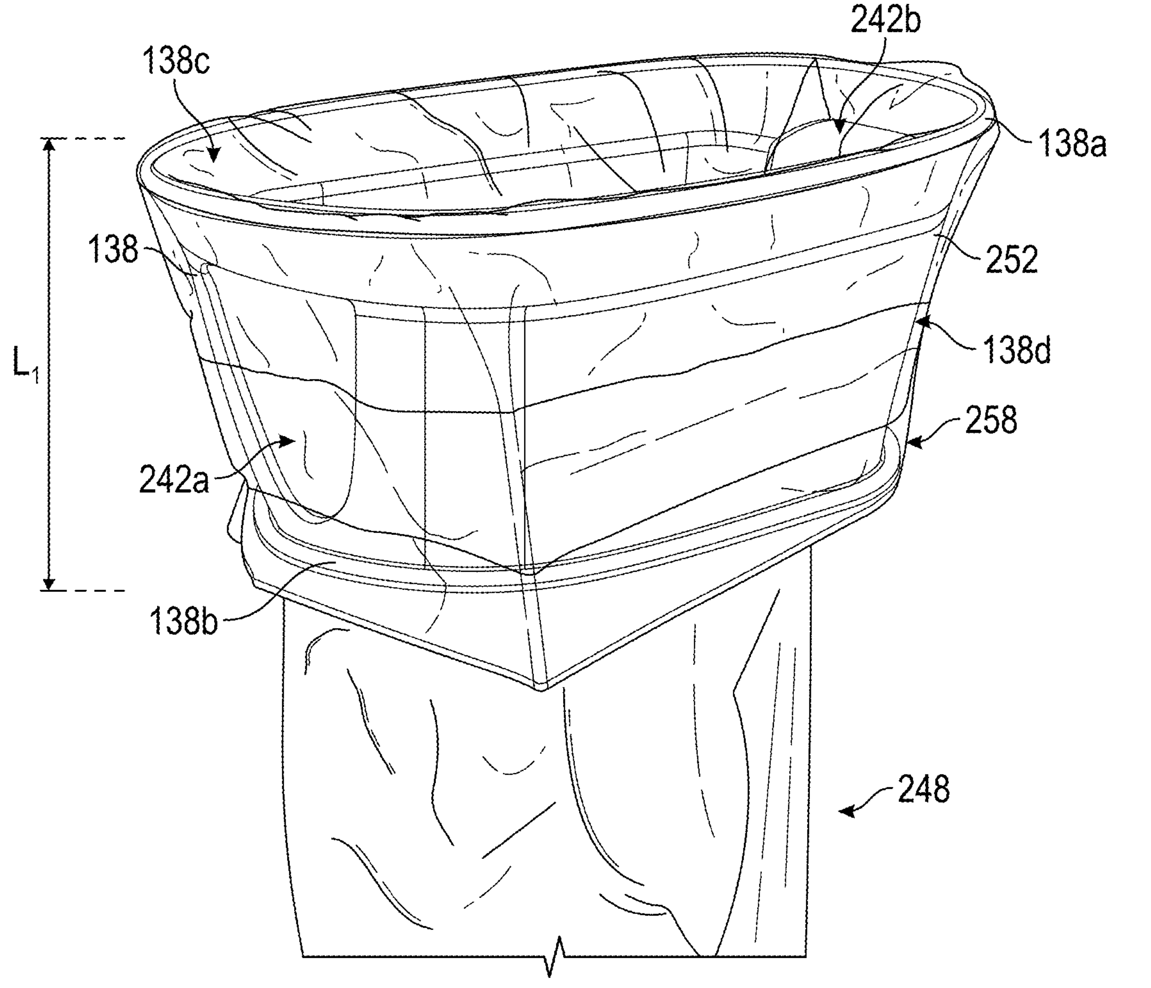
FIG. 17 illustrates a side perspective view of some embodiments of the disposal bag inserted on the bag support, with the disposal bag made transparent.

FIG. 17 illustrates a side perspective view of some embodiments of disposal bag 248 inserted on bag support 138. A user may insert the disposal bag 248 on bag support 138, 138' of refuse container 100. The opening 258 of disposal bag 248 may extend over the top edge 138*a*, 138*a*' of bag support 138, 138', such that a portion of the body 252 of disposal bag 248 hangs over the top edge 138*a*, 138*a*' onto exterior side 138*d*, 138*d*' of bag support 138, 138'. The remainder of body 252 is received through the interior side 138*c*, 138*c*' of bag support 138, 138'. A user may pull the opening 258 of disposal bag 248 over the top edge 138*a* of bag support 138 to cover the entire length $L_1$ of bag support 138, in order to provide slack as refuse drops into the bottom of disposal bag 248 when the disposal bag 248 and bag support 138 are placed in refuse container 100.

Actuator

Figure 18A:
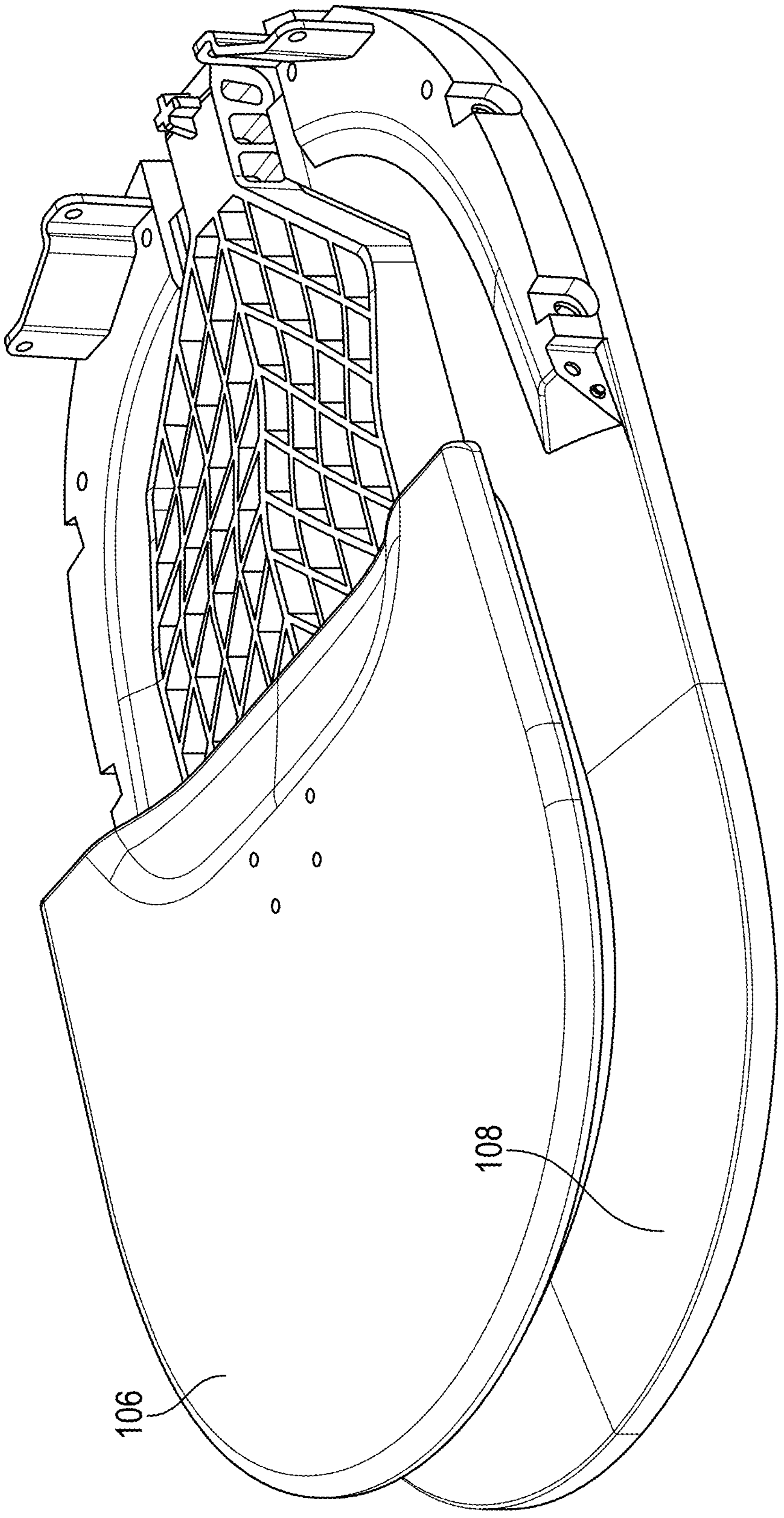
FIG. 18A illustrates a front perspective view of some embodiments of an actuator and a base of the refuse container.
Figure 18B:
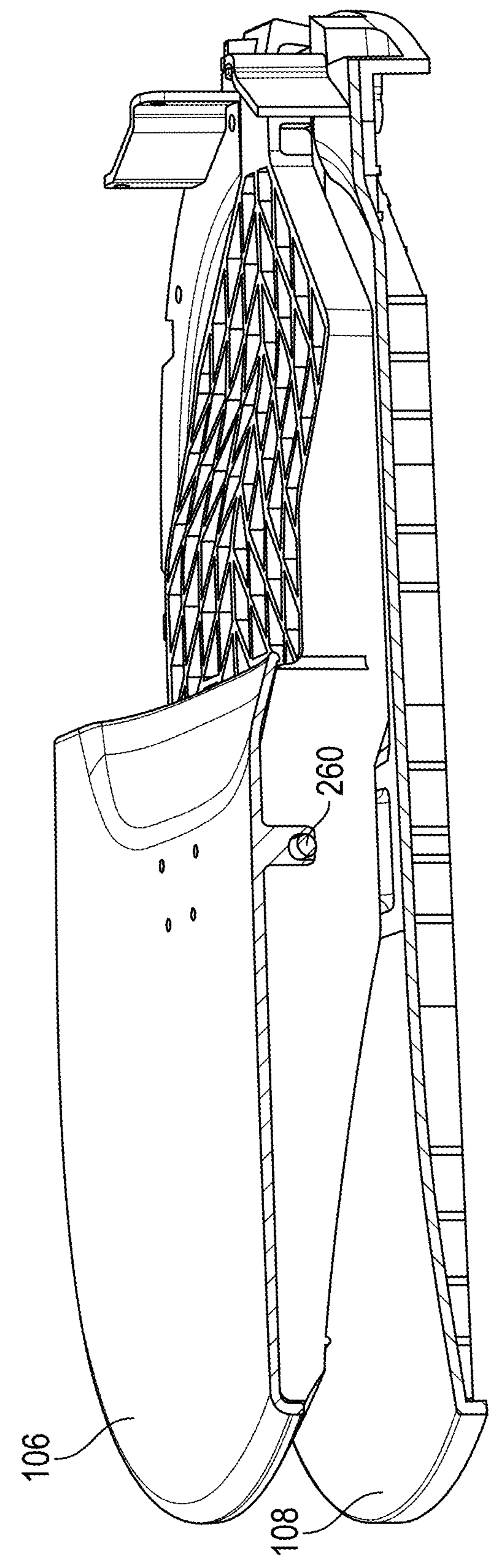
FIG. 18B illustrates a cross-sectional side view of some embodiments of the actuator and the base of the refuse container.

FIG. 18A illustrates a front perspective view of some embodiments of actuator 106 and base 108 of refuse container 100. FIG. 18B illustrates a cross-sectional side view of some embodiments of actuator 106 and base 108 of refuse container 100. Accordingly, FIGS. 18A-18B are meant to be viewed together. Actuator 106 may be positioned proximate base 108 of refuse container 100. In some embodiments, actuator 106 may be positioned anywhere on the lid 104 or housing 102. As shown in FIG. 18B, actuator 106 may operatively couple to base 108 using a fastener, such as by pin 260. Actuator 106 may be configured to cause the automatic door subassembly 112 to open lid 104, close lid 104, and transition the odor blocking doors 110*a*, 110*b* from the closed configuration to the open configuration when actuated. In some embodiments, actuator 106 may operatively couple to base 108 using any form of mechanical fastener, such as a screw, bolt, pin, rod, etc.

Figure 20A:
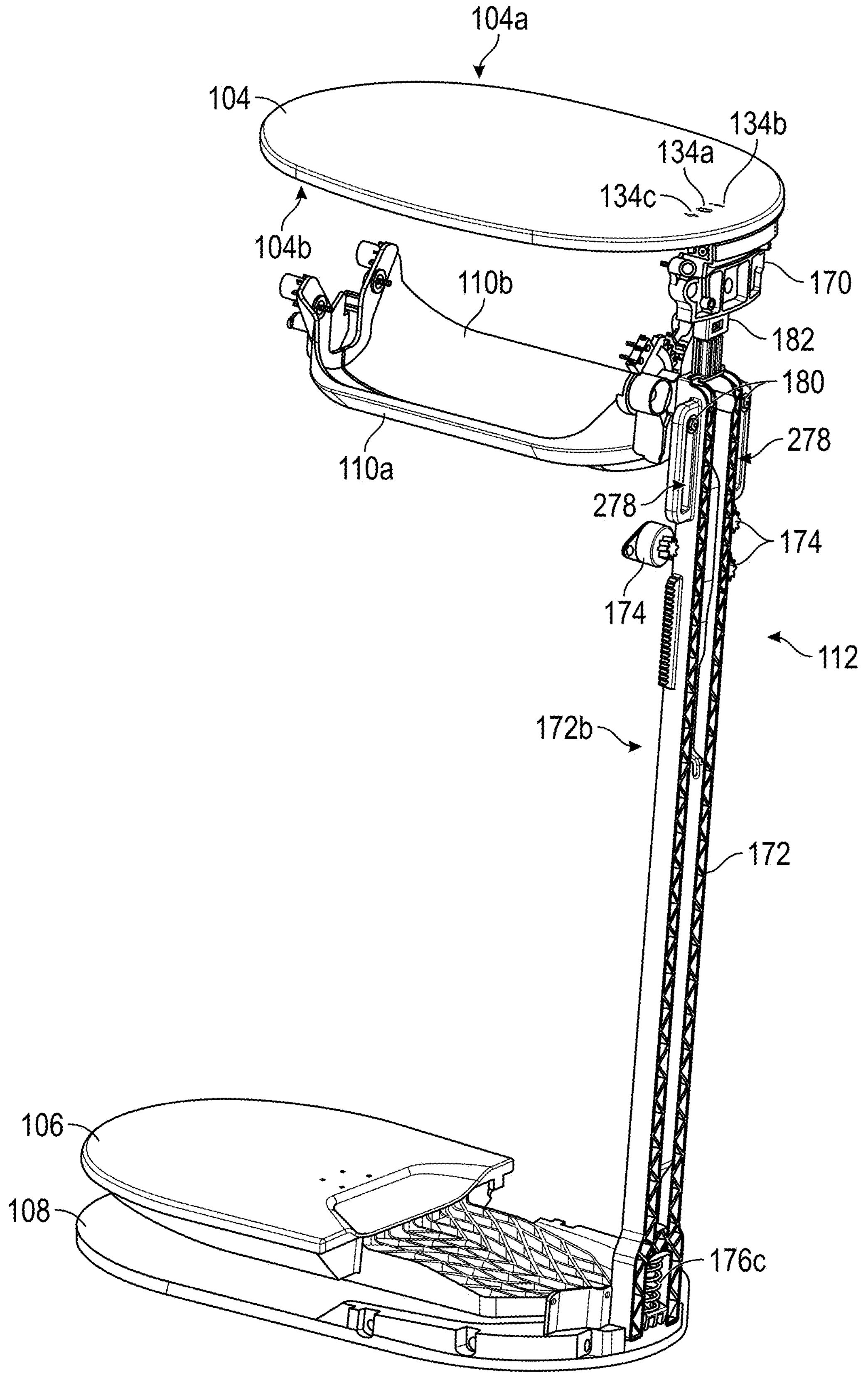
FIG. 20A illustrates a side perspective view of some embodiments of the automatic door subassembly, lid, a lid support, the actuator, the odor-blocking doors, and the base of the refuse container, with the lid closed in the down position and the odor-blocking doors in the closed configuration.

In some embodiments, the actuator 106 may be a pedal that a user presses their foot on to actuate the automatic door subassembly 112. The actuator 106 may be crescent-shaped and large enough to accommodate increased accessibility to the actuator 106. The actuator 106 may operatively couple to automatic door subassembly 112 (as shown in FIG. 20A), such that actuation of the actuator 106 causes the automatic door subassembly 112 to open the lid 104, close the lid 104, move the odor-blocking doors 110*a*, 110*b* from the closed configuration to the open configuration, and move the odor-blocking doors 110*a*, 110*b* from the open configuration back to the closed configuration, as discussed further herein.

In some embodiments, the actuator 106 may be a button or a lever, such that a user may actuate the actuator 106 using their hand. In some embodiments, the actuator 106 may be a button that a user may press to actuate the automatic door subassembly 112. In some embodiments, the actuator 106 may comprise a first actuator and a second actuator. The first actuator may be actuated to control the automatic door subassembly 112 opening and closing the lid 104, while the second actuator may be actuated to control the automatic door subassembly 112 to open and close the odor-blocking doors 110*a*, 110*b*. In some embodiments, the first actuator may be a first pedal and the second actuator may be a second pedal. In some embodiments, the first actuator may be a first button and the second actuator may be a second button. In some embodiments, the actuator 106 may comprise a motion sensor and the user may actuate the actuator 106 by moving in front of the motion sensor. For example, a user may provide motion proximate the motion sensor to actuate the automatic door subassembly 112.

In some embodiments, the actuator 106 may drive a motor to activate a sequence of events. Actuator 106 may be electrically connected to PCBA 222. PCBA 222 may be electrically connected to a motor. Actuating the actuator 106 may send a signal to PCBA 222. When PCBA 222 receives a signal from the actuator 106, PCBA 222 may send a signal to the motor. When the motor receives a signal from the PCBA 222, the motor may initiate operation of the automatic door subassembly 112. For example, the motor may cause the automatic door subassembly 112 to sequentially open the lid 104, close the lid 104, open the odor-blocking doors 110*a*, 110*b*, and then close the odor-blocking doors 110*a*, 110*b*. In some embodiments, the motor may be configured to operate the odor-blocking doors 110*a*, 110*b* to transition between the open configuration and the closed configuration and configured to operate the lid 104 to open and close, as further discussed herein.

Automatic Door Subassembly

FIG. 19A illustrates a front perspective view of some embodiments of automatic door subassembly 112 of refuse container 100. FIG. 19B illustrates a rear close-up view of some embodiments of automatic door subassembly 112 of refuse container 100. FIGS. 19A-19B are meant to be viewed together. Automatic door subassembly 112 may cause odor-blocking doors 110*a*, 110*b* to transition between the open configuration and the closed configuration. Automatic door subassembly 112 may cause lid 104 to open and then close. Actuating actuator 106 may cause automatic door subassembly 112 to open the lid 104, close the lid 104, transition odor-blocking doors 110*a*, 110*b* from the closed configuration to the open configuration, and transition odor-blocking doors 110*a*, 110*b* back to the closed configuration, as further discussed herein.

Actuating actuator 106 may transition automatic door subassembly 112 from a first position to a second position to open lid 104, from a second position to a third position to close lid 104, from a third position to a fourth position to move odor-blocking doors 110*a*, 110*b* from the closed configuration to the open configuration, and from the fourth position to the first position to move odor-blocking doors 110*a*, 110*b* from the open configuration to the closed configuration, as further discussed herein.

Automatic door subassembly 112 may comprise beam 172, beam cap 182, dampers 174, and springs 176*a*, 176*b*, 176*c*. A spring 176*b* may couple to inner wall 150 and to beam 172. In some embodiments, a first end of spring 176*b* may couple to beam 172. A second end of spring 176*b* may couple to a plate 262 fastened to inner wall 150. In some embodiments, plate 262 may be square, rectangular, circular, or any other shape. Plate 262 may fasten to inner wall 150 using fasteners 160. The second end of spring 176*b* may fix to inner wall 150, such that when actuating actuator 106 causes the beam 172 to move, spring 176*b* may become loaded. In some embodiments, one end of spring 176*b* may fix to plate 262 while the other end couples to beam 172 to thereby load spring 176*b* when beam 172 moves. Actuating actuator 106 may cause beam 172 to move toward lid 104 to thereby load spring 176*b*. In some embodiments, actuating actuator 106 may cause beam 172 to translate upward toward lid 104 to thereby load spring 176*b*. Once loaded, spring 176*b* may bias beam 172 to move away from lid 104 to thereby close the lid and transition the odor-blocking doors 110*a*, 110*b* from the closed configuration to the open configuration, as discussed further herein.

Spring 176*c* may facilitate smooth movement of automatic door subassembly 112 to open and close the lid and to move the odor-blocking doors 110*a*, 110*b* between the closed configuration and the open configuration. Dampers 174 may contact beam 172 of automatic door subassembly 112 to decrease the speed at which automatic door subassembly 112 moves when actuator 106 is actuated. For example, in some embodiments, actuation of actuator 106 may cause beam 172 to travel downward away from lid 104 to close lid 104 to the down position. Dampers 174 may dampen the speed at which beam 172 travels downward away from lid 104. Actuation of actuator 106 to cause automatic door subassembly 112 to translate downward may include releasing actuator 106. Dampers 174 may dampen the speed at which automatic door subassembly 112 travels downward away from lid 104 to reduce wear and tear of automatic door subassembly 112.

Beam 172 of automatic door subassembly 112 may define a top 172*a* and front 172*b* and may comprise a beam cap 182 at top 172*a* of beam 172. In some embodiments, beam 172 may be configured to move to contact lid 104 to thereby open lid 104 to an upward position. In some embodiments, beam 172 may push protrusion 128 of lid 104 to cause lid 104 to open. In some embodiments, beam cap 182 of beam 172 may contact lid 104 when beam 172 travels upward to cause lid 104 to open. Beam cap 182 may form part of beam 172. In some embodiments, beam cap 182 may fixedly attach to beam 172.

Automatic door subassembly 112 may comprise a lever 276. Lever 276 may couple to beam 172. As shown in FIG. 19B, lever 276 may couple to beam 172 using a fastener 160, as shown in FIG. 19B. In some embodiments, lever 276 may couple to front 172*b* of beam 172, as shown in FIG. 19A. Lever 276 may be coupled to front 172*b* of beam 172 proximate odor-blocking doors 110*a*, 110*b* such that lever 276 may interact with odor-blocking doors 110*a*, 110*b* to move the odor-blocking doors 110*a*, 110*b* between the closed configuration and the open configuration. In some embodiments, lever 276 may contact door lever 192 to transition the odor-blocking doors 110*a*, 110*b* from the closed configuration to the open configuration.

In some embodiments, lever 276 and door lever 192 may be two discs that are fully decoupled or partially decoupled.

In some embodiments, automatic door subassembly 112 may include a spring 176*a*. Spring 176*a* may couple to lever 276 at one end and to beam 172 at another end of spring 176*a*. Spring 176*a* may allow for small rotation of lever 276 when contacting door lever 192 to decrease wear and tear of the door lever 192 and lever 276 during transition of doors 110*a*, 110*b* from the closed configuration to the open configuration, as further discussed herein.

In some embodiments, beam 172 may define at least one translation slot 278 configured to receive a fastener 180. In some embodiments, beam 172 may define a first translation slot receiving a first fastener and a second translation slot receiving a second fastener. As shown in FIG. 19B, fasteners 180 may be received in translation slots 278. Fasteners 180 may couple beam 172 to inner wall 150. In some embodiments, translation slots 278 may translate relative to fasteners 180 when actuator 106 is actuated. In some embodiments, translation slots 278 translating relative to fasteners 180 may allow beam 172 to move when actuator 106 is actuated. Translation slots 278 may each define a first end 278*a* and a second end 278*b*.

Figure 20B:
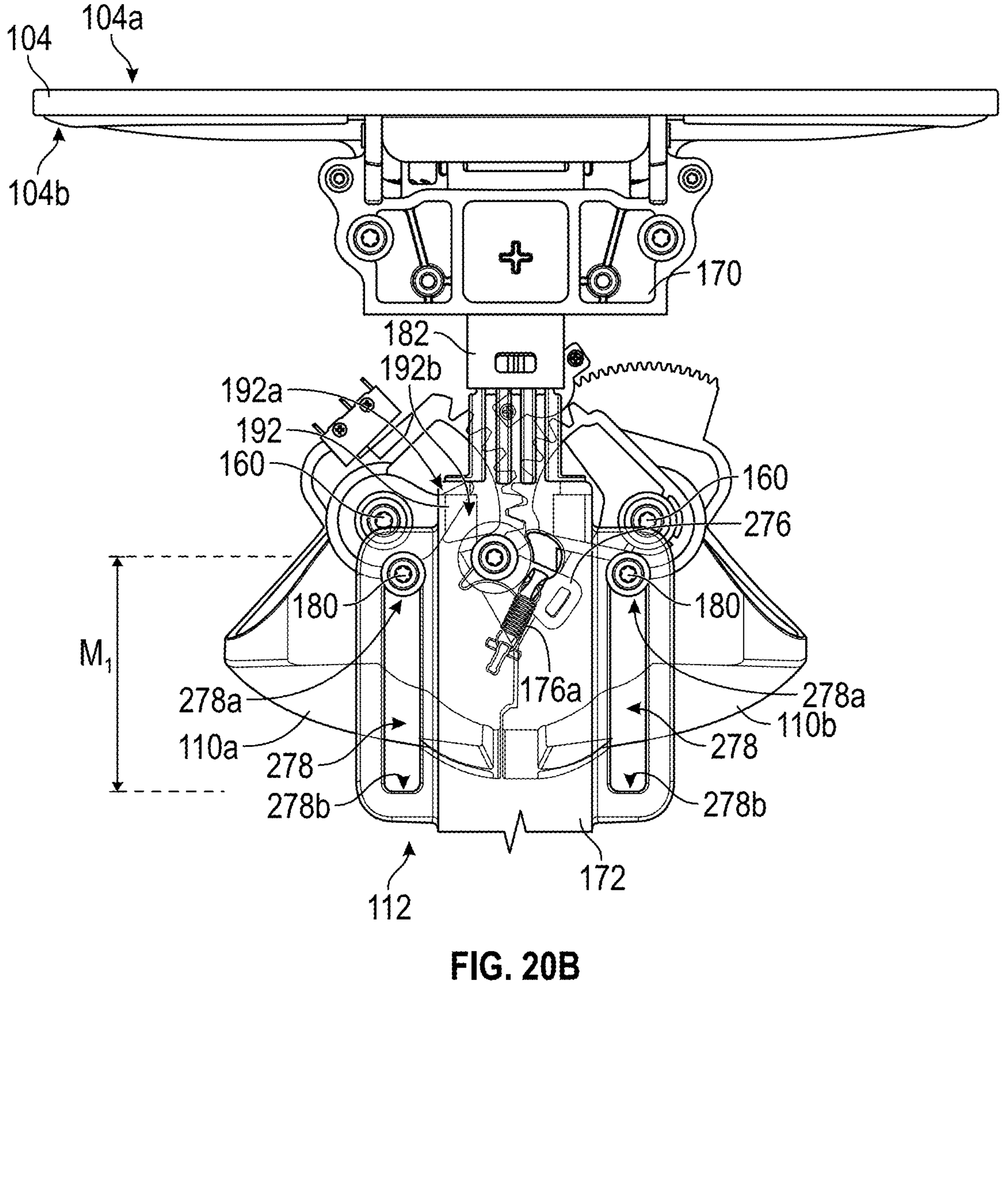
FIG. 20B illustrates a rear close-up view of some embodiments of the automatic door subassembly, the lid, the lid support, and the odor-blocking doors of the refuse container, with the lid closed in the down position, the odor-blocking doors in the closed configuration, and a beam of the automatic door subassembly made transparent.

FIG. 20A illustrates a side perspective view of some embodiments of automatic door subassembly 112, lid 104, lid support 170, actuator 106, doors 110*a*, 110*b*, and base 108 of refuse container 100, with lid 104 closed in the down position and doors 110*a*, 110*b* in the closed configuration. FIG. 20B illustrates a rear close-up view of some embodiments of automatic door subassembly 112, lid 104, lid support 170, and doors 110*a*, 110*b*, with lid 104 closed in the down position, doors 110*a*, 110*b* in the closed configuration, and beam 172 of automatic door subassembly 112 transparent for clarity of hidden components. FIGS. 20A-20B are meant to be viewed together.

Figure 21A:
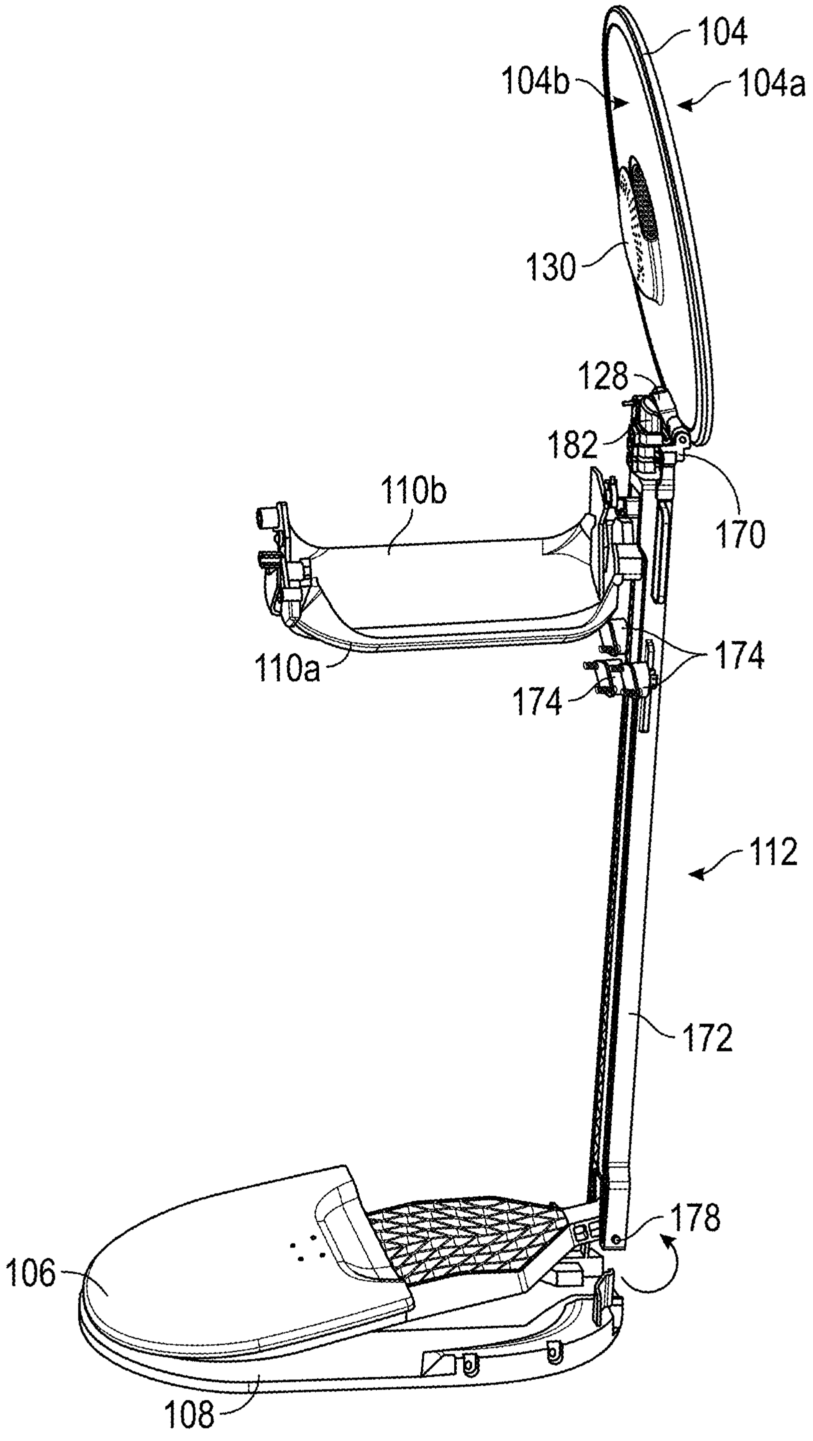
FIG. 21A illustrates a side perspective view of some embodiments of the automatic door subassembly, the lid, the lid support, the actuator, the odor-blocking doors, and the base of the refuse container, with the lid open in the upward position and the odor-blocking doors in the closed configuration.

Beam 172 may pivotally couple to actuator 106. Actuation of actuator 106 may pivot actuator 106 in a first direction (as shown in FIG. 21A) to cause beam 172 to contact lid 104 to open lid 104. Beam 172 may push lid 104 to open lid 104. In some embodiments, when beam 172 moves toward lid 104, beam 172 may push protrusion 128 of lid 104 to open lid 104. Actuator 106 may then pivot in a second direction to cause beam 172 to move away from lid 104 to close lid 104, as further discussed herein.

Beam 172 may pivotally couple to actuator 106 via rod 178 (shown in FIG. 19A). Actuator 106 may pivot about rod 178 in a first direction when actuated to cause beam 172 to move toward lid 104 to open lid 104. In some embodiments, actuator 106 may pivot about rod 178 in a second direction to cause beam 172 to move away from lid 104 to close lid 104, as discussed further herein. Actuator 106 pivoting about rod 178 may cause rod 178 and beam 172 to translate. Actuator 106 pivoting about rod 178 may cause translation of automatic door subassembly 112.

As shown in FIG. 20B, automatic door subassembly 112 is in a first position when the lid 104 is closed and the odor-blocking doors 110*a*, 110*b* are in the closed configuration. The first position may be defined by first ends 278*a* of translations slots 278 receiving fasteners 180. In some embodiments, fasteners 180 are a first distance $M_1$ from second ends 278*b* of translation slots 278 when automatic door subassembly 112 is in the first position. In some embodiments, lever 276 may be proximate a bottom 192*b* of door lever 192 when automatic door subassembly 112 is in the first position, such that lever 276 is below door lever 192.

Figure 21B:
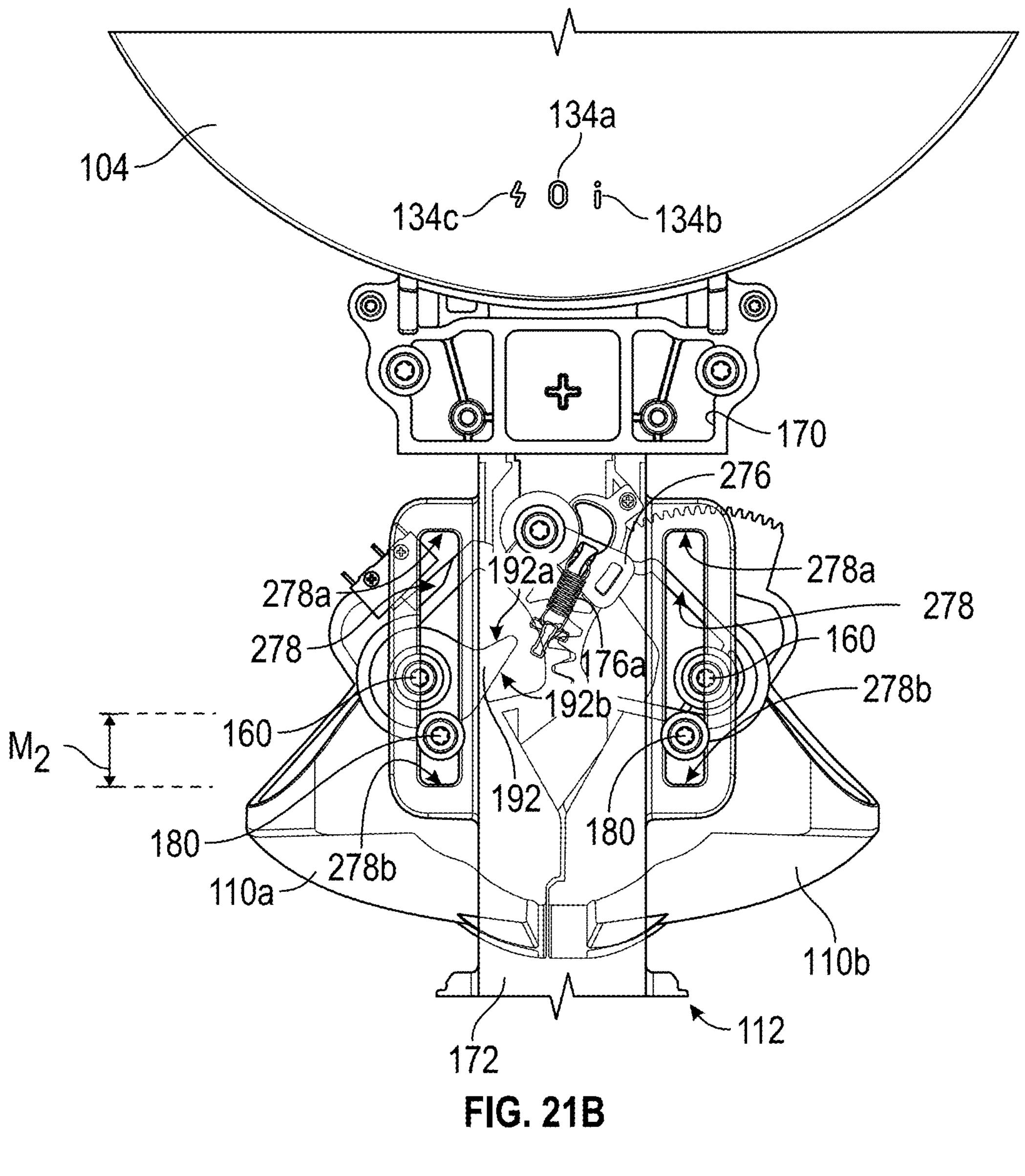
FIG. 21B illustrates a rear close-up view of some embodiments of the automatic door subassembly, the lid, the lid support, and the odor-blocking doors of the refuse container, with the lid open in the upward position, the odor-blocking doors in the closed configuration, and the beam made transparent.

FIG. 21A illustrates a side perspective view of some embodiments of automatic door subassembly 112, lid 104, lid support 170, actuator 106, doors 110*a*, 110*b*, and base 108 of refuse container 100, with lid 104 open in the upward position and doors 110*a*, 110*b* in the closed configuration. FIG. 21B illustrates a rear close-up view of some embodiments of automatic door subassembly 112, lid 104, lid support 170, and doors 110*a*, 110*b*, with lid 104 open in the upward position, doors 110*a*, 110*b* in the closed configuration, and beam 172 of automatic door subassembly 112 transparent for clarity of hidden components. FIGS. 21A-21B are meant to be viewed together. Actuation of actuator 106 may cause automatic door subassembly 112 to open lid 104. In some embodiments, actuation of actuator 106 may cause automatic door subassembly 112 to move toward lid 104 to open lid 104 to the upward position. In some embodiments, actuation of actuator 106 may include pressing actuator 106 to move automatic door subassembly 112 toward lid 104 to open lid 104 to the upward position. For example, in embodiments where the actuator 106 may be a pedal, a user may press on the pedal to move automatic door subassembly 112 toward lid 104 to open lid 104.

In some embodiments, actuating actuator 106 may translate beam 172 upward to push lid 104 to open to the upward position. In some embodiments, actuating actuator 106 may pivot actuator 106 about rod 178 in a first direction to translate rod 178 upward, as shown in FIG. 21A. Translation of rod 178 upward may translate automatic door subassembly 112 upward to contact lid 104 to open lid 104 to the upward position. In some embodiments, translation of rod 178 upward may translate beam 172 upward to contact lid 104 to open lid 104 to the upward position. Automatic door subassembly 112 may be in a second position when lid 104 is opened. The second position may be defined by beam cap 182 contacting protrusion 128 of lid 104 to maintain lid 104 in the upward position, as shown in FIG. 21A. In some embodiments, the second position of automatic door subassembly 112 may be defined by lever 276 being above top 192*a* of door lever 192, as shown in FIG. 21B. When the automatic door subassembly 112 is in the second position, the odor-blocking doors 110*a*, 110*b* may be in the closed configuration, such that odor from the second receiving chamber 154 of refuse container 100 does not reach a user when lid 104 is in the upward position. In some embodiments, fasteners 180 may be proximate second ends 278*b* of translation slots 278 when automatic door subassembly 112 is in the second position, as shown in FIG. 21B. Fasteners 180 may be a second distance $M_2$ away from second ends 278*b* of translation slots 278 when automatic door subassembly 112 is in the second position. Second distance $M_2$ may be less than first distance $M_1$, such that fasteners 180 are closer to second ends 278*b* of translation slots 278 when automatic door subassembly 112 is in the second position when compared to the first position.

In some embodiments, actuating actuator 106 may transition automatic door subassembly 112 from the first position to the second position to open lid 104. Transitioning automatic door subassembly 112 from the first position to the second position may load spring 176*b*. Automatic door subassembly 112 may move upward to transition from the first position to the second position. As the automatic door subassembly 112 moves from the first position to the second position, the lever 276 may move past the door lever 192 to mechanically charge the door lever 192. Mechanically charging the door lever 192 may ensure the doors 110*a*, 110*b* remain closed until the lid 104 moves back to the closed down position. The mechanical charging of the door lever 192 provides the advantage of ensuring the doors 110*a*, 110*b* are closed while the user is disposing of material in the refuse container 100.

In some embodiments, actuation of actuator 106 may cause automatic door subassembly 112 to move upward to contact lid 104 to lift lid 104 open to the upward position and move downward away from lid 104 to close lid 104 to the down position. In some embodiments, pressing the actuator 106 may cause the automatic door subassembly 112 to move upward to contact lid 104 to lift lid 104 open, and releasing actuator 106 may cause automatic door subassembly 112 to move downward away from lid 104 to close lid 104 to the down position.

In some embodiments, beam 172 may translate downward away from lid 104 to close lid 104 after opening lid 104 when actuator 106 is actuated. In some embodiments, actuator 106 may pivot about rod 178 in a second direction to translate rod 178 downward. In some embodiments, the second direction may be opposite the first direction. Translating rod 178 downward may cause beam 172 to translate downward away from lid 104 to thereby close lid 104 to the down position.

In some embodiments, releasing actuator 106 may cause beam 172 to translate downward away from lid 104 to thereby close lid 104 to the down position. In some embodiments, releasing actuator 106 may pivot actuator 106 about rod 178 in a second direction to translate rod 178 downward. Translating rod 178 downward may cause beam 172 to translate downward away from lid 104 to thereby close lid 104 to the down position.

In some embodiments, automatic door subassembly 112 may transition from the second position to the third position to close lid 104. The third position may be defined by beam cap 182 being positioned away from protrusion 128, such that lid 104 is closed in the down position. The third position may be defined by fasteners 180 being a third distance $M_3$ away from second ends 278*b* of translation slots 278. Third distance $M_3$ may be greater than second Distance $M_2$ and less than first Distance $M_1$, such that fasteners 180 are farther away from second ends 278*b* of translation slots 278 when automatic door subassembly 112 is in the third position than in the second position.

Figure 22:
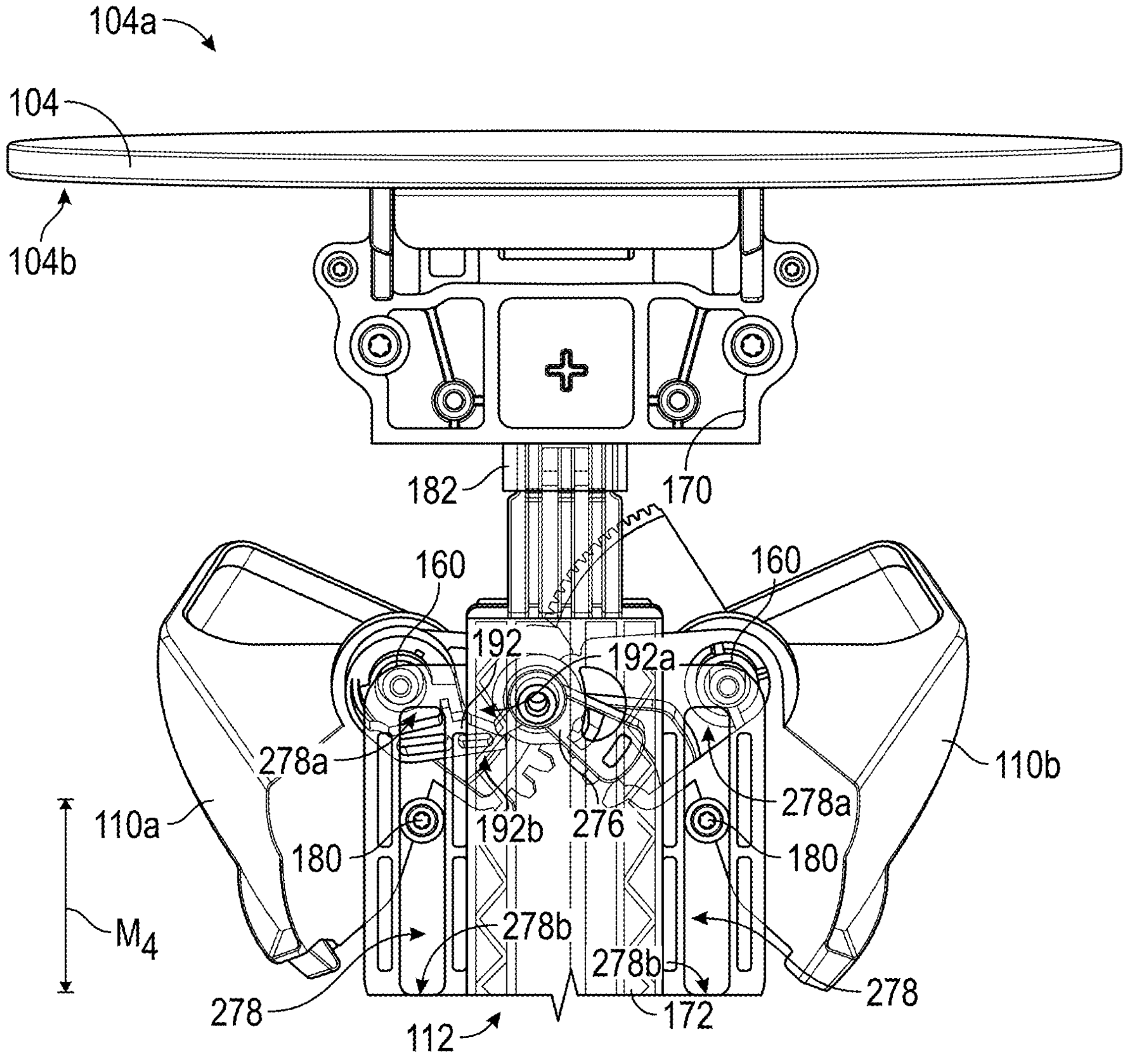
FIG. 22 illustrates a close-up rear view of the automatic door subassembly, the lid, the lid support, and the odor-blocking doors of the refuse container, with the lid closed in the down position and the odor-blocking doors in the open configuration, and with the beam made transparent and a spring of the automatic door subassembly removed.

FIG. 22 illustrates a close-up rear view of automatic door subassembly 112, lid 104, lid support 170, and doors 110*a*, 110*b*, with lid 104 closed in the down position and odor-blocking doors 110*a*, 110*b* in the open configuration, and with beam 172 transparent and spring 176*a* removed to show hidden components. Once lid 104 is in the down position, automatic door subassembly 112 may transition from the third position to the fourth position. In some embodiments, beam 172 may continue to move such that automatic door subassembly 112 contacts odor-blocking doors 110*a*, 110*b* when transitioning from the third position to the fourth position.

In some embodiments, beam 172 may continue to move such that lever 276 may contact door lever 192, as shown in FIG. 22. Lever 276 may contact door lever 192 to rotate odor-blocking doors 110*a*, 110*b* from the closed configuration to the open configuration. In some embodiments, actuating actuator 106 may cause automatic door subassembly 112 to contact odor-blocking doors 110*a*, 110*b* to thereby transition doors 110*a*, 110*b* from the closed configuration to the open configuration. For example, lever 276 may contact door lever 192 as beam 172 travels away from lid 104 to thereby rotate doors 110*a*, 110*b* from a closed configuration to the open configuration. Lever 276 may push door lever 192 to rotate odor-blocking doors 110*a*, 110*b* from the closed configuration to the open configuration. In some embodiments, lever 276 may push the top 192*a* of door lever 192 to cause odor-blocking doors 110*a*, 110*b* to rotate about door support 140 from the closed configuration to the open configuration. Automatic door subassembly 112 contacting doors 110*a*, 110*b* to open doors 110*a*, 110*b* after translating away from lid 104 to close lid 104 may keep odor of previously disposed refuse in the second receiving chamber 154 from reaching the user during refuse disposal. In some embodiments, lever 276 may apply a force to the door lever 192 to cause the door lever 192 to rotate to thereby cause odor-blocking doors 110*a*, 110*b* to rotate to an open configuration.

The odor-blocking doors 110*a*, 110*b* may rotate about fasteners 160 coupling odor-blocking doors 110*a*, 110*b* to door support 140 when moving between the closed configuration and the open configuration. In some embodiments, odor-blocking doors 110*a*, 110*b* may rotate about door support 140 when transitioning between the closed configuration and the open configuration. The odor-blocking doors 110*a*, 110*b* may rotate downward toward the base 108 and outward toward the housing 102 when moving from the closed configuration to the open configuration.

In some embodiments, the doors 110*a*, 110*b* may lift upward toward the lid 104, slide away toward an exterior of the housing 102, hingedly move, or pivot outward or inward to move from the closed configuration to the open configuration. In some embodiments, the doors 110*a*, 110*b* may move from the closed configuration to the open configuration through a four bar linkage or through cords that tightly hold the odor-blocking doors 110*a*, 110*b* closed when in the closed configuration and loosen for the doors 110*a*, 110*b* to move to the open configuration.

Automatic door subassembly 112 may be in a fourth position when lid 104 is closed and doors 110*a*, 110*b* are in the open configuration, as shown in FIG. 22. In some embodiments, the fourth position of automatic door subassembly 112 may be defined by lever 276 contacting a top 192*a* of door lever 192, as shown in FIG. 22. When the automatic door subassembly 112 is in the fourth position, the odor-blocking doors 110*a*, 110*b* may be in the open configuration, such that refuse disposed by the user may fall from the first receiving chamber 114 to the second receiving chamber 154 into the bottom of disposal bag 248. In some embodiments, fasteners 180 may be proximate first ends 278*a* of translation slots 278 when automatic door subassembly 112 is in the fourth position, as shown in FIG. 22. For example, fasteners 180 may be a fourth distance $M_4$ away from second ends 278*b* of translation slots 278 when automatic door subassembly 112 is in the fourth position. Fourth distance $M_4$ may be greater than third distance $M_3$ and second distance $M_2$, but less than first distance $M_1$ such that fasteners 180 are farther away from second ends 278*b* of translation slots 278 when automatic door subassembly 112 is in the fourth position, when compared to the third position.

In some embodiments, automatic door subassembly 112 transitioning from the third position to the fourth position may cause lever 276 to push the door lever 192 to thereby rotate the odor-blocking doors 110*a*, 110*b* from the closed configuration to the open configuration. Spring 176*b* may be loaded when automatic door subassembly 112 is in the second position and third position. In some embodiments, spring 176*b* biases automatic door subassembly 112 to the fourth position from the third position. In some embodiments, releasing actuator 106 may cause spring 176*b* to bias the automatic door subassembly 112 from the second position to the third position and from the third position to the fourth position.

Figure 23:
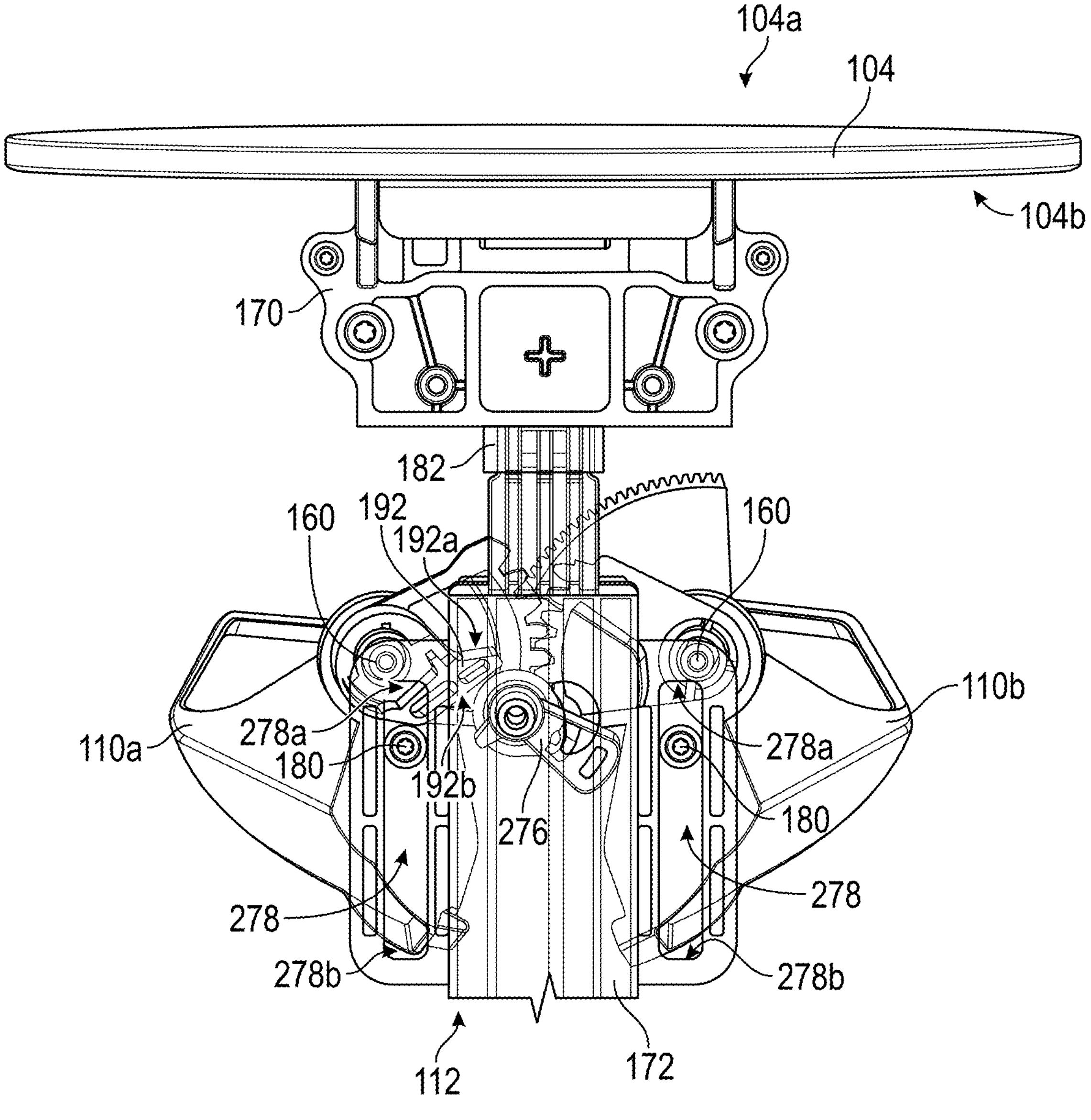
FIG. 23 illustrates a close-up rear view of the automatic door subassembly, the lid, the lid support, and the odor-blocking doors of the refuse container, with the lid closed in the down position and the odor-blocking doors in an intermediate configuration, and with the beam made transparent and the spring of the automatic door subassembly removed.

FIG. 23 illustrates a close-up rear view of automatic door subassembly 112, lid 104, lid support 170, and doors 110*a*, 110*b*, with lid 104 closed in the down position and odor-blocking doors 110*a*, 110*b* in an intermediate configuration, and with beam 172 transparent and spring 176*a* removed for clarity of certain hidden components. The odor-blocking doors 110*a*, 110*b* may be in an intermediate configuration when the doors 110*a*, 110*b* transition from the open configuration to the closed configuration. Automatic door subassembly 112 may continue moving away from lid 104 such that automatic door subassembly 112 releases odor-blocking doors 110*a*, 110*b* to transition the doors 110*a*, 110*b* from the open configuration to the closed configuration. In some embodiments, automatic door subassembly 112 may continue moving away from lid 104 such that lever 276 releases and moves away from door lever 192. In some embodiments, lever 276 may release from door lever 192 when automatic door subassembly transitions from the fourth position to the first position. When lever 276 releases from door lever 192, odor-blocking doors 110*a*, 110*b* may bias from the open configuration back to the closed configuration.

In some embodiments, spring 176*b* may still be loaded when automatic door subassembly 112 is in the fourth position to transition automatic door subassembly 112 from the fourth position back to the first position. Spring 176*b* may continue biasing automatic door subassembly 112 to translate downward such that lever 276 releases door lever 192. When lever 276 releases from door lever 192, odor-blocking doors 110*a*, 110*b* may bias back to the closed configuration. In some embodiments, the groove 200 and projection 198 of odor-blocking doors 110*a*, 110*b* may be heavy enough to cause doors 110*a*, 110*b* to bias back to the closed configuration once lever 276 moves away from door lever 192. In some embodiments, lever 276 may move below door lever 192 such that odor-blocking doors 110*a*, 110*b* fall back to the closed configuration after the doors 110*a*, 110*b* are opened by the automatic door subassembly 112. In some embodiments, once lever 276 releases door lever 192, door lever 192 may rotate to cause odor-blocking doors 110*a*, 110*b* to rotate back from the open configuration to the closed configuration. Odor-blocking doors 110*a*, 110*b* rotating back from the open configuration to the closed configuration may include groove 200 mating with projection 198. In some embodiments, odor-blocking doors 110*a*, 110*b* may rotate about fasteners 160 coupled to door support 140 to thereby move from the open configuration to the closed configuration. Odor-blocking doors 110*a*, 110*b* may rotate about door support 140 to move from the open configuration to the closed configuration.

In some embodiments, at least one of the odor-blocking doors 110*a*, 110*b* may bias a spring when in the open configuration, such that spring biases the doors 110*a*, 110*b* back to the closed configuration when lever 276 moves away from door lever 192. The spring may become biased when lever 276 contacts the door lever 192. The biased spring may cause the doors 110*a*, 110*b* to rotate from the open configuration to the closed configuration once the lever 276 releases and moves past the door lever 192. The spring may be any structure that becomes biased and/or loaded to cause the doors to return to the closed configuration. The spring may also provide a bias force to maintain the odor-blocking doors 110*a*, 110*b* in the closed configuration to provide a tight fit between doors 110*a*, 110*b* such that odor does not escape into the first receiving chamber 114 when a user is disposing of materials.

The sequential steps of the automatic door subassembly 112 will now be described. A user may actuate the actuator 106. In some embodiments, actuating the actuator 106 may include pressing on a pedal or a button. Actuating the actuator 106 may cause the automatic door subassembly 112 to transition from the first position to the second position. The automatic door subassembly 112 may push lid 104 open to the upward position when transitioning from the first position to the second position. In some embodiments, beam 172 may push lid 104 to open lid 104 to the upward position when automatic door subassembly transitions from the first position to the second position. Transition of the automatic door subassembly 112 from the first position to the second position may load spring 176*b*.

The automatic door subassembly 112 may move from the second position to the third position after opening lid 104 and when actuator 106 is actuated. In some embodiments, releasing actuator 106 may cause automatic door subassembly 112 to move from the second position to the third position. The loaded spring 176*b* may bias the automatic door subassembly 112 to travel from the second position to the third position. As the automatic door subassembly 112 transitions from the second position to the third position, the lid 104 may close to the down position. In some embodiments, beam 172 may move away from lid 104 to cause lid 104 to fall closed to the down position.

Once the lid 104 is closed, the automatic door subassembly 112 may transition from the third position to the fourth position when actuator 106 is actuated. In some embodiments, the automatic door subassembly 112 may continue to travel away from lid 104 such that lever 276 contacts the door lever 192 when the automatic door subassembly 112 transitions from the third position to the fourth position. In some embodiments, spring 176*b* may continue to bias automatic door subassembly 112 to translate downward to cause lever 276 to contact door lever 192. As automatic door subassembly 112 travels downward, lever 276 may apply a force to door lever 192 to thereby cause door lever 192 to rotate. Rotation of door lever 192 via force applied by lever 276 may cause odor-blocking doors 110*a*, 110*b* to rotate about door support 140 from the closed configuration to the open configuration.

The automatic door subassembly 112 may transition from the fourth position to the first position when actuator 106 is actuated. In some embodiments, automatic door subassembly 112 may continue moving away from lid 104 such that lever 276 releases door lever 192 when the automatic door subassembly 112 transitions from the fourth position to the first position. In some embodiments, spring 176*b* may still be loaded when automatic door subassembly 112 is in the fourth position to transition automatic door subassembly 112 from the fourth position back to the first position. Spring 176*b* may continue biasing automatic door subassembly 112 to translate downward such that lever 276 releases and moves away from door lever 192. Once the lever 276 releases door lever 192, the door lever 192 may rotate to cause the odor-blocking doors 110*a*, 110*b* to rotate from the open configuration back to the closed configuration.

Actuation of actuator 106 to initiate the automatic door subassembly 112 may cause the steps of lid 104 opening/closing and door 110*a*, 110*b* opening/closing to occur in a sequence that minimizes odor escape from the second receiving chamber 154 to the user. The automatic door subassembly 112 may cause the lid 104 to close prior to the odor-blocking doors 110*a*, 110*b* opening, such that odor from previously disposed material does not escape into the first receiving chamber 114 from the second receiving chamber 154 before the lid 104 closes. The automatic door subassembly 112 may use minimal energy from the user and displace the energy across components of the refuse container, such as the lid 104 and automatic door subassembly 112. The automatic door subassembly 112 may function without external outlet or electrical power, thereby providing the advantage of increasing the user accessibility and versatility of the refuse container 100. In some embodiments, the automatic door subassembly 112 may comprise a motor connected to a PCBA 222 and function with external electrical power or with internal electrical power, such as power supply 136. The open configuration of the odor-blocking doors 110*a*, 110*b* may provide a wide clearance through which various-sized trash and disposed material may fall into the bottom of the second receiving chamber 154. The wide clearance formed by the open configuration may provide the advantage of the refuse container 100 being able to receive a large variety of disposed material, thereby increasing the versatility of the refuse container 100.

In some embodiments, the automatic door subassembly 112 may move the doors 110*a*, 110*b* from the closed configuration to the open configuration through a pawl and rachet, plunger, rack and pinion, or over-center linkage. In some embodiments, the automatic door subassembly 112 may move doors 110*a*, 110*b* between the closed configuration and open configuration using a wedge that moves forward to insert between doors 110*a*, 110*b* to open the doors 110*a*, 110*b*, and moves backward to move away from doors 110*a*, 10*b* to close doors 110*a*, 110*b*.

In some embodiments, the automatic door subassembly 112 and actuator 106 may electrically connect to PCBA 222. The automatic door subassembly 112 may also comprise PCBA 222. Sensors and a motor may also be electrically coupled to the PCBA 222 and form part of the automatic door subassembly 112. The motor may mechanically couple to the odor-blocking doors 110*a*, 110*b* and the lid 104. The PCBA 222 may instruct the automatic door subassembly 112 to perform the above sequence of steps. For example and in some embodiments, actuation of actuator 106 may send a signal to PCBA 222. PCBA 222 may then cause the motor to open the lid and close the lid. A sensor coupled to the PCBA 222 may sense when the lid 104 moves from the up position and closes to the down position, and send a signal to the PCBA 222. The PCBA 222 may then instruct the motor to transition the odor-blocking doors 110*a*, 110*b* from the closed configuration to the open configuration.

In some embodiments, a processor may electrically connect to PCBA 222, and the processor may instruct the motor to open and close the lid 104 when PCBA 222 receives a signal from the actuator 106 when actuated. When the lid 104 moves to the down position, PCBA 222 may receive a signal from the sensor indicating the lid 104 closed and processor may be programmed to instruct the motor to transition odor-blocking doors 110*a*, 110*b* from the closed configuration to the open configuration when PCBA 222 receives the signal.

In some embodiments, PCBA 222 may receive input from the actuator 106 when actuated. Once the PCBA 222 receives input from the actuator 106, a processor connected to PCBA 222 may be programmed to instruct a timer to start a first time period. The processor may instruct the motor to open the lid 104 by the end of the first time period. Once the timer reaches the end of the first time period and the lid 104 is in the open/upright position, the processor may instruct the motor to close the lid 104 within a second time period. In some embodiments, a sensor may be positioned within first receiving chamber 114. When the sensor senses refuse has been placed in the first receiving chamber 114 on top of odor-blocking doors 110*a*, 110*b* in the closed configuration, sensor may signal PCBA 222. When PCBA 222 receives a signal from the sensor, the processor may be programmed to instruct the motor to close lid 104. Once a second sensor proximate top 102*a* of housing 102 senses the lid 104 has closed, the PCBA 222 may receive input from the second sensor when the lid 104 moves to the closed position. When PCBA 222 receives input from the second sensor, the processor may be programmed to instruct the timer to start a third time period in which to open the odor-blocking doors 110*a*, 110*b*. The second sensor may be a motion sensor. The processor may instruct the motor to open the odor-blocking doors 110*a*, 110*b* within the third time period. A third sensor positioned proximate odor-blocking doors 110*a*, 110*b* may sense when the disposed material falls between the open odor-blocking doors 110*a*, 110*b*. The PCBA 222 may receive input from the third sensor and the processor may instruct the motor to close the odor-blocking doors 110*a*, 110*b* when PCBA 222 receives input from the third sensor.

Manual Door Subassembly

In some embodiments, the refuse container may comprise a manual door subassembly 148. The manual door subassembly 148 may allow a user to manually open and close the odor-blocking doors 110*a*, 110*b* during bag removal or bag replacement, as further discussed herein. The manual door subassembly 148 may provide the advantage of allowing for easy bag replacement and cleaning of the refuse container 100. The manual door subassembly 148 may allow users to manually open the odor-blocking doors 110*a*, 110*b* in the event one of the indicators 134*a*, 134*b*, 134*c* indicates an error state of the refuse container 100. An error state may be indicated when trash or disposal material is stuck between the odor-blocking doors 110*a*, 110*b*, thereby keeping the doors 110*a*, 110*b* from moving to the closed configuration.

Figure 24:
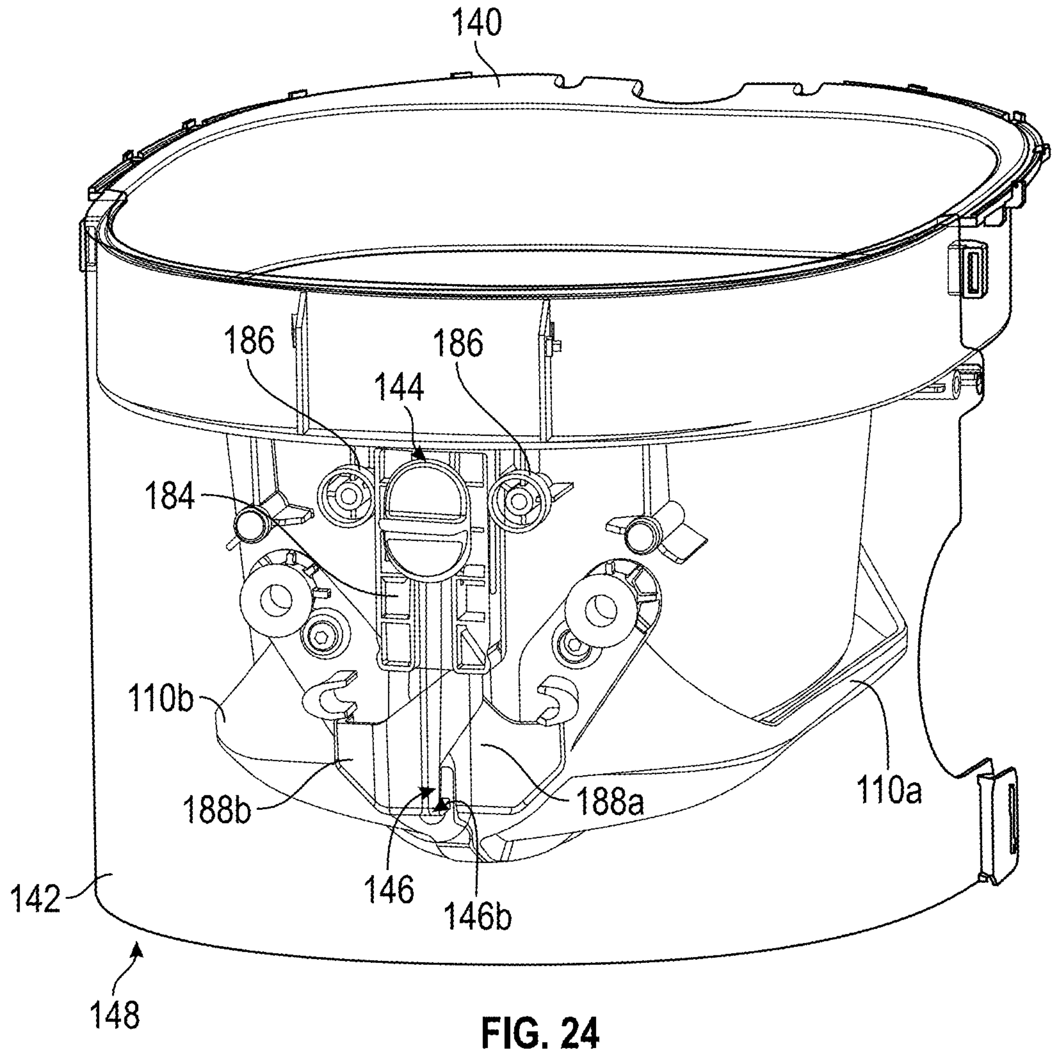
FIG. 24 illustrates a front perspective view of some embodiments of a manual door subassembly, the door support, and the odor-blocking doors of the refuse container, with the support mount made transparent.

FIG. 24 illustrates a front perspective view of some embodiments of manual door subassembly 148, door support 140, and odor-blocking doors 110*a*, 110*b*, with the support mount 142 transparent for clarity of hidden components. The switch 144, support mount 142, and switch springs 186 may form the manual door subassembly 148. The manual door subassembly 148 may comprise the switch 144, support mount 142, and switch springs 186. Switch 144 may comprise slider 184. A user may interact with switch 144 to manually open and close the odor-blocking doors 110*a*, 110*b*. Switch springs 186 may operatively couple switch 144 to support mount 142. In some embodiments, one end of each switch spring 186 couples to slider 184 of switch 144, and the other end of each switch spring 186 attaches to support mount 142. In some embodiments, switch springs 186 may be retractor springs that provide the advantage of biasing the switch 144 to close the odor-blocking doors 110*a*, 110*b*, as discussed further herein.

When the odor-blocking doors 110*a*, 110*b* are in the closed configuration, switch 144 receives at least a portion of each odor-blocking door 110*a*, 110*b*. In some embodiments, When the odor-blocking doors 110*a*, 110*b* are in the closed configuration, slider 184 of switch 144 receives at least a portion of each extension 188*a*, 188*b* of each odor-blocking door 110*a*, 110*b*. When the odor-blocking doors 110*a*, 110*b* are in the closed configuration, switch 144 may be received in a first end 146*a* of slot 146 of support mount 142. Switch 144 may travel within slot 146 to manually open and close the odor-blocking doors 110*a*, 110*b*, as further discussed herein.

FIG. 25 illustrates a bottom perspective view of some embodiments of switch 144 of refuse container 100. Switch 144 may comprise slider 184. Slide may have a first side 184*a* (not shown) and second side 184*b*. Sides 184*a*, 184*b* may be configured to receive a portion of extensions 188*a*, 188*b* when odor-blocking doors 110*a*, 110*b* are in the open configuration. In some embodiments, sides 184*a*, 184*b* may be configured to receive tips 202*a*, 202*b* of extensions 188*a*, 188*b* when odor-blocking doors 110*a*, 110*b* are in the open configuration, as discussed further herein.

In some embodiments, slider 184 may define at least one cavity configured to receive an extension of an odor-blocking door. In some embodiments, slider 184 may define a first cavity and a second cavity, each configured to receive an extension of one of the odor-blocking doors 110*a*, 110*b*. When odor-blocking doors are in the closed configuration, cavities 280*a*, 280*b* may receive at least a portion of each extension 188*a*, 188*b* of odor-blocking doors 110*a*, 110*b*. In some embodiments, cavities 280*a*, 280*b* may receive at least a portion of each extension 188*a*, 188*b* of odor-blocking doors 110*a*, 110*b* when switch 144 is received in first end 146*a* of slot 146. Cavities 280*a*, 280*b* may define surfaces 282*a*, 282*b*. Extensions 188*a*, 188*b* may contact surfaces 282*a*, 282*b* when manual door subassembly 148 is in a first position. Extensions 188*a*, 188*b* may move along surfaces 282*a*, 282*b* when manual door subassembly moves between a first position and a second position to thereby move odor-blocking doors 110*a*, 110 between the closed configuration and open configuration, as further discussed herein.

Figure 26A:
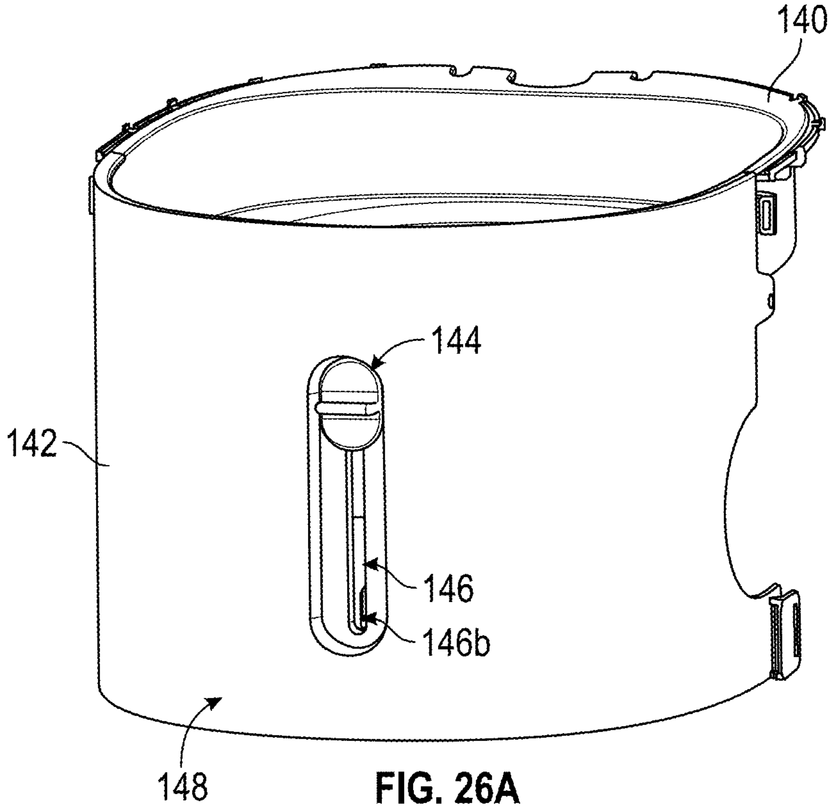
FIG. 26A illustrates a front perspective view of some embodiments of the manual door subassembly, the door support, and the odor-blocking doors of the refuse container when the manual door subassembly is in a first position.
Figure 26B:
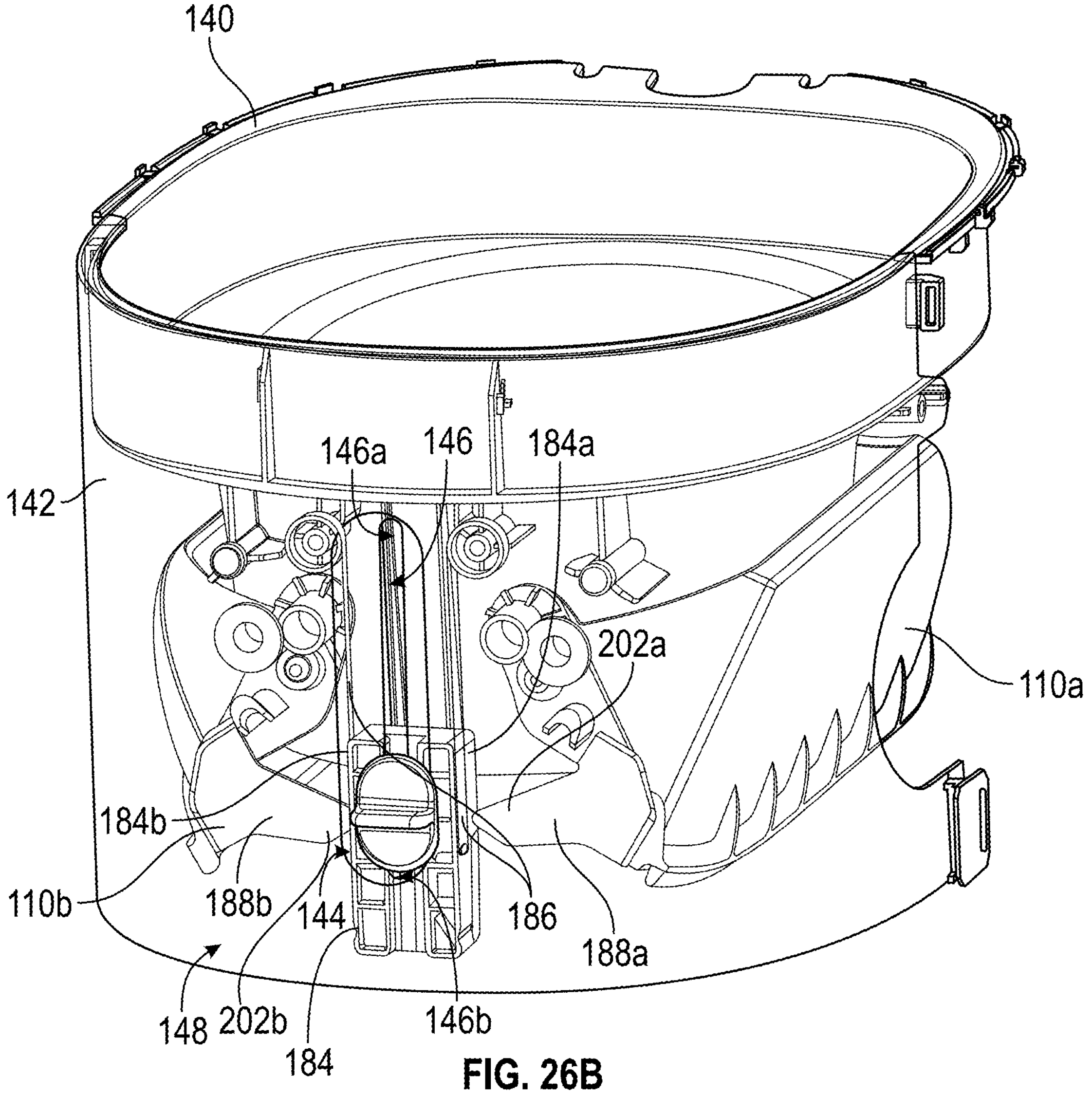
FIG. 26B illustrates a front perspective view of some embodiments of the manual door subassembly, the door support, and the odor-blocking doors of the refuse container when the manual door subassembly is in a second position, with the support mount made transparent.

FIG. 26A illustrates a front perspective view of some embodiments of manual door subassembly 148, door support 140, and odor-blocking doors 110*a*, 110*b* when manual door subassembly 148 is in the first position. The first position of the manual door subassembly 148 may be defined by switch 144 being received by a first end 146*a* of slot 146 of support mount 142. The first position of the manual door subassembly 148 may be defined by extensions 188*a*, 188*b* being received in cavities 280*a*, 280*b* of slider 184. When manual door subassembly 148 is in the first position, odor-blocking doors 110*a*, 110*b* may be in the closed configuration.

FIG. 26B illustrates a front perspective view of some embodiments of manual door subassembly 148, door support 140, and odor-blocking doors 110*a*, 110*b* when manual door subassembly 148 is in a second position, with support mount 142 transparent for clarity of hidden components. When manual door subassembly 148 is in the second position, odor-blocking doors 110*a*, 110*b* may be in the open configuration, as shown in FIG. 26B. The manual door subassembly may be moved from the first position to the second position to open the odor-blocking doors 110*a*, 110*b*.

The second position of manual door subassembly 148 may be defined by switch 144 being received in a second end 146*b* of slot 146 of support mount 142. Manual door subassembly 148 may transition between first position and the second position by a user moving switch 144 along slot 146. In some embodiments, translation of switch 144 may transition manual door subassembly 148 between the first position and the second position. In some embodiments, a user pushing switch 144 downward along slot 146 may transition manual door subassembly 148 from the first position to the second position. Transitioning manual door subassembly 148 from the first position to the second position may move odor-blocking doors 110*a*, 110*b* from the closed configuration to the open configuration.

In some embodiments, translating switch 144 from the first end 146*a* of slot to the second end 146*b* transitions the odor-blocking doors 110*a*, 110*b* from the closed configuration to the open configuration. As switch 144 is translated from the first end 146*a* to the second end 146*b*, extensions 188*a*, 188*b* may move along surfaces 282*a*, 282*b* of slider 184 to rotate the odor-blocking doors 110*a*, 110*b* about door support 140 from the closed configuration to the open configuration. In some embodiments, surfaces 282*a*, 282*b* may be slanted or inclined to push extensions 188*a*, 188*b* outward as switch 144 translates toward the second end 146*b* of slot 146 to thereby open the odor-blocking doors 110*a*, 110*b*.

When the manual door subassembly 148 is in the second position, extensions 188*a*, 188*b* may rest on sides 184*a*, 184*b* of slider 184 outside of cavities 280*a*, 280*b*. In some embodiments, tips 202*a*, 202*b* of extensions 188*a*, 188*b* may rest on sides 184*a*, 184*b* of slider 184. Sides 184*a*, 184*b* may maintain extensions 188*a*, 188*b* outside of cavities 280*a*, 280*b* such that odor-blocking doors 110*a*, 110*b* remain in the open configuration while the manual door subassembly 148 is in the second position. Moving switch 144 from the second end 146*b* of slot 146 to the first end 146*a* may cause extensions 188*a*, 188*b* to move into cavities 280*a*, 280*b* and slide back along surfaces 282*a*, 282*b* to thereby transition odor-blocking doors 110*a*, 110*b* from the open configuration to the closed configuration.

Switch springs 186 may become loaded when manual door subassembly 148 is in the second position, such that switch springs 186 may bias switch 144 to the first end 146*a* of slot 146 to close odor-blocking doors 110*a*, 110*b* when a user moves switch 144 to the first end 146*a* of slot 146. Switch springs 186 may provide the advantage of decreasing the force a user must apply when moving switch 144 from the second end 146*b* to the first end 146*a* to transition the odor-blocking doors 110*a*, 110*b* from the open configuration to the closed configuration. Switch springs 186 may assist in retracting switch 144 to the first end 146*a* of slot 146 to thereby close the odor-blocking doors 110*a*, 110*b*.

In some embodiments, switch 144 may be a button, and a user may press the button to transition the odor-blocking doors 110*a*, 110*b* between the closed configuration and the open configuration. In some embodiments, switch 144 may be a lever and a user may pull down the lever to transition the odor-blocking doors 110*a*, 110*b* from the closed configuration to the open configuration. When a user pulls the lever, the lever may compress springs and a latch may hold the lever down. When a user pushes the lever up to close the odor-blocking doors 110*a*, 110*b* to the closed configuration, springs may bias the lever upward and latch may unlatch the lever to allow the lever to travel upward to thereby transition the doors 110*a*, 110*b* from the open configuration to the closed configuration.

Figure 27:
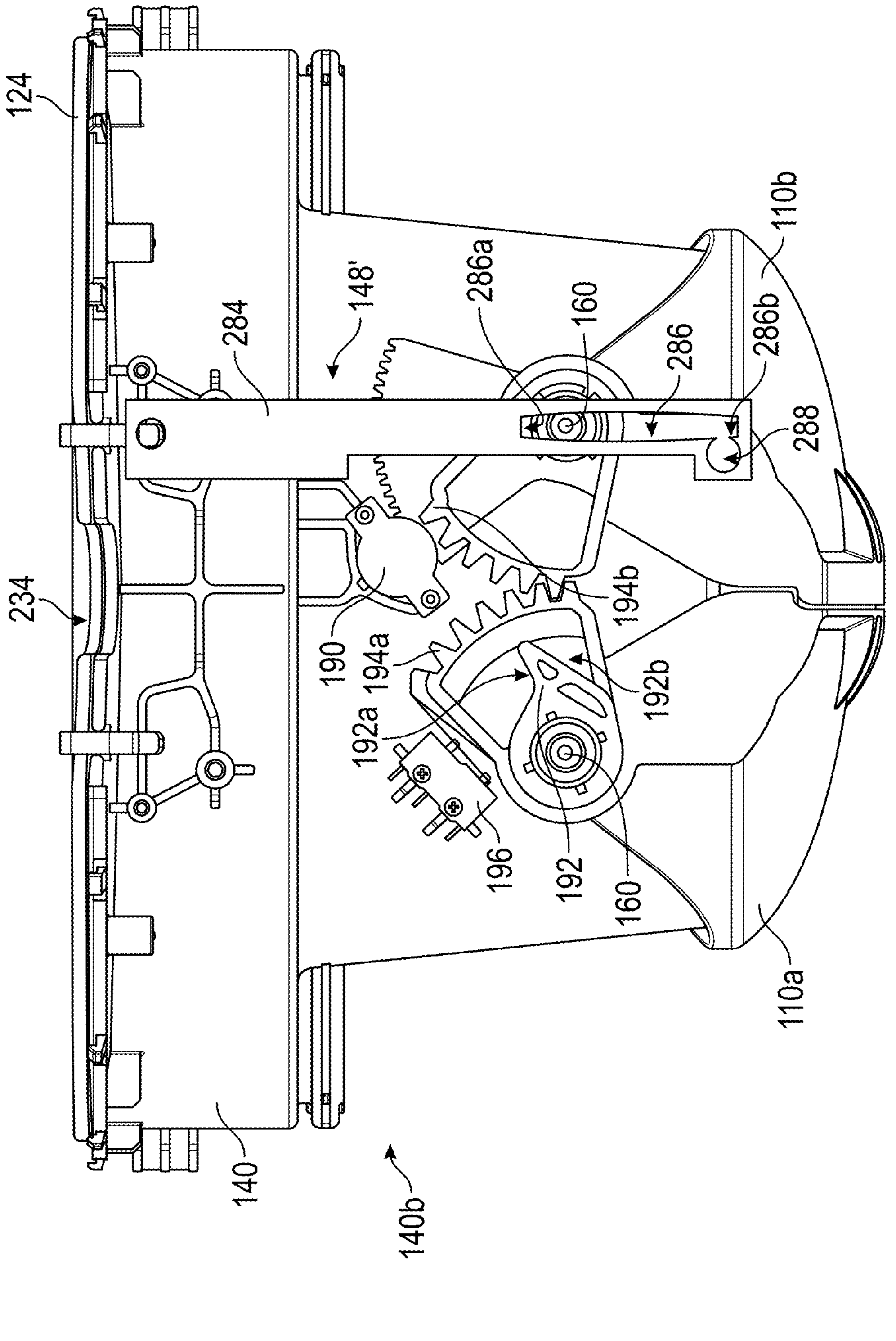
FIG. 27 illustrates a rear view of some embodiments of the manual door subassembly, the odor-blocking doors, the trim cover, and the door support of the refuse container, with the trim cover closed in the down position.

FIG. 27 illustrates a rear view of some embodiments of a manual door subassembly 148', odor-blocking doors 110*a*, 110*b*, trim cover 124, and door support 140 of refuse container 100, with trim cover 124 closed in the down position. In some embodiments, manual door subassembly 148' may be linked to trim cover 124, 124', such that opening trim cover 124, 124' to an upward position during bag removal or bag replacement causes the odor-blocking doors 110*a*, 110*b* to open. The manual door subassembly 148' may couple the trim cover 124, 124' to the odor-blocking doors 110*a*, 110*b*. Closing the trim cover 124, 124' may cause the manual door subassembly 148' to close the odor-blocking doors 110*a*, 110*b*. The trim cover 124, 124' may be positioned below the lid 104 when the lid 104 is closed in the down position, such that the lid 104 may open to the open/upright position when the user moves the trim cover 124, 124' open to the upward position.

The manual door subassembly 148' may comprise at least one trim cover linkage 284. The trim cover linkage 284 may fixedly attach to the trim cover 124, 124' and the trim cover linkage 284 may comprise a linkage slot 286. The linkage 284 may slidably connect to at least one of the odor-blocking doors 110*a*, 110*b*. Fastener 160 coupling odor-blocking doors 110*a*, 110*b* to rear side 140*b* of door support 140 may be received in linkage slot 286 and slidably move within the linkage slot 286 of the linkage 284 to thereby move the odor-blocking doors 110*a*, 110*b* between the closed configuration and the open configuration when the trim cover 124, 124' is moved by a user.

In some embodiments, linkage slot 286 may comprise a cutout 288. Once the user moves the trim cover 124, 124' to the upright position, the fastener 160 received in linkage slot 286 may catch within the cutout 288 to maintain the odor-blocking doors 110*a*, 110*b* in the open configuration.

In some embodiments, linkage slot 286 may comprise a first end 286*a* and a second end 286*b*. Opening the trim cover 124, 124' may cause the fastener 160 received in slot 286 to slide within the slot 286 between the first end 286*a* and the second end 286*b*. When the trim cover 124, 124' is in the upright position, the fastener 160 received in slot 286 may be positioned in the second end 286*b* of slot 286. The fastener 160 received in slot 286 moving to the second end 286*b* of slot 286 may cause odor-blocking doors 110*a*, 110*b* to rotate from the closed configuration to the open configuration. Closing trim cover 124, 124' may cause the fastener 160 received in linkage slot 286 to move from the second end 286*b* of slot 286 toward the first end 286*a* of the slot 286, thereby causing the odor-blocking doors 110*a*, 110*b* to rotate from the open configuration to the closed configuration.

In some embodiments, when the odor-blocking doors 110*a*, 110*b* are in the open configuration, springs coupled to doors 110*a*, 110*b* may become loaded. When a user starts to close the trim cover 124, 124', the springs may bias the odor-blocking doors 110*a*, 110*b* to rotate from the open configuration to the closed configuration.

In some embodiments, a user may actuate the manual door subassembly 148 by performing a different action on the actuator 106. For example, pressing the actuator 106 once may operate the automatic door subassembly 112, while pressing the actuator 106 twice may operate the manual door subassembly 148 to transition the odor-blocking doors 110*a*, 110*b* from the closed configuration to the open configuration.

Latch

Figure 28:
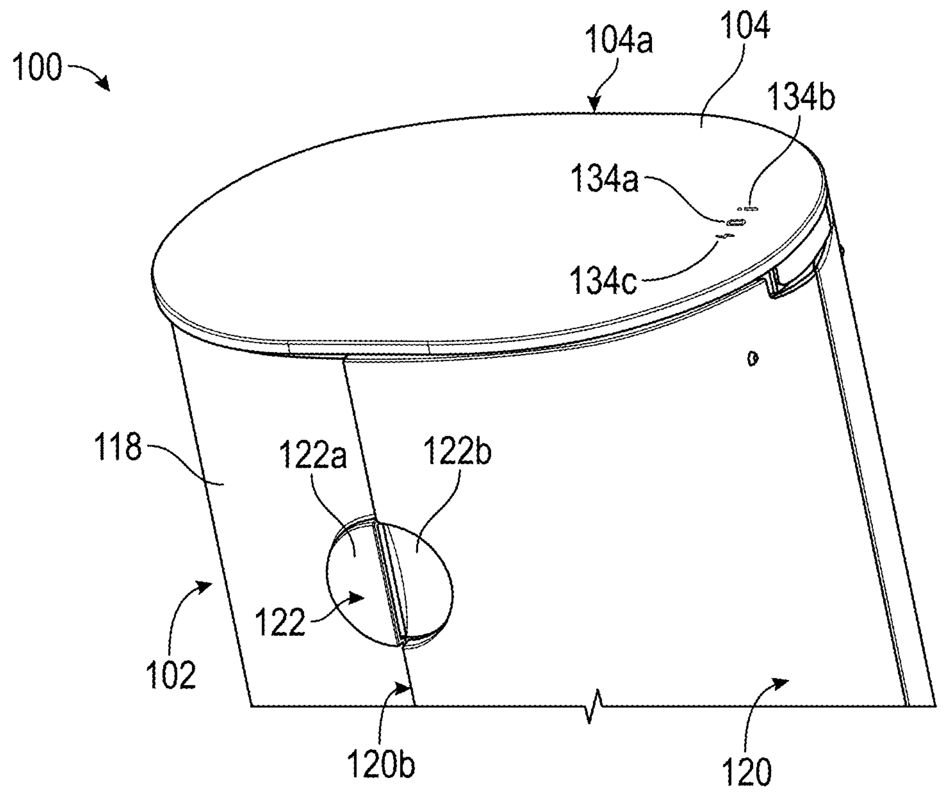
FIG. 28 illustrates a close-up side perspective view of the refuse container with the lid closed in the down position.

FIG. 28 illustrates a close-up side perspective view of refuse container 100 with the lid 104 closed in the down position. Refuse container 100 comprises a latch 122. Latch 122 may be configured to close front panel 118 onto the second side 120*b* of rear panel 120 to thereby close housing 102. Latch 122 may comprise a first portion 122*a* and a second portion 122*b*. First portion 122*a* of latch 122 may be attached to front panel 118 and second portion 122*b* of latch 122 may be attached to inner wall 150. Second portion 122*b* may be positioned between inner wall 150 and rear panel 120 of housing 102. Second portion 122*b* may extend outward from rear panel 120. First portion 122*a* and second portion 122*b* may interact to close housing 102. In some embodiments, first portion 122*a* may engage with second portion 122*b* to close front panel 118 onto second side 120*b* of rear panel 120, thereby closing housing 102.

Figure 29A:
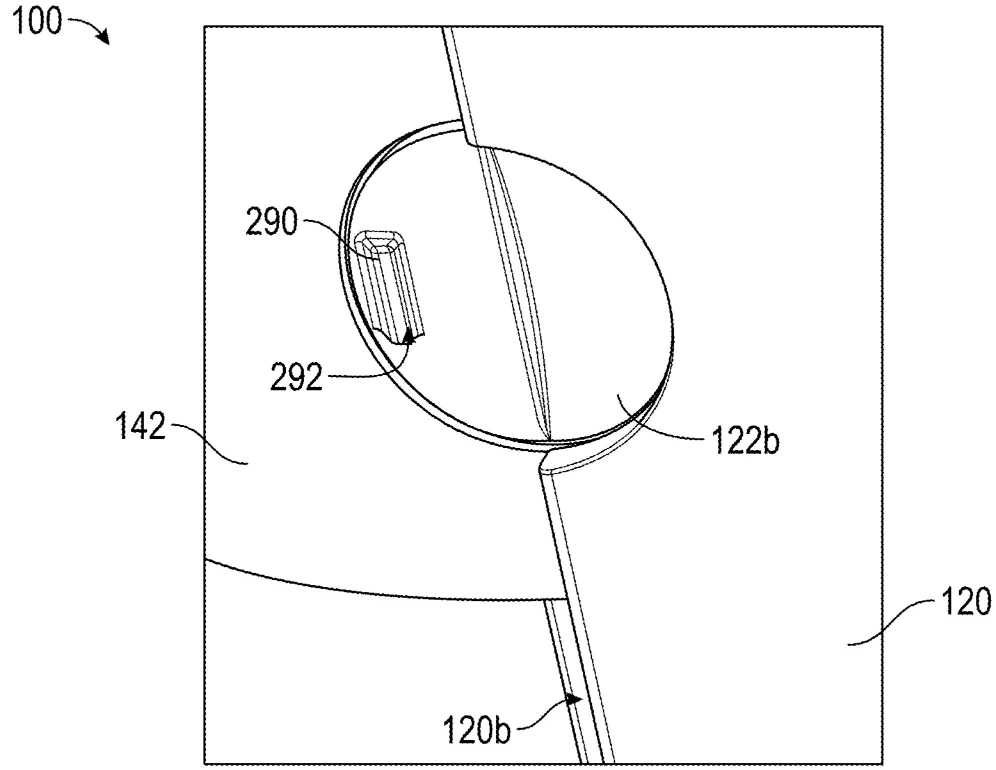
FIG. 29A illustrates a side perspective close-up view of some embodiments of a second portion of a latch of the refuse container, with the front panel opened.

FIG. 29A illustrates a side perspective close-up view of some embodiments of second portion 122*b* of latch 122 in refuse container 100, with front panel 118 opened. Second portion 122*b* may comprise a clasp 290 extending outward from second portion 122*b*. Clasp 290 may extend from the second side 120*b* of the rear panel 120. Clasp 290 may comprise an indent 292 which receives first portion 122*a* of latch 122 to engage latch 122 and thereby close housing 102, as discussed further herein.

Figure 29B:
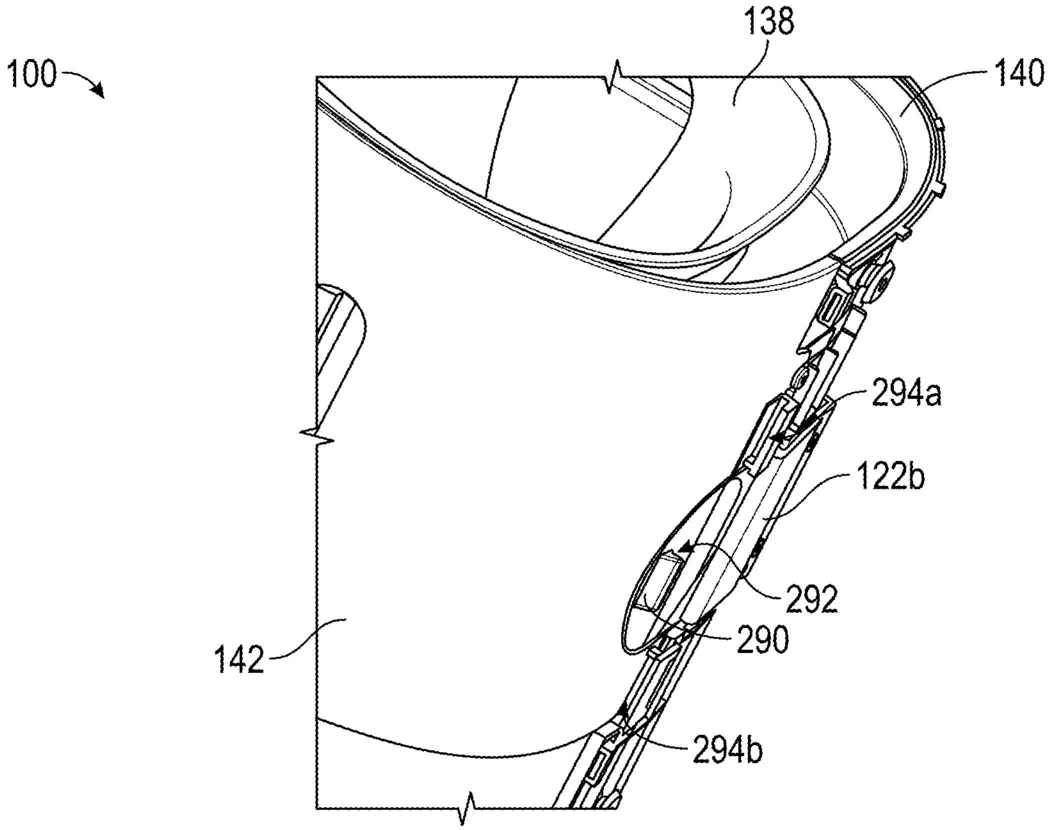
FIG. 29B illustrates a front perspective close-up view of the second portion of the latch of the refuse container, with the front panel opened and the rear panel removed.

FIG. 29B illustrates a front perspective close-up view of second portion 122*b* of latch 122 in refuse container 100, with front panel 118 opened and rear panel 120 removed for clarity of certain internal components. Inner wall 150 may define sockets 294*a*, 294*b*. A first socket 294*a* may be defined above second portion 122*b* and a second socket 294*b* may be defined below second portion 122*b*. Sockets 294*a*, 294*b* may be configured to receive tabs of front panel 118 (as shown in FIG. 30) when front panel 118 is closed onto rear panel 120 via latch 122.

Figure 30:
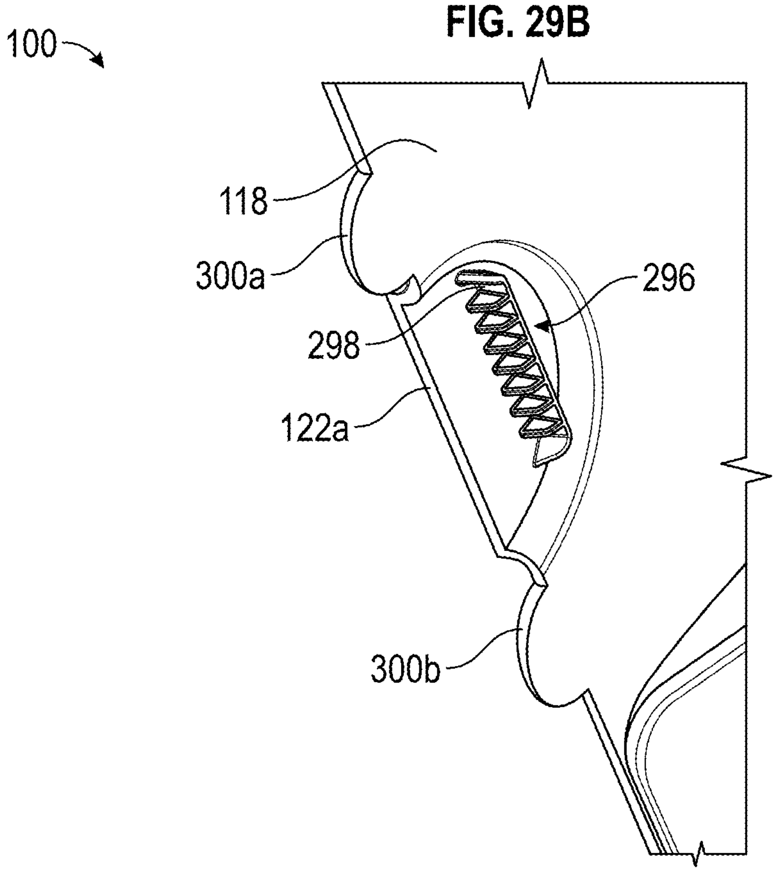
FIG. 30 illustrates a rear perspective close-up view of some embodiments of a first portion of the latch of the refuse container.

FIG. 30 illustrates a rear perspective close-up view of some embodiments of first portion 122*a* of latch 122 on front panel 118 of refuse container 100. First portion 122*a* may define a recess 296 configured to receive clasp 290 to engage latch 122 and thereby secure front panel 118 onto rear panel 120. First portion 122*a* may also comprise a ridge 298 positioned within recess 296. Ridge 298 may interact with clasp 290 to latch first portion 122*a* onto second portion 122*b*, such that latch 122 keeps housing 102 closed when engaged. Indent 292 may receive ridge 298 to keep latch 122 engaged and thereby maintain front panel 118 onto second side 120*b* of rear panel 120. Front panel 118 may define tabs 300*a*, 300*b*. A first tab 300*a* may be positioned above first portion 122*a* and a second tab 300*b* may be positioned below first portion 122*a*. Sockets 294*a*, 294*b* may receive tabs 300*a*, 300*b* when first portion 122*a* engages second portion 122*b* to latch housing 102 closed.

Figure 31:
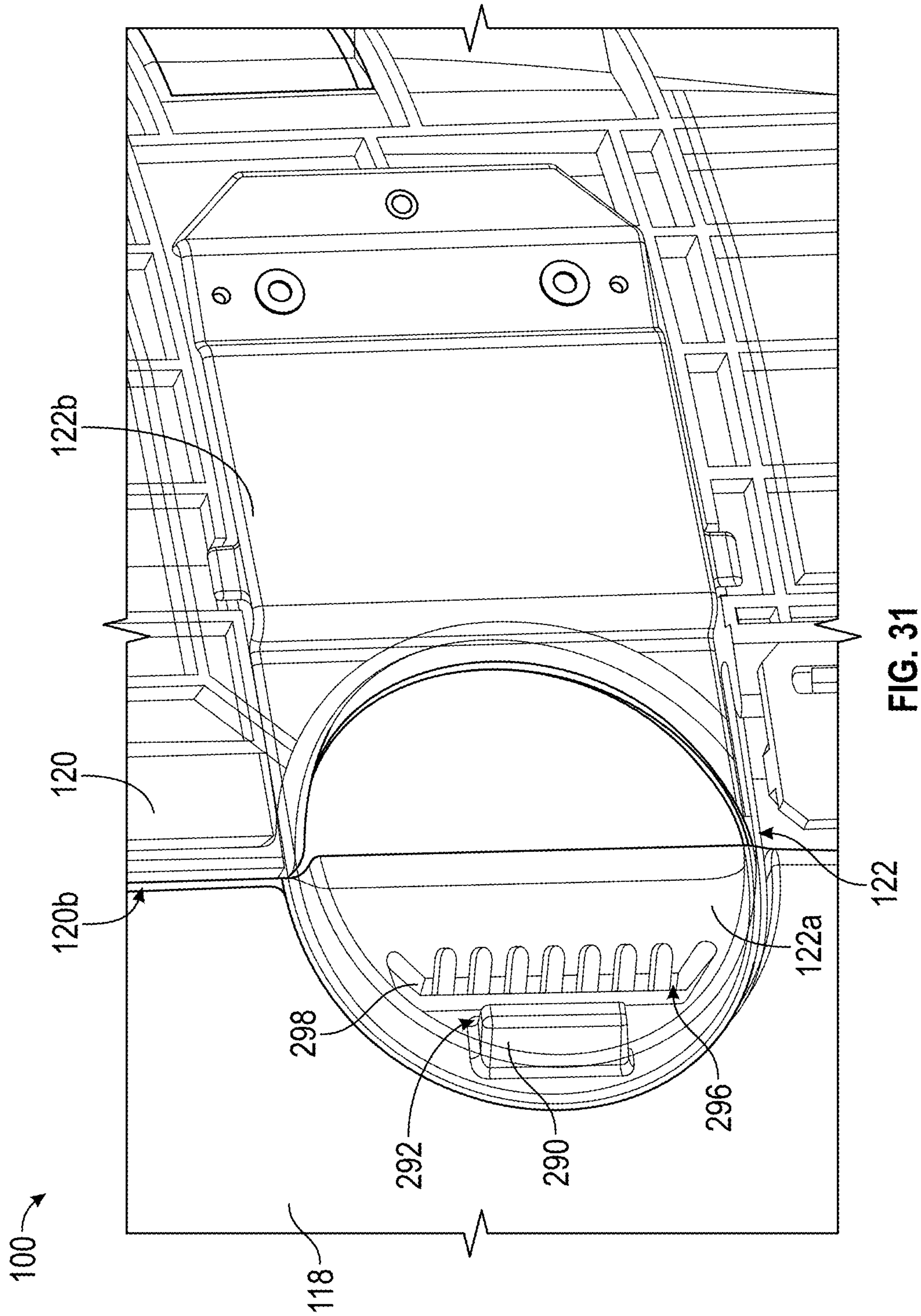
FIG. 31 illustrates a side perspective close-up view of the latch of the refuse container, with the rear panel made transparent.

FIG. 31 illustrates a side perspective close-up view of latch 122 of refuse container 100, with rear panel 120 transparent for clarity of certain internal components. Latch 122 is engaged in FIG. 31. When latch 122 is engaged, indent 292 of clasp 290 may receive ridge 298. When latch 122 is engaged, recess 296 of first portion 122*a* may receive clasp 290 of second portion 122*b*. In some embodiments, indent 292 receiving ridge 298 may provide the advantage of requiring a two action input to disengage latch 122, such that children cannot disengage latch 122 to open housing 102 of refuse container 100. For example, a user may press on the second portion 122*b* of latch 122 to release clasp 290 from recess 296 of first portion 122*a* and release ridge 298 from indent 292. A user may then pull front panel 118 away from second side 120*b* of rear panel 120 to unlatch latch 122 and thereby open housing 102. When indent 292 receives ridge 298, a user may have to apply a force to the second portion 122*b* to disengage clasp 290 from recess 296, thereby keeping children from disengaging latch 122 by pulling on front panel 118 to open housing 102.

Indicators

Figure 32:
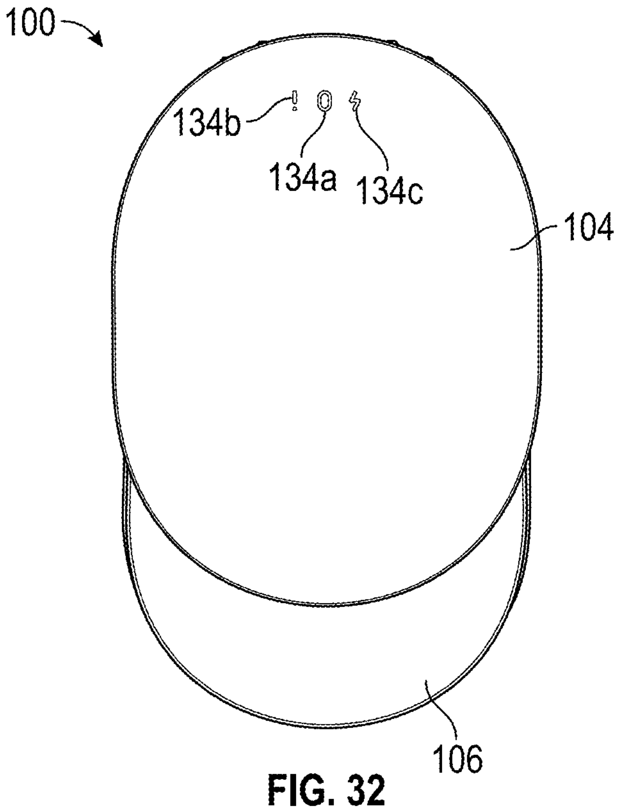
FIG. 32 illustrates a top view of the refuse container.

FIG. 32 illustrates a top view of refuse container 100. In some embodiments, refuse container 100 may comprise at least one indicator. In some embodiments, refuse container 100 may comprise a first indicator 134*a*, a second indicator 134*b*, and a third indicator 134*c*. Indicators 134*a*, 134*b*, 134*c* may be comprised in lid 104. Indicators 134*a*, 134*b*, 134*c* may be electrically connected to a power supply 136 via PCBA 222. In some embodiments, indicators 134*a*, 134*b*, 134*c* may be electrically connected to PCBA 222 and power supply 136 may be electrically connected to PCBA 222. Indicators 134*a*, 134*b*, 134*c* may be visual, auditory, or some other form of indicating to users the state of the refuse container 100. PCBA 222 may activate indicators 134*a*, 134*b*, 134*c* to cause indicators 134*a*, 134*b*, 134*c* to indicate to users the state of the refuse container 100. In some embodiments, a first indicator 134*a* may indicate that disposed material successfully dropped through odor-blocking doors 110*a*, 110*b* and the odor-blocking doors 110*a*, 110*b* fully closed thereafter to the closed configuration. A second indicator 134*b* may provide an indication of a malfunction or error, such as when the odor-blocking doors 110*a*, 110*b* do not bias back to the closed configuration due to an obstruction caused by trash or disposed material. In some embodiments, a second indicator 134*b* may indicate a malfunction or error, such as when refuse does not successfully drop through the opened odor-blocking doors 110*a*, 110*b* into the second receiving chamber 154 from the first receiving chamber 114. A third indicator 134*c* may indicate a low power state such that the user becomes aware of when power supply 136 may need replacement.

In some embodiments, indicators 134*a*, 134*b*, 134*c* may be LEDs. For example, an LED assembly 220 may electrically connect to PCBA 222 and light up indicators 134*a*, 134*b*, 134*c* to indicate a state of the refuse container 100 to the user. Indicators 134*a*, 134*b*, 134*c* may be icons on lid 104 that LED light shines through via LED assembly 220. PCBA 222 may electrically connect to indicator sensor 196 proximate odor-blocking doors 110*a*, 110*b*. Depending on signals received by PCBA 222, PCBA 222 may cause certain indicators 134*a*, 134*b*, 134*c* to light up via the LED assembly 220 to indicate various states of the refuse container 100.

In some embodiments, the first indicator 134*a* may light up via LED assembly 220 when refuse successfully drops through odor-blocking doors 110*a*, 110*b* in the open configuration and doors 110*a*, 110*b* successfully bias back to the closed configuration. In some embodiments, one of the odor-blocking doors 110*a*, 110*b* may contact indicator sensor 196 when the odor-blocking doors 110*a*, 110*b* rotate from the open configuration to the closed configuration. Upon contact with the odor-blocking doors 110*a*, 110*b*, indicator sensor 196 may send a signal to PCBA 222 indicating doors 110*a*, 110*b* closed successfully. PCBA 222 may then instruct the first indicator 134*a* to indicate the disposed refuse successfully dropped between doors 110*a*, 110*b* and doors 110*a*, 110*b* closed. In some embodiments, PCBA 222 may send a signal to LED assembly 220 to light up the first indicator 134*a* to indicate the disposed refuse successfully dropped between doors 110*a*, 110*b* and doors 110*a*, 110*b* closed. The first indicator 134*a* may indicate when refuse within the first receiving chamber 114 successfully falls into the second receiving chamber 154, providing a visual confirmation that the refuse drops through the odor-blocking doors 110*a*, 110*b* such that odor-blocking doors 110*a*, 110*b* may successfully close.

In some embodiments, the second indicator 134*b* may light up via LED assembly 220 when refuse gets caught between odor-blocking doors 110*a*, 110*b* when the doors 110*a*, 110*b* are in the open configuration. In some embodiments, when indicator sensor 196 is not contacted by odor-blocking doors 110*a*, 110*b* for a certain period of time, indicator sensor 196 may send a signal to PCBA 222 indicating the doors 110*a*, 110*b* did not successfully transition from the open configuration to the closed configuration, and thus are still opened. PCBA 222 may then instruct the second indicator 134*b* to indicate the refuse container 100 is in an error state. In some embodiments, the PCBA 222 may then send a signal to LED assembly 220 to light up the second indicator 134*b* to indicate the refuse container 100 is in an error state. The PCBA 222 may be programmed to send a signal to LED assembly 220 to shine light on the second indicator 134*b* at a certain cadence or pattern such that the second indicator 134*b* may remind a user of a potential error state. PCBA 222 may be programmed to send signals to LED assembly 220 to shine light on the second indicator 134*b* at certain time periods, thereby generating a blinking pattern to continually indicate to a user there is an error with the refuse container 100. The PCBA 222 may be programmed to vary the cadence of the LED light shining on second indicator 134*b* after a certain time interval to conserve power supply 136 in the situation where a user may have left the room and chosen to ignore the second indicator 134*b*.

In some embodiments, the third indicator 134*c* may light up via LED assembly 220 when power supply 136 of refuse container 100 is low and needs replacement. PCBA 222 may be programmed to monitor the power output of power supply 136 and may send a signal to LED assembly 220 to light up third indicator 134*c* when power supply 136 is at low power. The third indicator 134*c* may indicate when refuse container 100 is at a state of low power. The PCBA 222 may be programmed to send a signal to LED assembly 220 to shine light on the third indicator 134*c* at a certain cadence or pattern such that the third indicator 134*c* may remind a user of a potential low power state. The PCBA 222 may be programmed to vary the cadence of the LED light shining on third indicator 134*c* after a certain time interval to conserve power supply 136.

In some embodiments, indicators 134*a*, 134*b*, 134*c*, may be positioned over beam 172 of automatic door subassembly 112. In some embodiments, indicators 134*a*, 134*b*, 134*c* may be microperforated to decrease the glow of LED light when LED assembly 220 shines light through indicators 134*a*, 134*b*, 134*c*. The microperforation may provide the advantage of decreasing the intensity of LED light shining through indicators 134*a*, 134*b*, 134*c* to prevent users sleeping in dark rooms containing refuse container 100 from waking up due to the LED light. In some embodiments, indicators 134*a*, 134*b*, 134*c* may be lenses.

PCBA 222 may be programmed to keep the LED assembly 220 from continuously shining light through indicators 134*a*, 134*b*, 134*c*, thereby preventing users from being wrongly alerted of the state of the refuse container 100. In some embodiments, first indicator 134*a* may be defined by an "O" icon on the top 104*a* of lid 104. Second indicator 134*b* may be defined by a "!" icon on the top 104*a* of lid 104. Third indicator 134*c* may be defined by a "⚡" icon on the top 104*a* of lid 104.

In some embodiments, LED assembly 220 may include a single LED that lights up the indicators 134*a*, 134*b*, 134*c*. PCBA 222 may be programmed to signal LED assembly 220 to generate a first blinking pattern for first indicator 134*a*, a second blinking pattern for second indicator 134*b*, and a third blinking pattern for third indicator 134*c*. The first blinking pattern, second blinking pattern, and third blinking pattern may all vary from one another, such that a user may recognize each indicator 134*a*, 134*b*, 134*c* based on the blinking pattern.

In some embodiments, indicators 134*a*, 134*b*, 134*c* may each light up different colors, such that a user may differentiate between the first indicator 134*a*, second indicator 134*b*, and third indicator 134*c*. The first indicator 134*a* may light up white, the second indicator 134*b* may light up orange, and the third indicator 134*c* may light up orange to provide a user with a visual indication of a certain state of refuse container 100.

In some embodiments, indicator sensor 196 may be a motion sensor. When trash or disposed material falls through the odor-blocking doors 110*a*, 110*b* into the second receiving chamber 154, the motion sensor may send a signal to PCBA 222. Upon receiving the signal, PCBA 222 may signal LED assembly 220 to shine light through first indicator 134*a* to indicate an "OK" state. When trash or disposed material remains in the first receiving chamber 114 for a certain amount of time and does not fall through opened odor-blocking doors 110*a*, 110*b*, the motion sensor may send a signal to PCBA 222 and PCBA 222 may send a signal to second indicator 134*b* to provide an orange light indicating an "error" state. The third indicator 134*c* may electrically connect to the PCBA and may indicate when power supply 136 is in a low battery state.

In some embodiments, indicators 134*a*, 134*b*, 134*c* may indicate when the disposal bag 248 is full and needs replacement, as further discussed herein. In some embodiments, indicators 134*a*, 134*b*, 134*c* may indicate when sealing of the disposal bag 248 is complete and when sealing of the disposal bag does not complete, as further discussed herein.

Odor-Eliminating Cartridge

FIG. 33A illustrates a front view of some embodiments of an odor-eliminating cartridge 302 for use with refuse container 100. FIG. 33B illustrates a rear view of some embodiments of the odor-eliminating cartridge 302 for use with refuse container 100. FIGS. 33A-33B are meant to be viewed together. In some embodiments, an odor-eliminating cartridge 302 may be attached to the refuse container 100 to absorb malodors from disposed material while the refuse container 100 is closed. The odor-eliminating cartridge 302 may be configured to absorb malodors in the first receiving chamber 114 when the lid 104 is closed, prior to the odor-blocking doors 110*a*, 110*b* moving from the closed configuration to the open configuration via the automatic door subassembly 112. In some embodiments, the odor-eliminating cartridge 302 may absorb malodors from refuse placed in the first receiving chamber 114 prior to the refuse falling into the second receiving chamber 154 when the odor-blocking doors 110*a*, 110*b* are in the open configuration. The odor-eliminating cartridge 302 may provide the advantage of absorbing any remaining odors within the first receiving chamber 114 after the disposed material falls through the odor-blocking doors 110*a*, 110*b* into the second receiving chamber 154. The odor-eliminating cartridge 302 may be configured to eliminate odors that permeate into the first receiving chamber 114 from the second receiving chamber 154 when the odor-blocking doors 110*a*, 110*b* are in the open configuration.

The front side 302*a* of odor-eliminating cartridge 302 may be made at least partially from a pulp material. In some embodiments, front side 302*a* of odor-eliminating cartridge 302 may be made from any biodegradable, renewable raw material. The rear side 302*b* of odor-eliminating cartridge 302 may be made of a synthetic non-woven fibrous material. The synthetic non-woven fibrous material may provide airflow through the odor-eliminating cartridge 302 when cartridge 302 is placed in the cartridge housing 130. In some embodiments, the synthetic non-woven fibrous material may be polyethylene-based. In some embodiments, rear side 302*b* of odor-eliminating cartridge 302 may be made of plastic, pulp material, or paper.

Odor-eliminating cartridge 302 may comprise a handle 304. A user may grasp the handle to easily remove the odor-eliminating cartridge 302 when the cartridge 302 needs replacing. Handle 304 may extend from odor-eliminating cartridge 302, making handle 304 easily reachable by a user. In some embodiments, handle 304 may be a tab extending from odor-eliminating cartridge 302.

Odor-eliminating cartridge 302 may house activated carbon. The activated carbon may be pelletized or granular. The activated carbon may absorb malodorous chemicals from refuse in the refuse container 100. In some embodiments, the activated carbon may be chemically treated to further enhance the adsorption efficiency of various chemicals creating the malodorous smell of refuse in the refuse container 100.

FIG. 34 illustrates a front perspective close-up view of some embodiments of refuse container 100 with lid 104 opened in the upward position, with odor-eliminating cartridge 302 in the cartridge housing 130 and the bag support 138 removed. Refuse container 100 may comprise a cartridge housing 130, which is configured to receive the odor-eliminating cartridge 302. Odor-eliminating cartridge 302 may be placed in the cartridge housing 130 such that the front side 302*a* or back side 302*b* faces outward toward the first receiving chamber 114. The handle 304 may extend outward from the cartridge housing 130 to allow a user to easily remove and replace the odor-eliminating cartridge 302. Cartridge housing 130 may be defined by bottom 104*b* of lid 104.

In some embodiments, cartridge housing 130 may be comprised on inner wall 150 or door support 140. In some embodiments, cartridge housing 130 may be comprised on an interior of housing 102 such that odor-eliminating cartridge 302 is housed inside the refuse container 100 when the housing 102 and lid 104 are closed.

In some embodiments, cartridge housing 130 may define holes 306. Holes 306 may provide passages for malodors to permeate into to reach the odor-eliminating cartridge 302 to thereby be absorbed by the odor-eliminating cartridge 302.

Refuse Container System

FIG. 35 illustrates some embodiments of components of a refuse container system. The system may comprise the refuse container 100, odor-eliminating cartridge 302, disposal bag 248, and a disposal bag package 308. The odor-eliminating cartridge 302 may be received within lid 104. For example, in some embodiments, odor-eliminating cartridge 302 may be received in cartridge housing 130 defined by lid 104. The disposal bag 248 may be received within housing 102. When disposal bag 248 is placed within refuse container 100, the opening 258 of disposal bag 248 may extend over top edge 138*a* of bag support 138 and rest under trim cover 124. The body 252 of disposal bag 248 may extend through the first receiving chamber 114 into the second receiving chamber 154, such that refuse placed in the first receiving chamber 114 is placed into disposal bag 248 during use of refuse container 100.

Storage compartment 156 may fixedly attach to interior 118*a* of front panel 118. The storage compartment 156 may be hollow and comprise a first compartment aperture 158*a* and a second compartment aperture 158*b*. The storage compartment 156 may be configured to store disposal bags 248 to provide the advantage of making new disposal bags 248 easily accessible during bag replacement, as further discussed herein. The first compartment aperture 158*a* may receive disposal bag package 308. For example, a user may place disposal bag package 308 into storage compartment 156 through first compartment aperture 158*a*. The second compartment aperture 158*b* may be configured to receive a replacement disposal bag 248 within disposal bag package 308 such that a user may reach through second compartment aperture 158*b* to grab a disposal bag 248 for bag replacement and/or bag insertion within refuse container 100, as discussed further herein. Disposal bags 248 may be fed through the second compartment aperture 158*b* such that a user may grab a disposal bag 248 for insertion and/or replacement within refuse container, as further discussed herein.

In some embodiments, the storage compartment 156 may extend outward from the interior 118*a* of the front panel 118 toward the first receiving chamber 114 when the front panel 118 is closed onto the rear panel 120 to shut the housing 102 to maintain a disposal bag 248 between the odor-blocking doors 110*a*, 110*b*. For example, A portion of storage compartment 156 may stick out toward the first receiving chamber 114 to push the disposal bag 248 inward when placed on the bag support 138 to thereby assist in maintaining the disposal bag 248 between the odor-blocking doors 110*a*, 110*b*. The portion of storage compartment 156 sticking out toward the first receiving chamber 114 may push the disposal bag 248 toward odor-blocking doors 110*a*, 110*b* such that the width $W_1$ of disposal bag 248 is fully positioned between odor-blocking doors 110*a*, 110*b*. This provides the advantage of allowing the disposal bag 248 to be entirely closed when the odor-blocking doors 110*a*, 110*b* are in the closed configuration to keep odors from seeping out of the second receiving chamber 154 into the first receiving chamber 114 and reaching the user during refuse disposal.

The storage compartment 156 may be arcuately shaped to match the curvature of the front panel 118, thereby providing a generally cylindrical second receiving chamber 154 when the front panel 118 is closed onto the rear panel 120. The storage compartment 156 may comprise protrusions defined inside the storage compartment 156. The protrusions may align the disposal bag package 308 with the second compartment aperture 158*b* such that a user may easily reach in and remove a new disposal bag 248 during bag insertion and/or bag replacement, as further discussed below.

In some embodiments, the disposal bag package 308 may define an opening for feeding a disposal bag 248 therethrough. In some embodiments, an opening of disposal bag package 308 may be defined such that the opening aligns with the second compartment aperture 158*b* to allow a user to easily reach into the disposal bag package 308 to remove a disposal bag 248 therefrom.

Methods Overview

There are several methods associated with operating the refuse container 100. A user may perform a method of bag insertion/bag replacement in operating refuse container 100, as discussed further herein. A user may perform bag insertion/replacement when a new disposal bag 248 needs to be placed in refuse container 100. A user may perform a method of refuse disposal in operating refuse container 100, as discussed further herein. A user may perform refuse disposal when the user has refuse material that needs to be disposed of within refuse container 100. A user may perform a method of bag removal from the refuse container 100, as discussed further herein. A user may perform bag removal when the user needs to remove a disposal bag 248 full of previously disposed of material from refuse container 100.

Bag Insertion/Replacement Method

Figure 36:
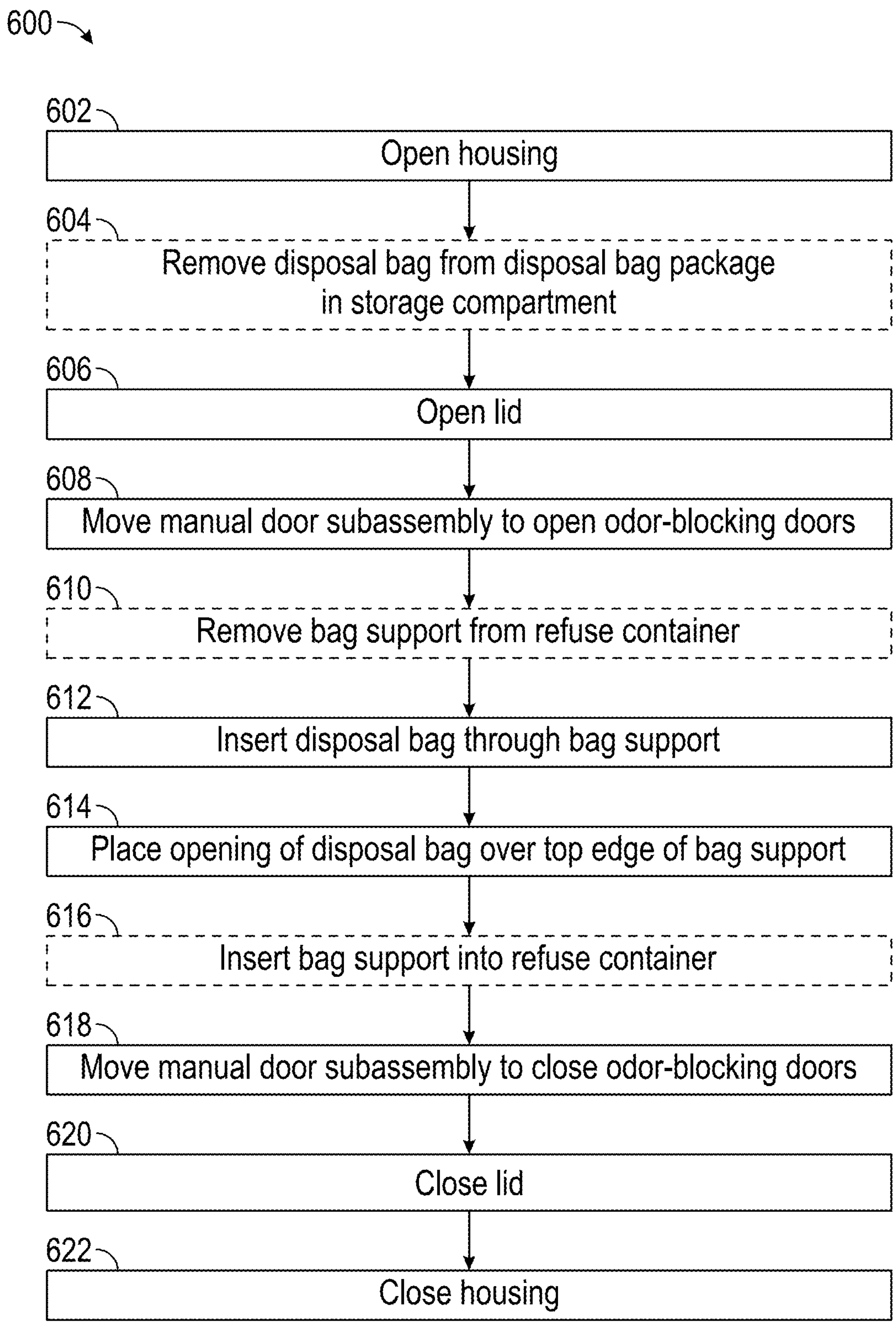
FIG. 36 illustrates a method for inserting a disposal bag within the refuse container in accordance with embodiments of the present disclosure.

FIG. 36 illustrates a method 600 for inserting a disposal bag 248 within refuse container 100 in accordance with embodiments of the present disclosure. The method 600 may also be applied for replacing a disposal bag 248 within refuse container 100 once a full disposal bag 248 is removed. Method 600 may be embodied as instructions provided with the refuse container system.

Method 600 may begin at a step 602 wherein the housing 102 of refuse container 100 may be opened. In some embodiments, the housing 102 may be opened by unlatching (also referred to herein as disengaging) the latch 122 to thereby open the front panel 118 away from the rear panel 120. In some embodiments, the latch 122 may be unlatched by pressing on second portion 122*b* of latch 122 and pulling front panel 118 away from rear panel 120. In some embodiments, pressing on the second portion 122*b* may release clasp 290 from recess 296 of first portion 122*a* and release ridge 298 from indent 292 to allow a user to pull front panel 118 away from second side 120*b* of rear panel 120.

At an optional step 604, a disposal bag 248 may be removed from disposal bag package 308 positioned in storage compartment 156. In some embodiments, a disposal bag 248 may be removed from disposal bag package 308 by reaching through second compartment aperture 158*b* and removing disposal bag 248 through second compartment aperture 158*b* of storage compartment 156.

Next, at step 606, lid 104 of refuse container 100 may be opened. In some embodiments, lid 104 may be opened by rotating lid 104 upward away from front panel 118 to an upward position. In some embodiments, step 606 may also include opening trim cover 124, 124' of refuse container 100. Trim cover 124, 124' may be opened by rotating trim cover 124, 124' upward away from front panel 118 to an upward position. In some embodiments, opening trim cover 124, 124' may simultaneously open lid 104 when trim cover 124, 124' is positioned underneath lid 104 on refuse container 100.

Next, at step 608, manual door subassembly 148 may be moved to open odor-blocking doors 110*a*, 110*b*. For example, manual door subassembly 148 may be moved from a first position to a second position to transition the odor-blocking doors 110*a*, 110*b* from the closed configuration to the open configuration. In some embodiments, switch 144 of manual door subassembly 148 may be moved to transition the odor-blocking doors 110*a*, 110*b* from the closed configuration to the open configuration. In some embodiments, switch 144 may be moved from a first end 146*a* of slot 146 defined by support mount 142 to a second end 146*b* of slot 146 to transition the odor-blocking doors 110*a*, 110*b* from the closed configuration to the open configuration. In some embodiments, moving switch 144 from a first end 146*a* to a second end 146*b* may move extensions 188*a*, 188*b* of odor-blocking doors 110*a*, 110*b* along surfaces 282*a*, 282*b* of cavities 280*a*, 280*b* defined by slider 184 of switch 144. Movement of extensions 188*a*, 188*b* of odor-blocking doors 110*a*, 110*b* may cause odor-blocking doors 110*a*, 110*b* to transition from the closed configuration to the open configuration.

In some embodiments, moving trim cover 124, 124' to the upward position may move manual door subassembly 148' to open odor-blocking doors 110*a*, 110*b*. For example, moving trim cover 124, 124' to the upward position may simultaneously move manual door subassembly 148' to transition the odor-blocking doors 110*a*, 110*b* from the closed configuration to the open configuration. For example, in some embodiments, moving trim cover 124, 124' may cause fastener 160 received in linkage slot 286 of trim cover linkage 284 to move within linkage slot 286. Fastener 160 may couple odor-blocking doors 110*a*, 110*b* to door support 140, such that fastener 160 moving within linkage slot 286 causes odor-blocking doors 110*a*, 110*b* to transition from the closed configuration to the open configuration. In some embodiments, fastener 160 coupling odor-blocking doors 110*a*, 110*b* to door support 140 may move from a first end 286*a* of linkage slot 286 to a second end 286*b* of linkage slot 286 to thereby transition the odor-blocking doors 110*a*, 110*b* from the closed configuration to the open configuration.

In some embodiments, at an optional step 610, bag support 138 may be removed from refuse container 100.

Next, at step 612, a disposal bag 248 may be inserted through bag support 138, 138'. In some embodiments, inserting disposal bag 248 through bag support 138, 138' places body 252 of disposal bag 248 inside the second receiving chamber 154 and first receiving chamber 114 of refuse container 100. Next, at step 614, an opening 258 of disposal bag 248 may be placed over top edge 138*a*, 138*a'* of bag support 138, 138'. In some embodiments, opening 258 of disposal bag 248 may be placed over top edge 138*a*, 138*a'* such that bag fastener 250 extends over top edge 138*a*, 138*a'* onto an exterior side 138*d*, 138*d'* of bag support 138, 138'. In some embodiments, when placing opening 258 over top edge 138*a*, 138*a'*, a portion of bag fastener 250 may be pulled through one of cutouts 256*a*, 256*b* defined by fastener passage 254 and fed through a sealing applicator 204, 204' of support mount 142', 142", such that a user may easily locate the fastener 250 for bag removal, as discussed further herein. In some embodiments, when pulling a portion of bag fastener 250 through one of cutouts 256*a*, 256*b* and feeding the portion of bag fastener through sealing applicator 204', the portion of bag fastener 250 may be looped around hooks 212 of sealing applicator 204'.

In some embodiments, opening 258 of disposal bag 248 may be placed over top edge 138*a* to cover the entire length $L_1$ of bag support 138, to provide bag slack that may feed over top edge 138*a* as refuse drops into the bottom of disposal bag 248.

In some embodiments, at an optional step 616, bag support 138 may be inserted back into refuse container 100. In some embodiments, inserting bag support 138 back into refuse container 100 may comprise placing bottom edge 138*b* of bag support 138 onto rim 168 of door support 140 to thereby maintain bag support 138 at top 102*a* of housing 102. Inserting bag support 138 back into refuse container 100 may comprise feeding body 252 of disposal bag 248 into the second receiving chamber 154 and first receiving chamber 114 of refuse container 100.

Next, at step 618, manual door subassembly 148 may be moved to close odor-blocking doors 110*a*, 110*b*. For example, manual door subassembly 148 may be moved from a second position to a first position to transition the odor-blocking doors 110*a*, 110*b* from the open configuration to the closed configuration. In some embodiments, switch 144 of manual door subassembly 148 may be moved to transition the odor-blocking doors 110*a*, 110*b* from the open configuration to the closed configuration. In some embodiments, switch 144 may be moved from a second end 146*b* of slot 146 defined by support mount 142 to a first end 146*a* of slot 146 to transition the odor-blocking doors 110*a*, 110*b* from the open configuration to the closed configuration. In some embodiments, moving switch 144 from second end 146*b* to first end 146*a* may move extensions 188*a*, 188*b* of odor-blocking doors 110*a*, 110*b* into cavities 280*a*, 280*b* and back along surfaces 282*a*, 282*b* of cavities 280*a*, 280*b* defined by slider 184 of switch 144. Movement of extensions 188*a*, 188*b* of odor-blocking doors 110*a*, 110*b* into cavities 280*a*, 280*b* and back along surfaces 282*a*, 282*b* may cause odor-blocking doors 110*a*, 110*b* to transition from the open configuration to the closed configuration.

In some embodiments, moving trim cover 124, 124' to the down position may move manual door subassembly 148' to close the odor-blocking doors 110*a*, 110*b*. For example, moving trim cover 124, 124' to the down position may simultaneously move manual door subassembly 148' to transition the odor-blocking doors 110*a*, 110*b* from the open configuration to the closed configuration. For example, in some embodiments, moving trim cover 124, 124' may cause fastener 160 received in linkage slot 286 of trim cover linkage 284 to move within linkage slot 286. Fastener 160 may rotatably couple odor-blocking doors 110*a*, 110*b* to door support 140, such that fastener 160 moving within linkage slot 286 causes odor-blocking doors 110*a*, 110*b* to transition from the open configuration to the closed configuration. In some embodiments, fastener 160 coupling odor-blocking doors 110*a*, 110*b* to door support 140 may move from a second end 286*b* of linkage slot 286 to a first end 286*a* of linkage slot 286 to thereby transition the odor-blocking doors 110*a*, 110*b* from the open configuration to the closed configuration.

Next, at a step 620, lid 104 of refuse container 100 may be closed. In some embodiments, lid 104 may be closed by rotating lid 104 downward toward front panel 118 to a down position. In some embodiments, step 620 may also include closing trim cover 124, 124' of refuse container 100. Trim cover 124, 124' may be closed by rotating trim cover 124, 124' downward toward front panel 118 to a down position. In some embodiments, closing lid 104 may simultaneously close trim cover 124, 124' when trim cover 124, 124' is positioned underneath lid 104 on refuse container 100.

Next, at a step 622, the housing 102 of refuse container 100 may be closed. In some embodiments, the housing 102 may be closed by latching (also referred to herein as engaging) the latch 122 to thereby close the front panel 118 onto the rear panel 120. In some embodiments, the latch 122 may latch by engaging first portion 122*a* with second portion 122*b*. In some embodiments, engaging first portion 122*a* with second portion 122*b* may comprise clasping ridge

298 of first portion 122*a* into indent 292 of second portion 122*b* and placing clasp 290 of second portion 122*b* into recess 296 of first portion 122*a* to thereby latch the latch 122 to close housing 102. In some embodiments, latching latch 122 may include placing tabs 300*a*, 300*b* of front panel 118 within sockets 294*a*, 294*b* of inner wall 150.

Refuse Disposal Method

Figure 37:
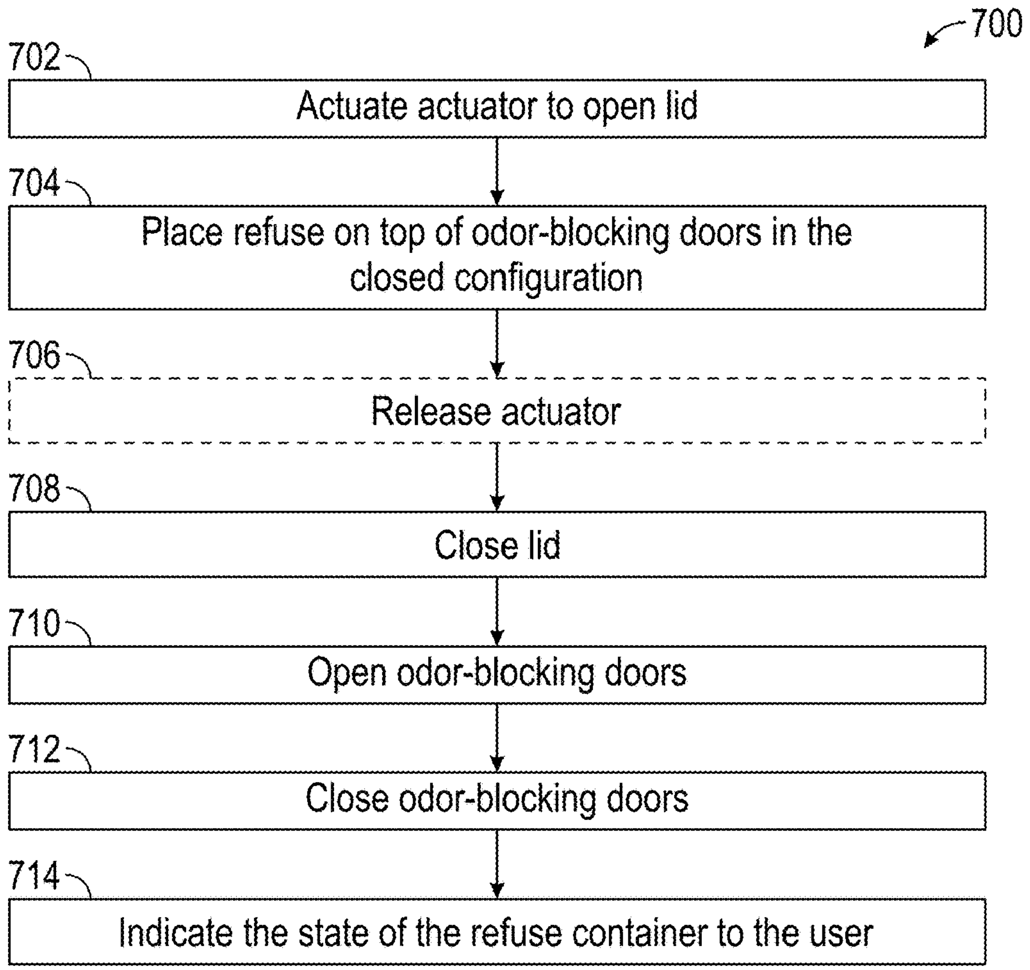
FIG. 37 illustrates a method for disposing of refuse into the refuse container in accordance with embodiments of the present disclosure.

FIG. 37 illustrates a method 700 for disposing of refuse into refuse container 100 in accordance with embodiments of the present disclosure. Method 700 may begin at a step 702 wherein an actuator 106 may be actuated to open lid 104. In some embodiments, actuator 106 may be actuated by pressing the actuator 106. In some embodiments, actuator 106 may be a pedal and a user may step on the pedal to actuate the actuator 106 to open lid 104. In some embodiments, actuator 106 may be a button and a user may press the button to actuate the actuator 106 to open lid 104. In some embodiments, actuator 106 may be a motion sensor and user may actuate the motion sensor by moving in front of the motion sensor to open lid 104.

In some embodiments, when actuator 106 is actuated, the automatic door subassembly 112 may transition from the first position to the second position to open lid 104. In some embodiments, automatic door subassembly 112 may move toward lid 104 to open lid 104. For example, actuating the actuator 106 may cause automatic door subassembly 112 to translate upward toward lid 104 and push lid 104 open to the upward position. In some embodiments, a beam 172 of automatic door subassembly 112 may translate upward such that beam cap 182 contacts protrusion 128 on lid 104 to thereby open lid 104 to the upward position. In some embodiments, beam cap 182 may push protrusion 128 on lid 104 to thereby open lid 104 to the upward position. Actuating the actuator 106 may pivot actuator 106 in a first direction about rod 178 to translate rod 178 upward. Translating rod 178 upward may translate beam 172 upward toward lid 104 to contact lid 104 to open lid 104 to the upward position. Automatic door subassembly 112 translating upward may transition automatic door subassembly 112 from a first position to a second position. Automatic door subassembly 112 transitioning from the first position to the second position may bias spring 176*b*.

In some embodiments, when the actuator 106 is actuated, PCBA 222 electrically connected to actuator 106 may send a signal to a motor forming part of the automatic door subassembly 112. When motor receives the signal, the motor may cause the lid 104 to open. In some embodiments, when the actuator 106 is actuated, actuator 106 may send a signal to PCBA 222. A processor electrically connected to PCBA 222 may be programmed to then instruct a timer to start a first time period and instruct the motor to open lid 104 by the end of the first time period when PCBA 222 receives a signal from actuator 106.

Next, at a step 704, refuse may be placed on top of odor-blocking doors 110*a*, 110*b* when odor-blocking doors 110*a*, 110*b* are in the closed configuration. In some embodiments, placing refuse on top of closed odor-blocking doors 110*a*, 110*b* places the refuse inside the first receiving chamber 114.

Next, at an optional step 706, actuator 106 may be released. In some embodiments, releasing the actuator 106 may comprise a user releasing a pedal. In some embodiments, releasing the actuator 106 may comprise releasing a button. In some embodiments, releasing the actuator 106 may comprise moving in a certain direction in front of a motion sensor.

Next, at a step 708, lid 104 may be closed. In some embodiments, actuating actuator 106 may open lid 104 and then close lid 104. In some embodiments, automatic door subassembly 112 may transition from the second position to the third position to close lid 104. In some embodiments, automatic door subassembly 112 may move away from lid 104 to close lid 104. In some embodiments, automatic door subassembly 112 may translate downward away from lid 104 to close lid 104 to the down position. In some embodiments, a beam 172 of automatic door subassembly 112 may translate downward such that beam cap 182 translates away from protrusion 128 on lid 104 to thereby close lid 104 to the down position. When automatic door subassembly transitions from the second position to the third position, spring 176*b* may bias beam 172 to travel downward away from lid 104 to close lid 104.

In some embodiments, releasing actuator 106 may cause automatic door subassembly 112 to close lid 104. In some embodiments, releasing actuator 106 may cause automatic door subassembly 112 to move away from lid 104 to close lid 104 to the down position. When releasing actuator 106, actuator 106 may pivot about rod 178 in a second direction to translate rod 178 downward. Translating rod 178 downward may cause beam 172 to translate downward to move away from lid 104 to close lid to the down position. In some embodiments, translating automatic door subassembly 112 downward away from lid 104 transitions automatic door subassembly from the second position to the third position.

In some embodiments, actuating actuator 106 may cause lid 104 to close after lid 104 is opened. For example, in some embodiments, once the actuator 106 is actuated, a timer may send a signal to the PCBA 222 when the timer reaches the end of the first time period, such that the lid 104 is open in the upward position. Once PCBA 222 receives a signal from the timer, processor may be programmed to instruct a motor to close the lid 104 within a second time period initiated by the timer. In some embodiments, a sensor may be positioned within first receiving chamber 114. When movement is sensed by a sensor in the first receiving chamber 114 (e.g., refuse is placed in first receiving chamber 114 on closed odor-blocking doors 110*a*, 110*b*), the sensor may signal the PCBA 222. Once PCBA 222 receives a signal from the sensor, the processor electrically connected to PCBA 222 may then instruct the motor to close lid 104 within a second time period initiated by the timer.

Next, at a step 710, odor-blocking doors 110*a*, 110*b* may be opened. In some embodiments, opening odor-blocking doors 110*a*, 110*b* may comprise automatic door subassembly 112 transitioning from a third position to a fourth position. In some embodiments, spring 176*b* may bias automatic door subassembly 112 to transition from the third position to the fourth position. Spring 176*b* may still be biased when automatic door subassembly 112 is in the third position, such that spring 176*b* forces beam 172 to continue traveling downward away from lid 104. When beam 172 continues to travel downward, lever 276 may contact door lever 192 to cause odor-blocking doors 110*a*, 110*b* to rotate from the closed configuration to the open configuration. In some embodiments, spring 176*b* biasing beam 172 downward may cause lever 276 to push door lever 192 to thereby rotate odor-blocking doors 110*a*, 110*b* from the closed configuration to the open configuration.

In some embodiments, actuating actuator 106 may cause odor-blocking doors 110*a*, 110*b* to transition from the closed configuration to the open configuration after lid 104 is opened and closed. For example, in some embodiments, once the actuator 106 is actuated, a sensor positioned proximate top 102*a* of housing 102 may sense when the lid 104 closes from the upward position. The sensor may signal the PCBA 222 that lid 104 has closed. Once PCBA 222 receives a signal from the sensor indicating the lid 104 has closed, processor may be programmed to instruct the timer to start a third time period and instruct motor to open odor-blocking doors 110*a*, 110*b* to the open configuration within the third time period.

In some embodiments, releasing actuator 106 may cause odor-blocking doors 110*a*, 110*b* to open after automatic door subassembly 112 moves away from lid 104 to close lid 104. When actuator 106 is released, automatic door subassembly 112 may transition from the third position to the fourth position. Actuator 106 may continue pivoting about rod 178 in a second direction to continue translating rod 178 downward. Translating rod 178 downward may cause beam 172 to continue translating downward to push lever 276 onto door lever 192 to thereby transition odor-blocking doors 110*a*, 110*b* from the closed configuration to the open configuration.

During step 710, refuse placed in the first receiving chamber 114 by a user may drop through the odor-blocking doors 110*a*, 110*b* when the doors 110*a*, 110*b* transition to the open configuration. Because lid 104 closes prior to odor-blocking doors 110*a*, 110*b* being opened, the refuse disposal method 700 may keep malodors from previously disposed of material in the second receiving chamber 154 from reaching the user during refuse disposal.

Next, at a step 712, odor-blocking doors 110*a*, 110*b* may be closed. In some embodiments, closing odor-blocking doors 110*a*, 110*b* may comprise automatic door subassembly 112 transitioning from the fourth position back to the first position. In some embodiments, spring 176*b* may bias automatic door subassembly 112 to transition from the fourth position back to the first position. Spring 176*b* may still be biased when automatic door subassembly 112 is in the fourth position, such that spring 176*b* forces beam 172 to continue traveling downward away from lid 104. When beam 172 continues to travel downward, lever 276 may move away from door lever 192 to cause odor-blocking doors 110*a*, 110*b* to rotate back to the closed configuration from the open configuration. In some embodiments, spring 176*b* biasing beam 172 downward may cause lever 276 to release from door lever 192 to thereby rotate odor-blocking doors 110*a*, 110*b* from the open configuration to the closed configuration. In some embodiments, when lever 276 passes door lever 192, odor-blocking doors 110*a*, 110*b* may bias back to the closed configuration.

In some embodiments, actuating actuator 106 may cause odor-blocking doors 110*a*, 110*b* to transition back to the closed configuration from the open configuration after lid 104 is opened and closed. For example, in some embodiments, once the actuator 106 is actuated, a sensor positioned proximate odor-blocking doors 110*a*, 110*b* may sense when disposed of refuse falls between the odor-blocking doors 110*a*, 110*b* from the first receiving chamber 114 into the second receiving chamber 154. The sensor may signal PCBA 222 when the refuse falls between the opened odor-blocking doors 110*a*, 110*b*. Once PCBA 222 receives a signal from the sensor indicating the refuse has fallen between doors 110*a*, 110*b*, the processor may be programmed to instruct the motor to close the odor-blocking doors 110*a*, 110*b* from the open configuration to the closed configuration.

In some embodiments, releasing actuator 106 may cause odor-blocking doors 110*a*, 110*b* to close after automatic door subassembly 112 opens odor-blocking doors 110*a*, 110*b* and continues moving away from lid 104. When actuator 106 is released, actuator 106 may continue pivoting about rod 178 in a second direction to continue translating rod 178 downward. Translating rod 178 downward may cause beam 172 to continue translating downward to move lever 276 past door lever 192 to thereby transition odor-blocking doors 110*a*, 110*b* from the open configuration back to the closed configuration.

Next, at a step 714, refuse container 100 may indicate the state of the refuse container 100 to the user. In some embodiments, refuse container 100 may indicate the state by activating certain indicators 134*a*, 134*b*, 134*c*. Indicators 134*a*, 134*b*, 134*c* may be electrically coupled to PCBA 222 and PCBA 222 may activate certain indicators 134*a*, 134*b*, 134*c* to indicate the state of the refuse container 100 to the user. In some embodiments, PCBA 222 may activate a first indicator 134*a* to indicate to a user that the refuse successfully dropped through the odor-blocking doors 110*a*, 110*b* and the odor-blocking doors 110*a*, 110*b* transitioned back to the closed configuration successfully. PCBA 222 may activate a second indicator 134*b* to indicate to a user that a malfunction or error has occurred, such as when the odor-blocking doors 110*a*, 110*b* do not bias back to the closed configuration due to an obstruction caused by trash or disposed material. In some embodiments, a second indicator 134*b* may indicate a malfunction or error, such as when refuse does not successfully drop through the opened odor-blocking doors 110*a*, 110*b* into the second receiving chamber 154 from the first receiving chamber 114.

In some embodiments, PCBA 222 may receive a signal from an indicator sensor 196 when one of the odor-blocking doors 110*a*, 110*b* contacts the indicator sensor 196 after transitioning back to the closed configuration from the open configuration. PCBA 222 may then instruct first indicator 134*a* to indicate the disposed refuse successfully dropped between doors 110*a*, 110*b* and doors 110*a*, 110*b* closed. In some embodiments, PCBA 222 may send a signal to LED assembly 220 to light up the first indicator 134*a* to indicate the disposed refuse successfully dropped between doors 110*a*, 110*b* and doors 110*a*, 110*b* closed.

In some embodiments, PCBA 222 may receive a signal from indicator sensor 196 when indicator sensor 196 is not contacted by odor-blocking doors 110*a*, 110*b* within a certain period of time. The signal may indicate the doors 110*a*, 110*b* did not successfully transition from the open configuration to the closed configuration, and thus are still opened. PCBA 222 may then instruct second indicator 134*b* to indicate the refuse container 100 is in an error state. In some embodiments, the PCBA 222 may then send a signal to LED assembly 220 to light up the second indicator 134*b* to indicate the refuse container 100 is in an error state.

Bag Removal Method

Figure 38:
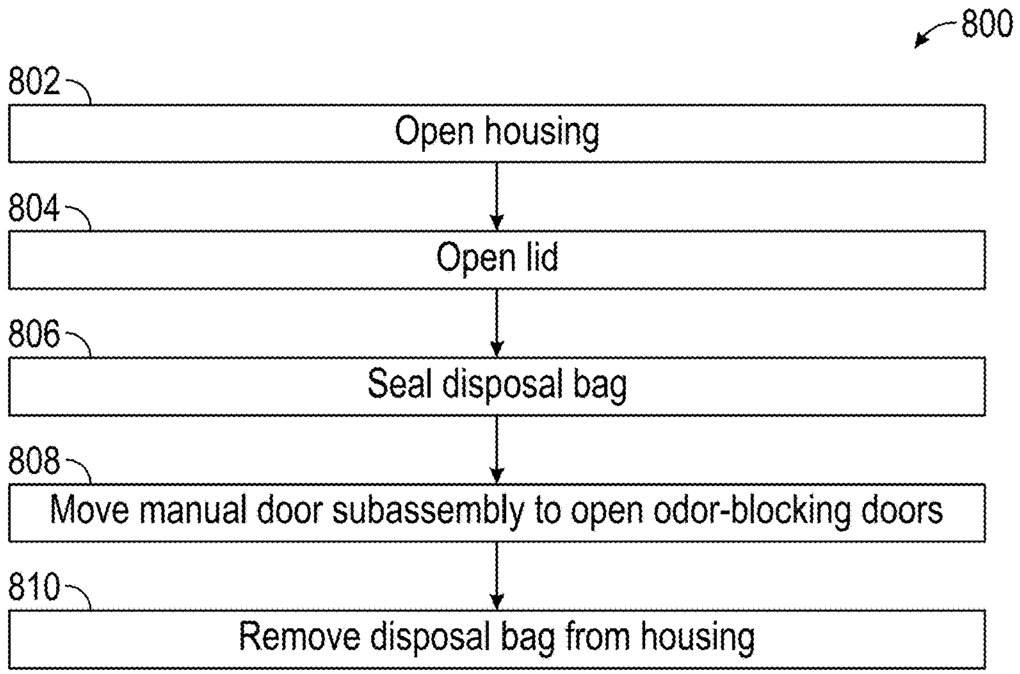
FIG. 38 illustrates a method for removing a disposal bag from the refuse container in accordance with embodiments of the present disclosure.

FIG. 38 illustrates a method 800 for removing a disposal bag 248 from refuse container 100 in accordance with embodiments of the present disclosure. Method 800 may be embodied as instructions provided with the refuse container system.

Method 800 may begin at a step 802 wherein the housing 102 of refuse container 100 may be opened. Step 802 is substantially similar to step 602 described with FIG. 36 illustrating method 600.

Next, at step 804, lid 104 of refuse container 100 may be opened. Step 804 is substantially similar to step 606 described with FIG. 36 illustrating method 600. Step 804 may also include opening the trim cover 124, 124'.

Next, at step 806, disposal bag 248 may be sealed. In some embodiments, disposal bag 248 may be sealed by fastening bag fastener 250. In some embodiments, fastening bag fastener 250 may comprise pulling on portions of bag fastener 250 extending through first cutout 256*a* and second cutout 256*b* to cinch opening 258 of disposal bag 248 closed. The portions of bag fastener 250 extending through cutouts 256*a*, 256*b* may be tied together to seal disposal bag 248. In some embodiments, fastening bag fastener 250 may comprise pulling on a portion of bag fastener 250 extending through either first cutout 256*a* or second cutout 256*b* and pushing fastener passage 254 to cinch opening 258 closed. Pulling a portion of bag fastener 250 extending through one of cutouts 256*a*, 256*b* while cinching opening 258 closed may seal disposal bag 248. Bag fastener 250 may be fastened while odor-blocking doors are closed in the closed configuration, thereby protecting the user from any odor of disposed materials within the disposal bag 248 during disposal bag removal.

In some embodiments, fastening bag fastener 250 may comprise reaching through second gap 208 of sealing applicator 204 and pulling on a portion of bag fastener 250 to seal disposal bag 248. In some embodiments, a user may reach through second gap 208 of sealing applicator 204 and pull on a portion of bag fastener 250 extending through or proximate second gap 208 to seal disposal bag 248. Pulling on a portion of bag fastener 250 extending through second gap 208 may lift bag fastener 250 off of the rear 138*f* of bag support 138' and pull bag fastener 250 toward sealing applicator 204. Opening 258 of disposal bag 248 may cinch closed as bag fastener 250 pulls toward sealing applicator 204 to thereby seal disposal bag 248. In some embodiments, when a user pulls a portion of bag fastener 250 extending through or proximate second gap 208, the sloped region 246 of bag support 138' may cause bag fastener 250 to lift off of rear 138*f* of bag support 138' and travel toward sealing applicator 204. A user may continue to pull on bag fastener 250 until opening 258 of disposal bag 248 is cinched closed proximate sealing applicator 204.

In some embodiments, fastening bag fastener 250 may comprise pulling on a portion of bag fastener 250 looped around hooks 212 and extending through second gap 208' or sealing applicator 204' of support mount 142". Pulling on the portion of bag fastener looped around hooks 212 may lift opening 258 of disposal bag 248 off of rear 138*f* of bag support 138 and cause opening 258 to cinch proximate sealing applicator 204' of support mount 142" to thereby seal disposal bag 248.

In some embodiments, rear spacers 238*b* may facilitate the movement of opening 258 of disposal bag 248 toward the sealing applicator 204, 204' such that the opening 258 gathers and cinches at the sealing applicator 204, 204'. For example, rear spacers 238*b* comprised in trim cover 124' may guide bag fastener 250 and fastener passage 254 toward sealing applicator 204, 204' when opening 258 of disposal bag 248 lifts off of rear 138*f* of bag support 138'. Trim cover 124' may be such that rear spacers 238*b* may guide bag fastener 250 toward sealing applicator 204, 204' to gather and cinch opening 258 of disposal bag 248.

A user may pull on a portion of bag fastener 250 extending through second gap 208, 208' with one hand, thereby making the bag sealing process easy and simple. In some embodiments, pulling on a portion of bag fastener 250 extending through or proximate second gap 208, 208' may cause a rear 138*f* of bag support 138' to flex downward to allow opening 258 of disposal bag 248 to lift off of rear 138*f* of bag support 138' and cinch toward sealing applicator 204, 204'. In some embodiments, pulling on a portion of bag fastener 250 extending through or proximate second gap 208, 208' may cause a rear 138*f* of bag support 138' to pivot downward. Rear 138*f* of bag support 138' pivoting downward may cause opening 258 of disposal bag 248 to lift off of rear 138*f* of bag support 138' and gather at sealing applicator 204, 204' to thereby cinch opening 258 of disposal bag 248 closed to seal disposal bag 248. In some embodiments, pulling on a portion of bag fastener 250 extending through or proximate second gap 208, 208' may cause opening 258 of disposal bag 248 to lift off flexible fingers comprised on top edge 138*a'* of bag support 138' to thereby lift opening 258 from rear 138*f* of bag support 138' and gather opening 258 at sealing applicator 204, 204' to thereby cinch opening 258 closed to seal disposal bag 248.

In some embodiments, fastening bag fastener 250 may comprise interlocking gaskets formed along opening 258 of disposal bag 248 to seal disposal bag 248. In some embodiments, fastening bag fastener 250 may comprise interlocking teeth formed along the opening 258 of the disposal bag 248 to seal the disposal bag 248.

In some embodiments, sealing disposal bag 248 may comprise applying heat to disposal bag 248. A user may actuate a heat actuator comprised in refuse container 100 when the disposal bag 248 is full. Actuating the heat actuator may cause the lid 104 to close and lock to the top 102*a* of the housing 102 such that users are safe while the refuse container 100 is performing heat sealing. Once the lid 104 is closed and locked, heat actuator may cause a heat sealer positioned proximate the groove 200 or projection 198 of the odor-blocking doors 110*a*, 110*b* to apply heat to the disposal bag 248 clamped between the odor-blocking doors 110*a*, 110*b* to seal disposal bag 248. During heat sealing, indicators 134*a*, 134*b*, 134*c* may be activated by PCBA 222 via LED assembly 220 to indicate whether the heat sealing process successfully sealed the disposal bag or did not seal the disposal bag. In some embodiments, indicators 134*a*, 134*b*, 134*c* may be activated by PCBA 222 via LED assembly 220 to indicate the heat sealing is in progress.

During step 806, the odor-blocking doors 110*a*, 110*b* may be in the closed configuration, such that odors from previously disposed refuse in the disposal bag 248 do not reach the user when the user is sealing the disposal bag 248 by fastening the bag fastener 250. In some embodiments, the disposal bag may be sealed by fastening bag fastener 250 while odor-blocking doors 110*a*, 110*b* are clamping the disposal bag 248 when in the closed configuration, thereby blocking odor within the second receiving chamber 154 from reaching the user during disposal bag sealing and removal.

During step 806, a user may be able to seal the disposal bag 248 without touching any portion of the disposal bag 248 previously soiled by disposed materials, thereby providing the advantage of keeping a user's hands clean when sealing the disposal bag 248.

Next, at a step 808, manual door subassembly 148, 148' may be moved to open odor-blocking doors 110*a*, 110*b*. Step 808 is substantially similar to step 608 described with FIG. 36 illustrating method 600.

Next, at step 810, disposal bag 248 may be removed from housing 102 of refuse container 100. In some embodiments, disposal bag 248 may be removed by pulling disposal bag 248 through the front of refuse container 100 where front panel 118 is opened. In some embodiments, disposal bag 248 may be removed by pulling disposal bag 248 through second gap 208, 208' of sealing applicator 204, 204' to thereby remove disposal bag 248 through front panel 118 of refuse container 100. Removing disposal bag 248 through the opened front panel 118 may provide the advantage of a user not having to lift the full disposal bag over the top 102*a* of housing 102. In some embodiments, disposal bag 248 may be removed from refuse container 100 by lifting disposal bag 248 upward through top 102*a* of housing 102.

Fullness Sensing Assembly

Figure 39:
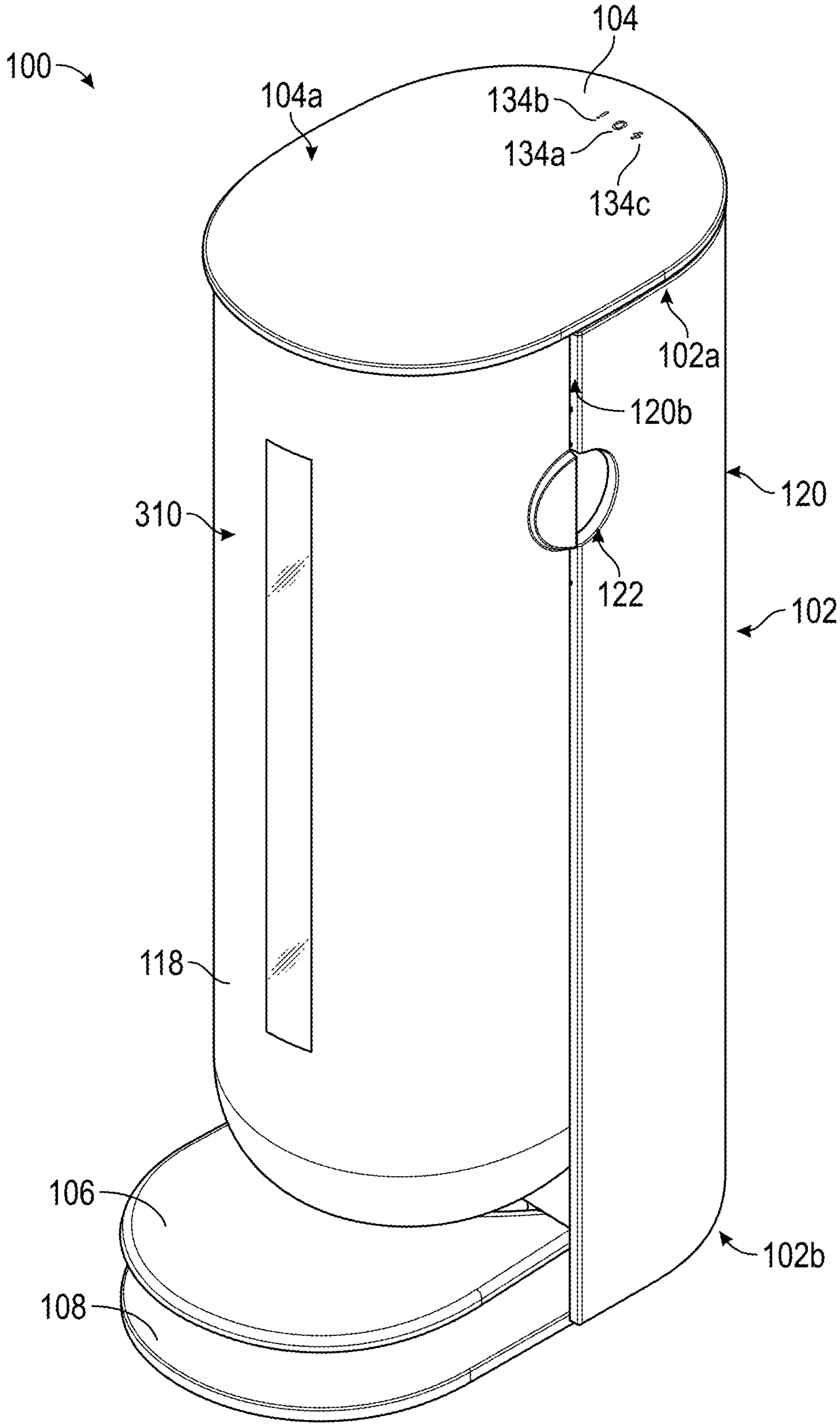
FIG. 39 illustrates a front perspective view of some embodiments of a fullness sensing assembly of the refuse container.

FIG. 39 illustrates a front perspective view of some embodiments of a fullness sensing assembly 310 of refuse container 100. In some embodiments, refuse container 100 may comprise a fullness sensing assembly 310. Fullness sensing assembly may comprise a window defined by front panel 118, as shown in FIG. 39. The window may be transparent such that a user may visually inspect when the disposal bag is full and needs replacing. In some embodiments, the window of fullness sensing assembly 310 may be defined by lid 104 or rear panel 120. In some embodiments, the window of fullness sensing assembly 310 may be defined by odor-blocking doors 110*a*, 110*b* and opening lid 104 may allow a user to visualize the fullness of the disposal bag through the partially translucent doors.

To provide an accurate fullness indication when a user looks through the window, the fullness sensing assembly 310 may also comprise a shaker that is configured to shake disposal bag 248 to cause refuse to fall to the bottom of disposal bag 248. In some embodiments, the shaker may be a platform at the bottom of second receiving chamber 154. The platform may be coupled to a motor. When a sensor positioned proximate odor-blocking doors 110*a*, 110*b* senses refuse that falls through the odor-blocking doors 110*a*, 110*b* when in the open configuration, the sensor may signal motor to pump platform up and down to shake disposal bag 248 and thereby cause refuse to fall into the bottom of disposal bag 248.

In some embodiments, fullness sensing assembly 310 may comprise a scale that measures the weight of the disposal bag 248 to indicate the fullness of disposal bag 248. The scale may be electrically connected to PCBA 222 and proximate bottom 152 of refuse container 100 such that scale is located on bottom of second receiving chamber 154. Fullness sensing assembly 310 may also comprise a fullness indicator electrically connected to PCBA 222. When the scale measures a certain weight of the disposal bag 248, a processor electrically connected to PCBA 222 may be programmed to instruct the fullness indicator to indicate that the disposal bag 248 is full. A weight sensor may attach to the scale and electrically connect to the PCBA 222. The weight sensor may be a load cell. When the scale measures a certain weight of the disposal bag 248, the weight sensor may send a signal to the PCBA 222 indicating the measured weight. The processor electrically connected to PCBA 222 may be programmed to instruct the fullness indicator to indicate that the disposal bag is full when the measured weight goes above a certain weight amount. In some embodiments, the fullness indicator may be one of indicators 134*a*, 134*b*, 134*c*, and processor may instruct the LED assembly 220 to light up one of indicators 134*a*, 134*b*, 134*c* at a certain cadence to indicate the disposal bag 248 is full and thereby needs replacement.

In some embodiments, fullness sensing assembly 310 may be configured to sense the volume of refuse in disposal bag 248 to indicate disposal bag fullness. The underside of the odor-blocking doors 110*a*, 110*b* may comprise fullness indicators that deflect or move when the volume of the disposal bag 248 reaches the odor-blocking doors 110*a*, 110*b*, indicating the disposal bag 248 is full. The fullness indicator on the underside of the odor-blocking doors 110*a*, 110*b* may comprise a flag that is visible through a window of fullness sensing assembly 310 when the fullness indicators deflect or move. The visualization of the flag may indicate the disposal bag 248 is full. The window may be a window defined by front panel 118, rear panel 120, or lid 104, or may be defined on any component of refuse container such that a user may view the flag when the flag is deflected.

In some embodiments, fullness sensing assembly 310 may comprise a distance sensor electrically connected to PCBA 222 and comprised within the interior of the refuse container 100. A fullness indicator may be electrically connected to PCBA 222. The distance sensor may send a signal to PCBA 222 indicating the distance between a top edge 138*a*, 138*a*' of bag support 138, 138' and a top of refuse within disposal bag 248. The processor electrically connected to PCBA 222 may be programmed to instruct the fullness indicator to indicate to a user when the distance sensor measures a certain distance that indicates the disposal bag 248 is full.

In some embodiments, fullness sensing assembly 310 may comprise light-sensitive sensors electrically connected to PCBA 222 and attached to the interior of the refuse container 100 on opposite sides. The PCBA 222 may be electrically connected to a fullness indicator. The processor electrically connected to PCBA 222 may be programmed to instruct the fullness indicator to indicate to a user when the light-sensitive sensors measure a certain level of light through the disposal bag 248 that indicates the disposal bag 248 is full.

In some embodiments, fullness sensing assembly 310 may comprise a sensor electrically connected to PCBA 222 and comprised on the lid 104 or trim cover 124, 124'. PCBA 222 may be electrically connected to a fullness indicator. The processor electrically connected to PCBA 222 may be programmed to instruct the fullness indicator to indicate to a user the state of the lid 104 to show the user when the disposal bag 248 is full.

Features above as well as those claimed below may be combined in various ways without departing from the scope hereof. The following examples illustrates some possible, non-limiting combinations:

(A1) A refuse container, comprising: a housing having a top and a bottom; at least one odor-blocking door mounted to the housing; a lid hingedly coupled to the housing proximate the top of the housing; a base coupled to the housing proximate the bottom of the housing; an actuator operatively coupled to the base; an automatic door subassembly operatively coupled to the actuator, wherein actuation of the actuator causes the automatic door subassembly to contact the lid to open the lid, move away from the lid to close the lid, and contact the at least one odor-blocking door after closing the lid to transition the at least one odor-blocking door from a closed configuration to an open configuration.

(A2) For the refuse container denoted as (A1), wherein the automatic door subassembly comprises a beam pivotally coupled to the actuator, wherein the actuation of the actuator pivots the actuator in a first direction to cause the beam to contact the lid to open the lid.

(A3) For the refuse container denoted as (A1) or (A2), wherein the at least one odor-blocking door comprises a door lever, wherein the automatic door subassembly comprises a lever coupled to the beam and the lever contacts the door lever to transition the at least one odor-blocking door from the closed configuration to the open configuration.

(A4) For the refuse container denoted as (A1) through (A3), wherein the housing comprises an inner wall coupled to a rear panel and a front panel hingedly coupled to a first side of the rear panel.

(A5) For the refuse container denoted as (A1) through (A4), further comprising: a door mount subassembly mounting the at least one odor-blocking door to the housing, the door mount subassembly comprising: a support mount coupled to the housing; a door support coupled to the support mount; wherein the at least one odor-blocking door rotatably couples to the door support such that the door mount subassembly mounts the at least one odor-blocking door to the housing.

(A6) For the refuse container denoted as (A1) through (A5), further comprising: a latch configured to close the front panel onto a second side of the rear panel to close the housing.

(A7) For the refuse container denoted as (A1) through (A6), wherein the at least one odor-blocking door rotates about the door support to transition the at least one odor-blocking door from the closed configuration to the open configuration.

(B1) A refuse container system, comprising: a refuse container, the refuse container comprising: a housing having a top and a bottom; at least one odor-blocking door mounted to the housing; a lid hingedly coupled to the housing proximate the top of the housing; a base coupled to the housing proximate the bottom of the housing; an actuator operatively coupled to the base; an automatic door subassembly operatively coupled to the actuator, wherein actuation of the actuator causes the automatic door subassembly to contact the lid to open the lid, move away from the lid to close the lid, and contact the at least one odor-blocking door after closing the lid to transition the at least one odor-blocking door from a closed configuration to an open configuration; a disposal bag received within the housing of the refuse container; an odor-eliminating cartridge received in the lid; and a storage compartment coupled to the housing, wherein the storage compartment receives a disposal bag package.

(B2) For the refuse container system denoted as (B1), wherein the refuse container further comprises: a door mount subassembly mounting the at least one odor-blocking door to the housing, the door mount subassembly comprising: a support mount coupled to the housing; a door support coupled to the support mount, wherein the at least one odor-blocking door rotatably couples to the door support such that the door mount subassembly mounts the at least one odor-blocking door to the housing.

(B3) For the refuse container system denoted as (B1) or (B2), wherein the refuse container further comprises: a bag support positioned on the door support, wherein an opening of the disposal bag extends over a top edge of the bag support when the disposal bag is received within the housing of the refuse container.

(B4) For the refuse container system denoted as (B1) through (B3), wherein the odor-eliminating cartridge houses activated carbon configured to absorb malodors from refuse disposed of in the refuse container.

(B5) For the refuse container system denoted as (B1) through (B4), wherein the housing defines a second receiving chamber having a depth, wherein a length of the disposal bag is greater than the depth of the second receiving chamber, and wherein the disposal bag further comprises: a fastener passage extending along an opening of the disposal bag; and a fastener mounted inside the fastener passage.

(B6) For the refuse container system denoted as (B1) through (B5), wherein the at least one odor-blocking door defines a first receiving chamber when the at least one odor-blocking door is in the closed configuration, wherein the at least one odor-blocking door is configured to cover the second receiving chamber when the at least one odor-blocking door is in the closed configuration to thereby block odors in the second receiving chamber from reaching a user during sealing and removal of the disposal bag from the refuse container.

(C1) A refuse container, comprising: a housing having a top and a bottom; one or more odor-blocking doors mounted to the housing; a lid hingedly coupled to the housing proximate the top of the housing; a base coupled to the housing proximate the bottom of the housing; an actuator operatively coupled to the base; an automatic door subassembly operatively coupled to the actuator, wherein the automatic door subassembly transitions from a first position to a second position to open the lid when the actuator is pressed, wherein the automatic door subassembly transitions from the second position to a third position to close the lid and from the third position to a fourth position to transition the one or more odor-blocking doors from a closed configuration to an open configuration when the actuator is released.

(C2) For the refuse container denoted as (C1), wherein the one or more odor-blocking doors comprises a first odor-blocking door and a second odor-blocking door, wherein the first odor-blocking door comprises a projection and the second odor-blocking door defines a groove, wherein the groove receives the projection when the first odor-blocking door and the second odor-blocking door are in the closed configuration.

(C3) For the refuse container denoted as (C1) or (C2), wherein the automatic door subassembly comprises a beam defining at least one translation slot having a first end and a second end, the at least one translation slot receiving a fastener, wherein the first end of the at least one translation slot receives the fastener when the automatic door subassembly is in the first position.

(C4) For the refuse container denoted as (C1) through (C3), wherein one of the one or more odor-blocking doors comprises a door lever, wherein a lever couples to the beam, wherein the lever contacts the door lever when the automatic door subassembly transitions from the third position to the fourth position, and wherein contact of the lever to the door lever rotates the one or more odor-blocking doors from the closed configuration to the open configuration.

(C5) For the refuse container denoted as (C1) through (C4), wherein the lever releases from the door lever to transition the automatic door subassembly from the fourth position to the first position, wherein the one or more odor-blocking doors bias from the open configuration back to the closed configuration when the lever releases from the door lever.

(C6) For the refuse container denoted as (C1) through (C5), further comprising: one or more indicators configured to indicate a status of the refuse container to a user, wherein the one or more indicators are comprised in the lid.

(C7) For the refuse container denoted as (C1) through (C6), wherein the one or more odor-blocking doors define a first receiving chamber when the one or more odor-blocking doors are in the closed configuration, wherein the housing defines a second receiving chamber, wherein the one or more odor-blocking doors are configured to cover the second receiving chamber when the one or more odor-blocking doors are in the closed configuration to thereby block odors in the second receiving chamber from reaching a user during refuse disposal.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the present disclosure has been described with reference to the embodiments illustrated in the attached drawing figures, it is noted that equivalents may be employed, and substitutions made herein, without departing from the scope of the present disclosure as recited in the claims.

The invention claimed is:

1. A refuse container, comprising:
a housing having a top and a bottom;
at least one odor-blocking door mounted to the housing,
wherein the at least one odor-blocking door comprises a door lever;
a lid hingedly coupled to the housing proximate the top of the housing;
a base coupled to the housing proximate the bottom of the housing;
an actuator operatively coupled to the base; and
an automatic door subassembly,
wherein the automatic door subassembly comprises a beam pivotally coupled to the actuator,
wherein the beam comprises a beam lever coupled to the beam,
wherein actuation of the actuator causes the automatic door subassembly to contact the lid to open the lid, move away from the lid to close the lid, and contact the at least one odor-blocking door after closing the lid to transition the at least one odor-blocking door from a closed configuration to an open configuration,
wherein the actuation causes the beam lever to contact the door lever to transition the at least one odor-blocking door from the closed configuration to the open configuration.

2. The refuse container of claim 1,
wherein the actuation of the actuator pivots the actuator in a first direction to cause the beam to contact the lid to open the lid.

3. The refuse container of claim 1, wherein the housing comprises an inner wall coupled to a rear panel and a front panel hingedly coupled to a first side of the rear panel.

4. The refuse container of claim 3, further comprising:
a door mount subassembly mounting the at least one odor-blocking door to the housing, the door mount subassembly comprising:
a support mount coupled to the housing; and
a door support coupled to the support mount,
wherein the at least one odor-blocking door rotatably couples to the door support such that the door mount subassembly mounts the at least one odor-blocking door to the housing.

5. The refuse container of claim 4, wherein the at least one odor-blocking door rotates about the door support to transition the at least one odor-blocking door from the closed configuration to the open configuration.

6. The refuse container of claim 3, further comprising:
a latch configured to close the front panel onto a second side of the rear panel to close the housing.

7. The refuse container of claim 1, wherein the lid is configured to receive an odor-eliminating cartridge,
wherein the odor-eliminating cartridge houses activated carbon configured to absorb malodors from refuse disposed of in the refuse container.

8. A refuse container system, comprising:
a refuse container, the refuse container comprising:
a housing having a top and a bottom;
at least one odor-blocking door mounted to the housing;
wherein the at least one odor-blocking door comprises a door lever;
a lid hingedly coupled to the housing proximate the top of the housing;
a base coupled to the housing proximate the bottom of the housing;
an actuator operatively coupled to the base;
an automatic door subassembly operatively coupled to the actuator,
wherein the automatic door subassembly comprises a beam coupled to the actuator,
wherein the beam comprises a beam lever coupled to the beam,
wherein actuation of the actuator causes the beam to contact the lid to open the lid, move away from the lid to close the lid, and contact the at least one odor-blocking door after closing the lid to transition the at least one odor-blocking door from a closed configuration to an open configuration,
wherein the actuation causes the beam lever to contact the door lever to transition the at least one odor-blocking door from the closed configuration to the open configuration;
a disposal bag received within the housing of the refuse container;
an odor-eliminating cartridge received in the lid; and
a storage compartment coupled to the housing,
wherein the storage compartment receives a disposal bag package.

9. The refuse container system of claim 8, wherein the refuse container further comprises:
a door mount subassembly mounting the at least one odor-blocking door to the housing, the door mount subassembly comprising:
a support mount coupled to the housing; and
a door support coupled to the support mount,
wherein the at least one odor-blocking door rotatably couples to the door support such that the door mount subassembly mounts the at least one odor-blocking door to the housing.

10. The refuse container system of claim 9, wherein the refuse container further comprises:
a bag support positioned on the door support,
wherein an opening of the disposal bag extends over a top edge of the bag support when the disposal bag is received within the housing of the refuse container.

11. The refuse container system of claim 8, wherein the odor-eliminating cartridge houses activated carbon configured to absorb malodors from refuse disposed of in the refuse container.

12. The refuse container system of claim 8, wherein the housing defines a second receiving chamber having a depth, wherein a length of the disposal bag is greater than the depth of the second receiving chamber, and wherein the disposal bag further comprises:

a fastener passage extending along an opening of the disposal bag; and a fastener mounted inside the fastener passage.

13. The refuse container system of claim 12, wherein the at least one odor-blocking door defines a first receiving chamber when the at least one odor-blocking door is in the closed configuration, wherein the at least one odor-blocking door is configured to cover the second receiving chamber when the at least one odor-blocking door is in the closed configuration to thereby block odors in the second receiving chamber from reaching a user during sealing and removal of the disposal bag from the refuse container.

14. A refuse container, comprising:

a housing having a top and a bottom;

one or more odor-blocking doors mounted to the housing, wherein at least one of the one or more odor-blocking doors comprises a door lever;

a lid hingedly coupled to the housing proximate the top of the housing;

a base coupled to the housing proximate the bottom of the housing;

an actuator operatively coupled to the base; and an automatic door subassembly operatively coupled to the actuator and comprising a beam, wherein the beam comprises a lever, wherein the automatic door subassembly transitions from a first position to a second position to open the lid when the actuator is pressed, wherein the beam moves upward when the automatic door subassembly transitions from the first position to the second position to open the lid when the actuator is pressed, wherein the automatic door subassembly transitions from the second position to a third position to close the lid and from the third position to a fourth position to transition the one or more odor-blocking doors from a closed configuration to an open configuration when the actuator is released, wherein the beam moves downward such that the beam lever contacts the door lever when the actuator is released to transition the one or more odor-blocking doors from the closed configuration to the open configuration.

15. The refuse container of claim 14, wherein the one or more odor-blocking doors comprises a first odor-blocking door and a second odor-blocking door, wherein the first odor-blocking door comprises a projection and the second odor-blocking door defines a groove, wherein the groove receives the projection when the first odor-blocking door and the second odor-blocking door are in the closed configuration.

16. The refuse container of claim 14, wherein the beam defines at least one translation slot having a first end and a second end, the at least one translation slot receiving a fastener, wherein the first end of the at least one translation slot receives the fastener when the automatic door subassembly is in the first position.

17. The refuse container of claim 14, wherein contact of the beam lever to the door lever rotates the one or more odor-blocking doors from the closed configuration to the open configuration.

18. The refuse container of claim 17, wherein the beam lever releases from the door lever to transition the automatic door subassembly from the fourth position to the first position, wherein the one or more odor-blocking doors bias from the open configuration back to the closed configuration when the beam lever releases from the door lever.

19. The refuse container of claim 14, further comprising:

one or more indicators configured to indicate a status of the refuse container to a user, wherein the one or more indicators are comprised in the lid.

20. The refuse container of claim 14, wherein the one or more odor-blocking doors define a first receiving chamber when the one or more odor-blocking doors are in the closed configuration, wherein the housing defines a second receiving chamber, wherein the one or more odor-blocking doors are configured to cover the second receiving chamber when the one or more odor-blocking doors are in the closed configuration to thereby block odors in the second receiving chamber from reaching a user during refuse disposal.

* * * * *